US010298946B2

United States Patent
Li et al.

(10) Patent No.: US 10,298,946 B2
(45) Date of Patent: May 21, 2019

(54) METHOD AND DEVICE FOR ENCODING AND DECODING PARAMETER SETS AT SLICE LEVEL

(75) Inventors: Ming Li, Shenzhen (CN); Ping Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 29 days.

(21) Appl. No.: 14/355,785

(22) PCT Filed: Jul. 24, 2012

(86) PCT No.: PCT/CN2012/079111
§ 371 (c)(1),
(2), (4) Date: May 1, 2014

(87) PCT Pub. No.: WO2013/063962
PCT Pub. Date: May 10, 2013

(65) Prior Publication Data
US 2014/0294067 A1    Oct. 2, 2014

(30) Foreign Application Priority Data

Nov. 1, 2011 (CN) .......................... 2011 1 0340195

(51) Int. Cl.
*H04N 19/46* (2014.01)
*H04N 19/70* (2014.01)
*H04N 19/174* (2014.01)

(52) U.S. Cl.
CPC ........... *H04N 19/46* (2014.11); *H04N 19/174* (2014.11); *H04N 19/70* (2014.11)

(58) Field of Classification Search
CPC .................................................. H04N 19/00272
(Continued)

(56) References Cited

U.S. PATENT DOCUMENTS

| 2010/0189173 A1* | 7/2010 | Chen | H04N 19/597 |
| | | | 375/240.02 |
| 2012/0207227 A1* | 8/2012 | Tsai | H04N 19/136 |
| | | | 375/240.29 |
| 2013/0094585 A1* | 4/2013 | Misra | H04N 19/503 |
| | | | 375/240.16 |

FOREIGN PATENT DOCUMENTS

| CN | 1781315 | 5/2006 |
| CN | 101217654 | 7/2007 |

(Continued)

OTHER PUBLICATIONS

Wenger et al., Adaptation Parameter Set (APS), Jul. 2011, 10 pages.

*Primary Examiner* — William C Vaughn, Jr.
*Assistant Examiner* — Joseph Daniel A Towe
(74) *Attorney, Agent, or Firm* — Perkins Coie LLP

(57) ABSTRACT

Provided is a method for encoding parameter sets at slice level. The method includes: when there are one or more parameter sets, in which the coding tool parameters are identical to the coding tool parameters of a part of coding tools used for the current slice, in the existing parameter sets, encoding the identifiers of parameter sets into bit-stream of the current slice, wherein a parameter set contains common information of the coding tools used in the process of encoding/decoding slice(s). Correspondingly, also provided is a method for decoding parameter sets at slice level and a device for encoding and decoding parameter sets at slice level, which can make full use of the encoded parameter set information when the slice header refers to a plurality of parameter sets, implement flexible configuration of the coding tools used in the process of encoding/decoding slice(s) and reduce information redundancy.

26 Claims, 29 Drawing Sheets

(58) Field of Classification Search
USPC .................................................. 375/240.02
See application file for complete search history.

(56) References Cited

FOREIGN PATENT DOCUMENTS

| | | |
|---|---|---|
| CN | 101036392 | 9/2007 |
| CN | 102150428 | 8/2011 |
| WO | 2010149900 | 12/2010 |

* cited by examiner

METHOD AND DEVICE FOR ENCODING AND DECODING PARAMETER SETS AT SLICE LEVEL

TECHNICAL FIELD

The disclosure relates to the video coding technology, and in particular to method and device for encoding and decoding parameter sets at slice level.

BACKGROUND

Parameter set is the basic data structure in video coding standards and contains common information used in the encoding/decoding process, such as flags and common parameter information (for example, Profile, Level, etc.). Generally, the flags and the parameters in parameter sets determine the use of encoding/decoding tools of a codec at any time. Some important algorithms can be viewed as the specific descriptions on the operations led by a certain flag. Therefore, the data structure, the encoding/decoding and the referring method of the parameter set constructs the basic framework and the organization styles of bit-streams of the entire video coding standard.

At present, the High-Efficiency Video Coding (HEVC) standard has three types of parameter sets: Sequence Parameter Set (SPS), Picture Parameter Set (PPS) and Adaptation Parameter Set (APS). The SPS contains the common information used for encoding/decoding the entire input video sequence. The PPS contains the common information used in the process of encoding/decoding one or more pictures. The APS is a data structure containing the common information of the coding tools used in the process of encoding/decoding one or more slices. The encoding/decoding and the referring method of the SPS and the PPS are similar to that in the present standard H.264/AVC (Advanced Video Coding). At the encoder side, the encoding and the referring method of the APS may include the following steps.

Step 1: the encoder determines, according to the SPS and the PPS, coding tools allowed to be used in the process of encoding the current slice.

Step 2: the encoder encodes the current slice, wherein an optimization module of the encoder determines the coding tools and the coding tool parameters used in the process of encoding the slice.

Step 3: the encoder detects whether the coding tool parameters in an existing APS are completely identical to the coding tool parameters used for the current slice; if so, Step 4 is executed; otherwise, Step 5 is executed.

Step 4: the encoder writes the identifier of the existing APS into slice header, and the process of encoding the APS information for the current slice ends.

Step 5: the encoder generates a new APS according to the coding tool parameters used for the current slice and allocates a new identifier to this APS. The encoder writes the identifier of the APS into the slice header, and the process of encoding the APS information for the current slice ends.

Here, the said coding tool may refer to a picture-level coding tool, and a picture-level or slice-level common control module. The picture-level coding tool may include Sample Adaptive Offset (SAO), Adaptive Loop Filter (ALF), Weighted Prediction (WP) and like. The picture-level or slice-level common control module may include Decoded Picture Buffer (DPB) management module, reference picture marking and adjustment module, reference picture list construction module and the like. The coding tool parameter may include: coding tool On/Off flag, necessary parameters of a coding tool for deriving and/or reconstructing one or more pixels, the said parameters may include, for example, the additive offset of each subband for SAO, filter coefficients for ALF, reference picture information for the picture-level or slice-level common control module.

In addition, the encoder may use a different APS for each slice, or use the same APS for all slices in the same picture, or use the same APS for multiple slices (which may not be in the same picture).

At the decoder, the decoding and the referring method of the APS may include the following steps:

Step 1: the decoder parses the binary bit-stream of the slice header, and determines the APS identifier used in the process of decoding the current slice.

Step 2: the decoder parses the bit-stream of the corresponding APS according to the APS identifier obtained through parsing, and determines the coding tools and the associated coding tool parameters used in the process of decoding the current slice.

Step 3: the decoder configures the coding tools according to the APS and uses the configured coding tools to reconstruct pixels in the slice, and the process of decoding the current slice ends.

The drawbacks of the existing method mainly reside in the following four aspects.

First, the encoder cannot make full use of the encoded APS information. The APS contains the parameters of multiple coding tools simultaneously, and only one APS can be referred to in slice header. Therefore, only when the coding tool parameters used for encoding a slice are completely identical to the ones in a certain existing APS, the encoder can use this APS directly, without generating a new APS. Therefore, in the process of encoding a slice, if the coding tool parameters of one coding tool always keep unchanged while the parameters of other coding tools are changed, the encoder must generate new APSs for subsequent slices to be encoded and cannot re-use the coding tool parameters already contained in the existing APS directly.

Second, information redundancy exists in the encoding and referring method of APS. As described above, in the new APS generated, the encoder has to repeatedly encoding the coding tool parameters already existing in a previous APS, which leads to extra coding bits cost.

Third, the encoder cannot flexibly configure the coding tools using APS. Besides the above situations, the encoder cannot implement the flexible configuration of the coding tools by using the method of "respective configuration, and use in combination in the encoding process at slice level" for the allowed coding tools.

Fourth, the method for disabling a coding tool at slice level would cause a relative large bit overhead. For the coding tools allowed to be used in the encoding/decoding process, if one or more coding tools are not used in the actual encoding/decoding process, it has to generate one or more separate parameter sets, each containing a Flag "disabling the coding tool in the encoding/decoding process at slice level" only, and write the identifier of the one or more parameter sets into the slice header. Therefore, to encode the Flag information "disabling the coding tool" (generally, the number of the overhead bits is identical to the number of flags), the encoder has to encode other necessary information in the parameter set structure and the parameter set identifier at slice level, which leads to a relative large coding bit overhead.

SUMMARY

In view of the above, the disclosure provides method and device for encoding and decoding parameter sets at slice level, which can make full use of the encoded APS information, implement flexible configuration of the coding tools used in the process of encoding/decoding slice(s) and reduce information redundancy.

The technical scheme of the disclosure is implemented as follows.

The disclosure provides a method for encoding parameter sets at slice level, including: when there are one or more parameter sets, in which some coding tool parameters are identical to coding tool parameters of a part of coding tools used for the current slice, encoding one or more identifiers of the one or more parameter sets into a bit-stream of the current slice; wherein the said parameter set is a data structure containing common information of one or more coding tools used in the process of encoding/decoding one or more slices.

Preferably, the method further includes: generating one or more parameter sets and encoding in the one or more parameter sets the coding tool parameters of the other part of coding tools used for the current slice, allocating an identifier to each generated parameter set, and encoding the identifier of each generated parameter set into the bit-stream of the current slice.

Preferably, generating the one or more parameter sets and encoding in the one or more parameter sets the coding tool parameters of the other part of coding tools for the current slice includes:

when the other part of coding tools for the current slice includes two or more coding tools, generating one or more parameter sets and encoding in each parameter set the coding parameters of one or more coding tools.

Preferably, generating the one or more parameter sets and encoding in the one or more parameter sets the coding tool parameters of the other part of coding tools for the current slice includes: when the other part of coding tools for the current slice includes two or more coding tools, separately generating parameter sets for each coding tool respectively, encoding in each parameter set the coding tool parameters of one coding tool and allocating a parameter set identifier to each generated parameter set, and encoding the identifier of each generated parameter set into the bit-stream of the current slice;

or, when the other part of coding tools used for the current slice includes two or more coding tools, generating one parameter set, encoding in the parameter set the coding tool parameters of the two or more coding tools and allocating a parameter set identifier to the generated parameter set, and encoding the identifier of the parameter set into the bit-stream of the current slice.

Preferably, allocating the parameter set identifier to the parameter set includes: determining candidate identifiers based on a multi-parameter-set overwriting mode adopted for the current slice, selecting one from the determined candidate identifiers, and allocating the selected identifier to the parameter set.

In the above solution, the encoding method is embodied as: pre-configuring identifiers for the parameter sets corresponding to different coding tools; when there are one or more parameter sets, in which the coding tool parameters are identical to the coding tool parameters of a part of coding tools for the current slice, setting the values of the identifiers of respective parameter sets to the values of the preconfigured identifiers of the parameter sets corresponding to the coding tools, and then encoding the identifiers of respective parameter sets into the bit-stream of the current slice.

Preferably, the method further includes: determining whether there are one or more existing parameter sets, in which the coding tool parameters are identical to the coding tool parameters of a part of coding tools used for the current slice.

Preferably, the coding tools include: a picture-level coding tool and/or a picture-level or slice-level management module, wherein the picture-level coding tool includes: Sample Adaptive Offset (SAO), Adaptive Loop Filter (ALF), Weighted Prediction (WP);

the picture-level or slice-level management module includes: Decoded Picture Buffer (DPB) management module, reference picture marking and adjustment module, reference picture list construction module.

The disclosure also provides a method for decoding parameter sets at slice level, including:

decoding a plurality of parameter sets referred to by a current slice according to parameter set identifiers in the bit-stream of the current slice, determining the coding tool parameters used in the process of decoding the current slice, and assigning the determined values of the coding tool parameters to the corresponding variables in a data structure of the current slice; wherein the said parameter set is a data structure containing common information of one or more coding tools used in the process of encoding/decoding one or more slices.

Preferably, determining the coding tool parameters used in the process of decoding the current slice includes: for each coding tool, if there is only one parameter set, in which an On/Off flag of the coding tool is 1, in the plurality of parameter sets referred to by the current slice, then determining that the coding tool parameters of the coding tool in the parameter set are used in the process of decoding the current slice.

Preferably, determining the coding tool parameter used in the process of decoding the current slice includes: determining the coding tool parameters of the coding tools used in the process of decoding the current slice, according to a pre-configured corresponding relationship between a parameter set identifier and a coding tool.

Preferably, determining the coding tool parameter used in the process of decoding the current slice includes: determining the coding tool parameters used in the process of decoding the current slice, according to a preset multi-parameter-set overwriting mode.

Preferably, determining the coding tool parameters used in the process of decoding the current slice according to the preset multi-parameter-set overwriting mode includes: for each coding tool, if, in the parameter set with its identifier equal to ps_id[n], a flag used for indicating that the parameter set contains information of the coding tool parameters is 1, overwriting the coding tool parameters of the coding tool previously determined for decoding the current slice with the coding tool parameters of the coding tool in the parameter set with its identifier equal to ps_id[n], wherein n is an integer, not less than 1 but not greater than the number of parameter sets referred to by the current slice.

Preferably, determining the coding tool parameter used in the process of decoding the current slice according to the preset multi-parameter-set overwriting mode includes: according to the flag used for indicating the currently adopted multi-parameter-set overwriting mode, determining the multi-parameter-set overwriting mode used in the process of decoding the current slice, and determining the coding tool parameters used in the process of decoding the current slice based on the determined multi-parameter-set overwriting mode.

Preferably, binary representation of the flag used for indicating the currently adopted multi-parameter-set overwriting mode contains one or more bits, wherein each bit indicates the multi-parameter-set overwriting mode for one coding tool.

Preferably, the flag used for indicating the currently adopted multi-parameter-set overwriting mode is obtained based on an absolute difference between the parameter set identifiers given by ps_id[i] and ps[i−1], wherein i is an integer, not less than 1 but not greater than the number of parameter sets referred to in the process of decoding the current slice.

Preferably, the coding tools include: a picture-level coding tool and/or a picture-level or slice-level management module, wherein the picture-level coding tool includes: Sample Adaptive Offset (SAO), Adaptive Loop Filter (ALF), Weighted Prediction (WP); the picture-level or slice-level management module includes: Decoded Picture Buffer (DPB) management module, reference picture marking and adjustment module, reference picture list construction module.

The disclosure also provides an encoder for encoding parameter sets at slice level, including: a determination module and an encoding module, wherein the determination module is configured to: when determining that there are one or more parameter sets, in which the coding tool parameters are identical to the coding tool parameters of a part of coding tools used for the current slice, in existing parameter sets, notify the encoding module to refer to the parameter sets;

the encoding module is configured to encode the identifiers of the parameter sets into a bit-stream of the current slice when receiving the notification from the determination module; wherein the said parameter set is a data structure containing common information of one or more coding tools used in the process of encoding/decoding one or more slices.

Preferably, the encoding module is further configured to: generate one or more parameter sets and encode in the one or more parameter sets the coding tool parameters of the other part of coding tools used for the current slice, allocate an identifier to each generated parameter set, and encode the identifier of each generated parameter set into the bit-stream of the current slice.

Preferably, the encoding module is further configured to set the identifier of the parameter set to be the preconfigured identifier of the parameter set corresponding to the coding tool, and then encode the identifier of the parameter set into the bit-stream of the current slice.

Preferably, the determination module is further configured to determine whether there are one or more existing parameter sets, in which the coding tool parameters are identical to the coding tool parameters of a part of coding tools used for the current slice.

The disclosure also provides a decoder for decoding a slice-level parameter set, including: a decoding module, a determination module and a value assignment module, wherein the decoding module is configured to decode a plurality of parameter sets referred to by the current slice according to the decoded parameter set identifiers from a bit-stream of the current slice;

the determination module is configured to determine the coding tool parameters used in the process of decoding the current slice, according to the coding tool parameters in the plurality of parameter sets obtained when the decoding module decodes the plurality of parameter sets referred to by the current slice;

the value assignment module is configured to assign the values of the coding tool parameters determined by the determination module to corresponding variables in a data structure of the current slice; wherein the said parameter set is a data structure containing common information of one or more coding tools used in the process of encoding/decoding one or more slices.

Preferably, the determination module is configured to: for each coding tool, if there is only one parameter set, in which an On/Off flag of the coding tool is 1, in the plurality of parameter sets referred to by the current slice, determine that the coding tool parameters of the coding tool in the parameter set are used in the process of decoding the current slice.

Preferably, the determination module is configured to determine the coding tool parameters of the coding tools used in the process of decoding the current slice, according to a preconfigured corresponding relationship between a parameter set identifier and a coding tool.

Preferably, the determination module is configured to determine the coding tool parameters used in the process of decoding the current slice, according to a preset multi-parameter-set overwriting mode.

The disclosure also provides an electronic device, including the encoder and the decoder described above.

With the method and the device for encoding and decoding parameter sets at slice level in the disclosure, when there are one or more existing parameter sets, in which coding tool parameters are identical to the coding tool parameters of a part of coding tools used for the current slice, the identifiers of the one or more parameter sets are encoded into the bit-stream of the current slice. In this way, when the slice has referred to a plurality of parameter sets, the encoded parameter set information can be fully utilized, thereby implementing flexible configurations of the coding tools used in the process of encoding/decoding one or more slices and reducing information redundancy.

In addition, the method and the device described in the disclosure can generate one or more parameter sets according to the actual needs and encode in each parameter set the coding tool parameters of one or more coding tools, not only facilitating the subsequent slices to refer to the generated parameter sets in the encoding/decoding process, but also helping reducing coding bit overhead.

DETAILED DESCRIPTION OF THE EMBODIMENTS

Figure 1:
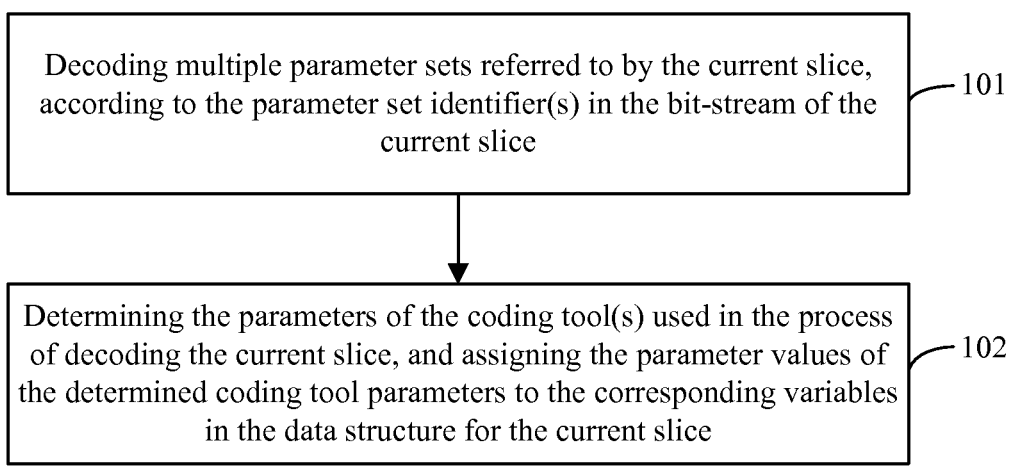
FIG. 1 shows an implementation flowchart of a method for decoding parameter sets at slice level according to an embodiment of the disclosure.

The basic idea of the embodiments of the disclosure includes: in the process of encoding/decoding the current slice, when the number of the parameter sets referred to by the current slice is greater than 1, if there are one or more existing parameter sets in which the coding tool parameters are identical to one or more coding tool parameters used in the process of decoding the current slice, the slice refers to one or more existing parameters to get the coding tool parameters to encode the current slice or decode the bit-stream of the current slice.

A method for encoding parameter sets at slice level according to an embodiment of the disclosure mainly includes: when there are one or more existing parameter sets, in which the coding tool parameters are identical to the coding tool parameters of a part of coding tools used for the current slice, one or more identifiers of the one or more parameter sets are encoded into a bit-stream of the current slice, wherein the said parameter set refers to a data structure containing common information of one or more coding tools used in the process of encoding/decoding one or more slices, that is, the parameter set may be the APS mentioned in the following content.

The method further includes: generating one or more APSs and encoding in the one or more APSs the coding tool parameters of the other part of coding tools used for the current slice, allocating an identifier to each generated APS, and encoding the identifier of each generated APS into the bit-stream of the current slice.

Generating one or more APSs and encoding in the one or more APSs the coding tool parameters of the other part of coding tools used for the current slice include:

when the other part of coding tools used for the current slice includes two or more coding tools, generating one or more APSs and encoding in one APS the coding parameters of one or more coding tools.

Preferably, generating one or more APSs and encoding in the one or more APS the coding tool parameters of the other part of coding tools used for the current slice include: when the other part of coding tools used for the current slice includes two or more coding tools, separately generating APSs corresponding to each coding tool respectively, encoding in one APS the coding tool parameters of one coding tool and allocating an APS identifier to each APS, and encoding the identifier of each APS into the bit-stream of the current slice;

or, when the other part of coding tools used for the current slice includes two or more coding tools, generating one APS, encoding in this APS the coding tool parameters of the two or more coding tools and allocating an APS identifier to the APS, and encoding the identifier of the APS into the bit-stream of the current slice.

Allocating an APS identifier to the APS includes: determining candidate identifiers according to the multi-APS overwriting mode adopted in the process of encoding/decoding the current slice, selecting one from the determined candidate identifiers, and allocating the selected identifier to the APS.

Preferably, the method further includes: determining whether there are one or more existing APSs, in which the coding tool parameters are identical to the coding tool parameters of a part of coding tools used for encoding/decoding the current slice.

During practical application, the encoding method may be embodied as: pre-configuring the identifiers for the parameter sets corresponding to different coding tools; when there are one or more existing parameter sets, in which the coding tool parameters are identical to the coding tool parameters of a part of coding tools used for the current slice, setting the value of the parameter set identifier to the value of the preconfigured parameter set identifier of the parameter set corresponding to the coding tools, and then encoding the identifier of the parameter set into the bit-stream of the current slice.

A method for decoding parameter sets at slice level according to an embodiment of the disclosure, as shown in FIG. 1, mainly includes the following steps.

Step 101: a plurality of APSs referred to by the current slice are decoded according to the APS identifiers in the bit-stream of the current slice.

Step 102: the coding tool parameters used in the process of decoding the current slice are determined, and the parameter values of the determined coding tool parameters are assigned to the corresponding variables in the data structure of the current slice.

Preferably, determining the coding tool parameters used in the process of decoding the current slice may include:

for each coding tool, if there is only one APS, in which the On/Off flag of the coding tool is 1 (i.e. On), in the plurality of APSs referred to by the current slice, then determining that the coding tool parameters of the coding tool in this APS are used in the process of decoding the current slice.

Preferably, determining the coding tool parameters used in the process of decoding the current slice may include: determining the coding tool parameters of the coding tool used in the process of decoding the current slice, according to a preconfigured corresponding relationship between the parameter set identifier and the coding tool.

Preferably, determining the coding tool parameters used in the process of decoding the current slice may further include: determining the coding tool parameters used in the process of decoding the current slice, according to a preset multi-APS overwriting mode.

Determining the coding tool parameter used in the process of decoding the current slice according to the preset multi-APS overwriting mode may include:

for each coding tool, if, in the APS with its identifier equal to aps_id[n], the flag used for indicating that this APS contains the information of the coding tool parameters is 1, overwriting the coding tool parameters of the coding tool previously determined for decoding the current slice with the coding tool parameters of the coding tool in this APS, wherein n is an integer, not less than 1 but not greater than the number of APSs referred to by the current slice;

or, according to a flag used for indicating the adopted multi-APS overwriting mode used for decoding the current slice, determining the multi-APS overwriting mode needed in the process of decoding the current slice, and determining the coding tool parameters used in the process of decoding the current slice based on the determined multi-APS overwriting mode.

The binary representation of the flag used for indicating the adopted multi-APS overwriting mode includes one or more bits, wherein each bit indicates the multi-APS overwriting mode for the process of determining the coding parameters of one coding tool.

The flag used for indicating the adopted multi-APS overwriting mode is obtained based on an absolute difference between the APS identifiers given by aps_id[i] and aps[i−1], wherein i is an integer, not less than 1 but not greater than the number of APSs referred to in the process of decoding the current slice.

Correspondingly, an embodiment of the disclosure also provides an encoder for encoding parameter sets at slice level. The encoder includes a determination module and an encoding module, wherein the determination module is configured to: when determining that there are one or more existing APSs, in which the coding tool parameters are identical to the coding tool parameters of a part of coding tools used for the current slice, notify the encoding module to refer to the one or more APSs; the encoding module is configured to encode one or more identifiers of the one or more APSs into the bit-stream of the current slice when receiving the notification from the determination module.

The encoding module may be further configured to: generate one or more APSs and encode in the one or more APSs the coding tool parameters of the other part of coding tools used for the current slice, allocate an identifier to each generated APS, and encode the identifier of each generated APS into the bit-stream of the current slice.

The encoding module may be further configured to set the identifier of the parameter set to a preconfigured identifier of the parameter set corresponding to the coding tool, and then encode the identifier of the parameter set into the bit-stream of the current slice.

The determination module may be further configured to determine whether there are one or more existing APSs, in which the coding tool parameters are identical to the coding tool parameters of a part of coding tools used for the current slice. Here, when determining that there is no existing APS, in which the coding tool parameters are identical to the coding tool parameters of a part of coding tools used for the current slice, the determination module notifies the encoding module that there is no existing APS in which the coding tool parameters are identical to the coding tool parameters of a part of coding tools used for the current slice. After receiving the notification, the encoding module generates one or more APSs, encodes in each generated APS the coding tool parameters of the coding tools used for the current slice, allocates an identifier to each generated APS, and encodes the identifier of each generated APS into the bit-stream of the current slice.

Correspondingly, an embodiment of the disclosure provides a decoder for decoding parameter sets at slice level. The decoder includes a decoding module, a determination module and a value assignment module, wherein the decoding module is configured to decode a plurality of APSs referred to by the current slice according to the APS identifiers in the bit-stream of the current slice; the determination module is configured to determine the coding tool parameters used in the process of decoding the current slice, according to the coding tool parameters in the plurality of APSs obtained when the decoding module decodes the plurality of APSs referred to by the current slice; the value assignment module is configured to assign the parameter values of the coding tool parameters determined by the determination module to the corresponding variables in the data structure of the current slice.

Preferably, the determination module may be configured to: for each coding tool, if there is only one APS, in which the On/Off flag of the coding tool is 1 (i.e. On), in the plurality of APSs referred to by the current slice, determine that the coding tool parameters of the coding tools in this APS are used in the process of decoding the current slice.

Preferably, the determination module may be configured to determine the coding tool parameters of the coding tool used in the process of decoding the current slice, according to a preconfigured corresponding relationship between the parameter set identifier and the coding tool.

Preferably, the determination module may be configured to determine the coding tool parameters used in the process of decoding the current slice, according to a preset multi-APS overwriting mode.

Figure 2:
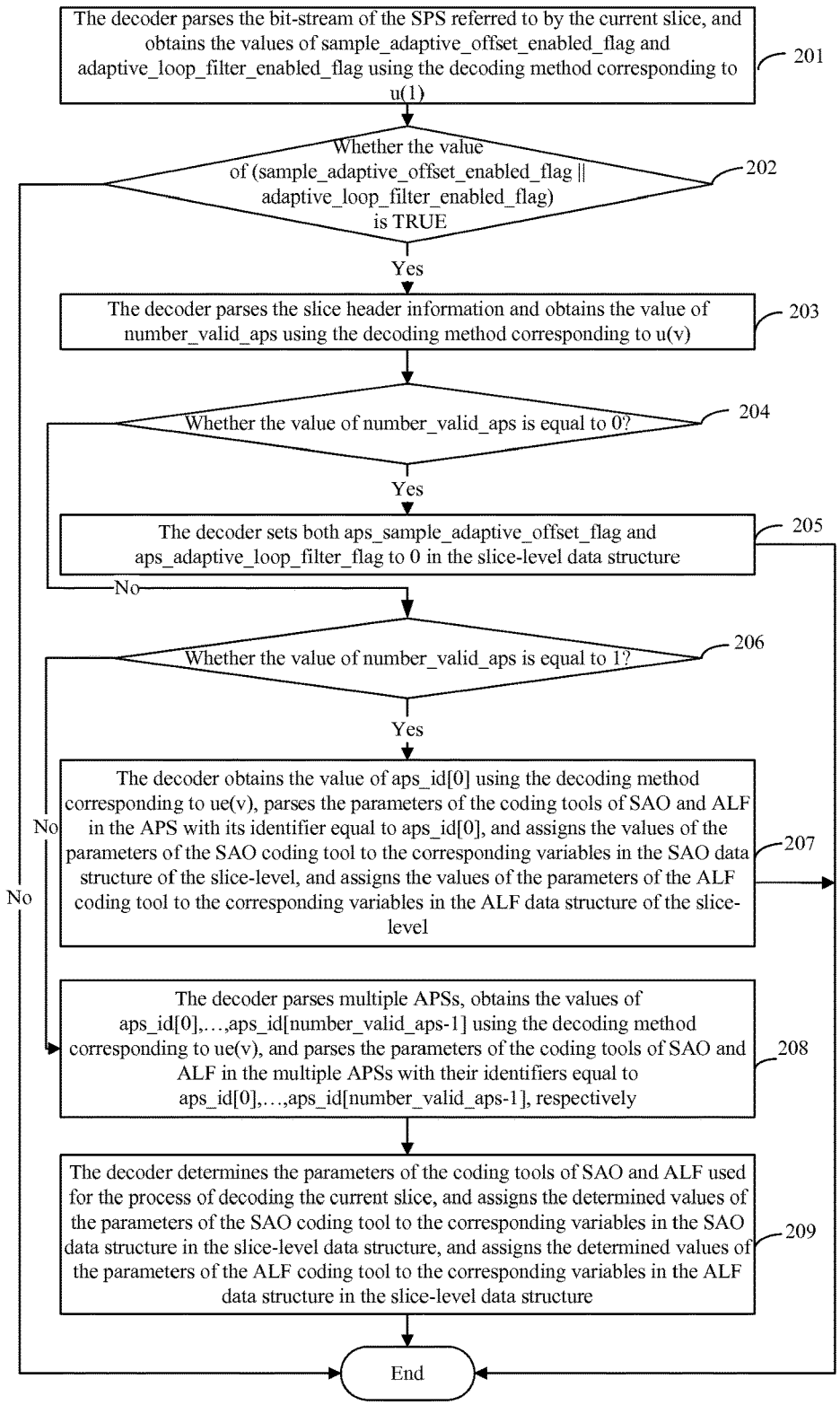
FIG. 2 shows an implementation flowchart of decoding a slice-level multi-APS bit-stream according to Embodiment 1 of the disclosure.

Correspondingly, an embodiment of the disclosure provides an electronic device, which as shown in FIG. 2 includes the encoder and the decoder described above.

The coding tool in the embodiments of the disclosure may include: a picture-level coding tool and/or a picture-level or slice-level management module, wherein the picture-level coding tool includes: SAO, ALF, WP and the like; the picture-level or slice-level management module includes: DPB management module, reference picture marking and adjustment module, reference picture list construction module and the like.

Embodiment 1 to Embodiment 6 of the disclosure are described by taking SAO and ALF picture-level coding tools as an example. Embodiment 7 to Embodiment 10 further describe the implementation of performing encoding/decoding using the picture-level coding tool as well as the picture-level or slice-level management module on the basis of Embodiment 1 to Embodiment 6. In each embodiment described hereinafter, it is supposed that both SAO and ALF are allowed in the encoding/decoding process.

In each embodiment described hereinafter, when using multiple APSs, the encoder needs to ensure that the decoder can obtain the tool parameters of a picture-level coding tool consistent with that used by the encoder according to the parsing process of the slice-level multi-APS bit-stream of the decoder in this embodiment.

In each embodiment described hereinafter, the implementation of the encoder is one of the possible implementations of the encoder as described in this embodiment, any encoder implementation which can generate a bit-stream meeting the requirement of the bit-stream parsing process of the decoder can serve as possible implementation of the encoder in this embodiment.

Embodiment 1

In this embodiment, the structure of the used APS bit-stream is as shown in Table 1.

TABLE 1

|  | Descriptor |
|---|---|
| aps_rbsp( ) { |  |
|   aps_id | ue(v) |
|   aps_sample_adaptive_offset_flag | u(1) |
|   aps_adaptive_loop_filter_flag | u(1) |
|   if( aps_sample_adaptive_offset_flag \|\| |  |
|   aps_adaptive_loop_filter_flag) { |  |
|     aps_cabac_use_flag | u(1) |
|     if( aps_cabac_use_flag ) { |  |
|       aps_cabac_init_idc | ue(v) |
|       aps_cabac_init_qp_minu26 | se(v) |
|     } |  |
|   } |  |
|   if( aps_adaptive_loop_filter_flag ) { |  |
|     alf_data_byte_count | u(8) |
| /*   byte_align( )  this byte align to happen between the non-CABAC and CABAC parts of the alf_param( ) Once there is an all CABAC alf_param( ), enable this byte_align( ) */ |  |
|     alf_param( ) |  |
|     byte_align( ) |  |
|   } |  |

TABLE 1-continued

|  | Descriptor |
|---|---|
|   if( aps_sample_adaptive_offset_flag ) { |  |
|     sao_data_byte_count /* to enable skipping past data without parsing it */ | u(8) |
|     byte_align ( ) |  |
|     sao_param( ) |  |
| /*   byte_align( ) this final byte align unnecessary as being taken care of by rbsp_trailing_bits( ) */ |  |
|   } |  |
|   rbsp_trailing_bits( ) |  |
| } |  |

In Table 1, column Descriptor gives the binary representation of the value of each syntax element. The encoder encodes a related syntax element using a corresponding binary representation, and the decoder decodes a related syntax element using a corresponding binary representation.

In encoding and decoding processes, both encoder and decoder can reserve a copy of APS parameters at slice level, wherein the APS parameters at slice level may be derived from a single APS or from multiple APSs.

This embodiment allows a slice to refer to the coding tool parameters given in multiple APSs. The indication method of the multiple APSs in the slice header is as shown in Table 2. This embodiment signals the APS indication information in slice header, specifically as shown in Line 6 to Line 13 in Table 2.

TABLE 2

|  | Descriptor |
|---|---|
| slice_header( ) { |  |
|   lightweight_slice_flag | u(1) |
|   if( !lightweight_slice_flag ) { |  |
|     slice_type | ue(v) |
|     pic_parameter_set_id | ue(v) |
|     if( sample_adaptive_offset_enabled_flag \|\| adaptive_loop_filter_enabled_flag ) { |  |
|       number_valid_aps | u(v) |
|       if (number_valid_aps != 0 ) { |  |
|         for (i = 0; i < number_valid_aps; i++) { |  |
|           aps_id[i] | ue(v) |
|         } |  |
|       } |  |
|     } |  |
|     ...... |  |
|   } |  |
|   ...... |  |
|   if( !lightweight_slice_flag ) { |  |
|     ...... | se(v) |
|     if( adaptive_loop_filter_enabled_flag && aps_adaptive_loop_filter_flag ) { |  |
|       byte_align( ) |  |
|       alf_cu_control_param( ) |  |
|       byte_align( ) |  |
|     } |  |
|   } |  |
| } |  |

In Table 2, number_valid_aps indicates the number of APS referred to in the process of encoding/decoding the current slice, and is an integer in the range of [0, MaxNumberValidAps]. If the syntax element number_valid_aps is not provided in the bit-stream, the value is inferred to be 0 by default. The upper limit MaxNumberValidAps of number_valid_aps can be determined according to the number of available picture-level coding tools in profile/level.

In Table 2, aps_id[i] indicates the identifier of the APS referred to in the process of encoding/decoding the current slice, where i is an integer in the range of [0, number_valid_aps−1].

When the value of number_valid_aps is 0, it indicates that no APS is referred to in the process of encoding/decoding the current slice, that is, none of the APSs are applied to the process of encoding/decoding the current slice.

When the value of number_valid_aps is 1, it indicates that one APS is referred to in the process of encoding/decoding the current slice, and at this time the identifier of the APS is aps_id[0]; the parameters of the coding tools of SAO and ALF are given in the APS with its identifier equal to aps_id[0]. In this case, according to the values of the SAO On/Off flag aps_sample_adaptive_offset_flag and the ALF On/Off flag aps_adaptive_loop_filter_flag in the APS, the decoder sets the values of the aps_sample_adaptive_offset_flag and aps_adaptive_loop_filter_flag in the slice-level data structure.

When the value of number_valid_aps is greater than 1, it indicates that multiple APSs are referred to in the process of encoding/decoding the current slice, and the identifiers of the APSs referred to by the current slice are identified by aps_id[0], aps_id[1], . . . , aps_id[number_valid_aps−1] respectively. When there is only one APS, in which the value of aps_sample_adaptive_offset_flag is 1, in the multiple APSs, SAO is used in the process of decoding the current slice and the parameters of the SAO coding tool are given in this APS; when there is only one APS, in which the value of aps_adaptive_loop_filter_flag is 1, in the multiple APSs, ALF is used in the process of decoding the current slice and the parameters of the ALF coding tool are given in this APS. If there are multiple APSs in which the value of aps_sample_adaptive_offset_flag is 1, the decoder does not use SAO in the process of decoding the current slice and the decoder sets the value of aps_sample_adaptive_offset_flag to 0 in the slice-level data structure. If there are multiple APSs in which the value of aps_adaptive_loop_filter_flag is 1, the decoder does not use ALF in the process of decoding the current slice and the decoder sets the value of aps_adaptive_loop_filter_flag to 0 in the slice-level data structure.

Corresponding to Table 2, the process that the decoder decodes a slice-level multi-APS bit-stream in this embodiment, as shown in FIG. 2, may include the following steps.

Step 201: the decoder parses an SPS bit-stream referred to by the current slice, and obtains the values of sample_adaptive_offset_enabled_flag and adaptive_loop_filter_enabled_flag using the decoding method corresponding to u(1).

Here, both sample_adaptive_offset_enabled_flag and adaptive_loop_filter_enabled_flag are flags contained in the slice-level data structure, wherein sample_adaptive_offset_enabled_flag indicates whether SAO is allowed to be used in the process of encoding/decoding the current slice, and adaptive_loop_filter_enabled_flag indicates whether ALF is allowed to be used in the process of encoding/decoding the current slice.

Step 202: the decoder determines whether the value of (sample_adaptive_offset_enabled_flag|| adaptive_loop_filter_enabled_flag) is TRUE; if TRUE, Step 203 is executed; if FALSE, current decoding process ends.

Step 203: the decoder parses the slice header and obtains the value of number_valid_aps using the decoding method corresponding to u(v).

Step 204: if the value of number_valid_aps is equal to 0, Step 205 is executed; if the value of number_valid_aps is not equal to 0, Step 206 is executed.

Step 205: no APS is referred to in the process of decoding the current slice, neither SAO nor ALF is used in the decoding process, both aps_sample_adaptive_offset_flag and aps_adaptive_loop_filter_flag are set to 0 in the slice-level data structure. Current decoding process ends.

Step 206: if the value of number_valid_aps is equal to 1, Step 207 is executed; if the value of number_valid_aps is not equal to 1, Step 208 is executed.

Step 207: only one APS is referred to in the process of decoding the current slice; the decoder obtains the value of aps_id[0] using the decoding method corresponding to ue(v), parses the parameters of the coding tools of SAO and ALF in the APS with its identifier equal to aps_id[0], and assigns the values of the parameters of the SAO coding tool to the corresponding variables in the slice-level SAO data structure, and assigns the values of the parameters of the ALF coding tool to the corresponding variables in the ALF data structure. Current decoding process ends.

Step 208: multiple APSs are referred to in the process of decoding the current slice; the decoder parses multiple APSs, obtains the values of aps_id[0], aps_id[1], . . . , aps_id[number_valid_aps−1] using the decoding method corresponding to ue(v), and parses the parameters of the coding tools of SAO and ALF in the multiple APSs with their identifiers equal to aps_id[0], aps_id[1], . . . , aps_id [number_valid_aps−1] respectively.

Step 209: the decoder determines the parameters of the coding tools of SAO and ALF used in the process of decoding the current slice according to the parameters of the coding tools of SAO and ALF obtained by decoding the multiple APSs, and assigns the parameter values of the determined values of the parameters of the SAO coding tool to the corresponding variables in the SAO data structure in the slice-level data structure and assigns the parameter values of the determined values of the parameters of the ALF coding tool to the corresponding variables in the ALF data structure in the slice-level data structure. Current decoding process ends.

Figure 3:
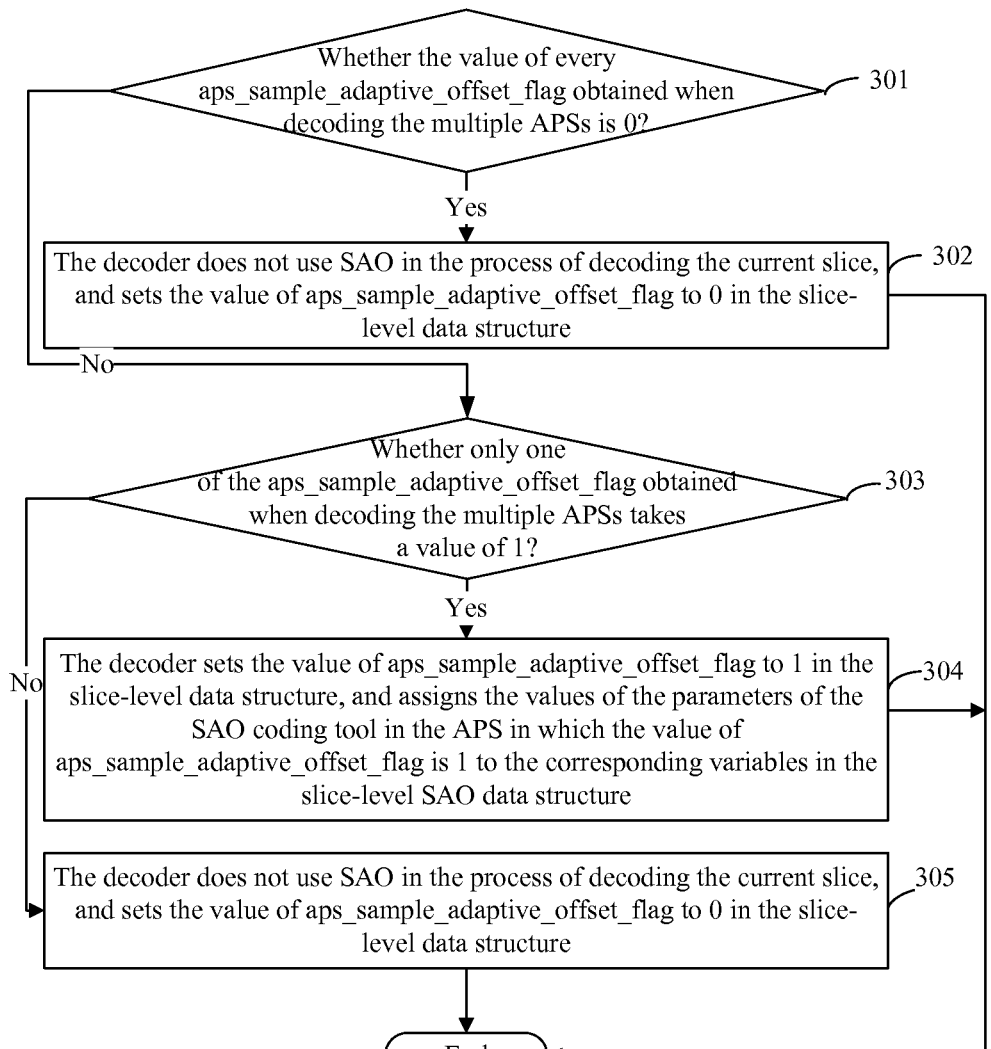
FIG. 3 shows an implementation flowchart of the process of determining the parameters of the SAO coding tool in Step 209 shown in FIG. 2.

As shown in FIG. 3, the process of determining and assigning the parameters of the SAO coding tool in Step 209 includes the following steps.

Step 301: if the value of every aps_sample_adaptive_offset_flag obtained when the decoder decodes the multiple APSs is 0, Step 302 is executed; otherwise, Step 303 is executed.

Step 302: the decoder does not use SAO in the process of decoding the current slice, and sets the value of aps_sample_adaptive_offset_flag to 0 in the slice-level data structure. Current process ends.

Step 303: if only one of the aps_sample_adaptive_offset_flag obtained when the decoder decodes the multiple APSs takes a value of 1, Step 304 is executed; if two or more of the aps_sample_adaptive_offset_flag obtained when the decoder decodes the multiple APSs take a value of 1, Step 305 is executed.

Step 304: the decoder uses SAO in the process of decoding the current slice, sets the value of aps_sample_adaptive_offset_flag to 1 in the slice-level data structure, and assigns the values of the parameters of the SAO coding tool in the APS in which the value of aps_sample_adaptive_offset_flag is 1 to the corresponding variables in the slice-level SAO data structure. Current process ends.

Step 305: the decoder does not use SAO in the process of decoding the current slice, and sets the value of aps_sample_adaptive_offset_flag to 0 in the slice-level data structure. Current process ends.

Figure 4:
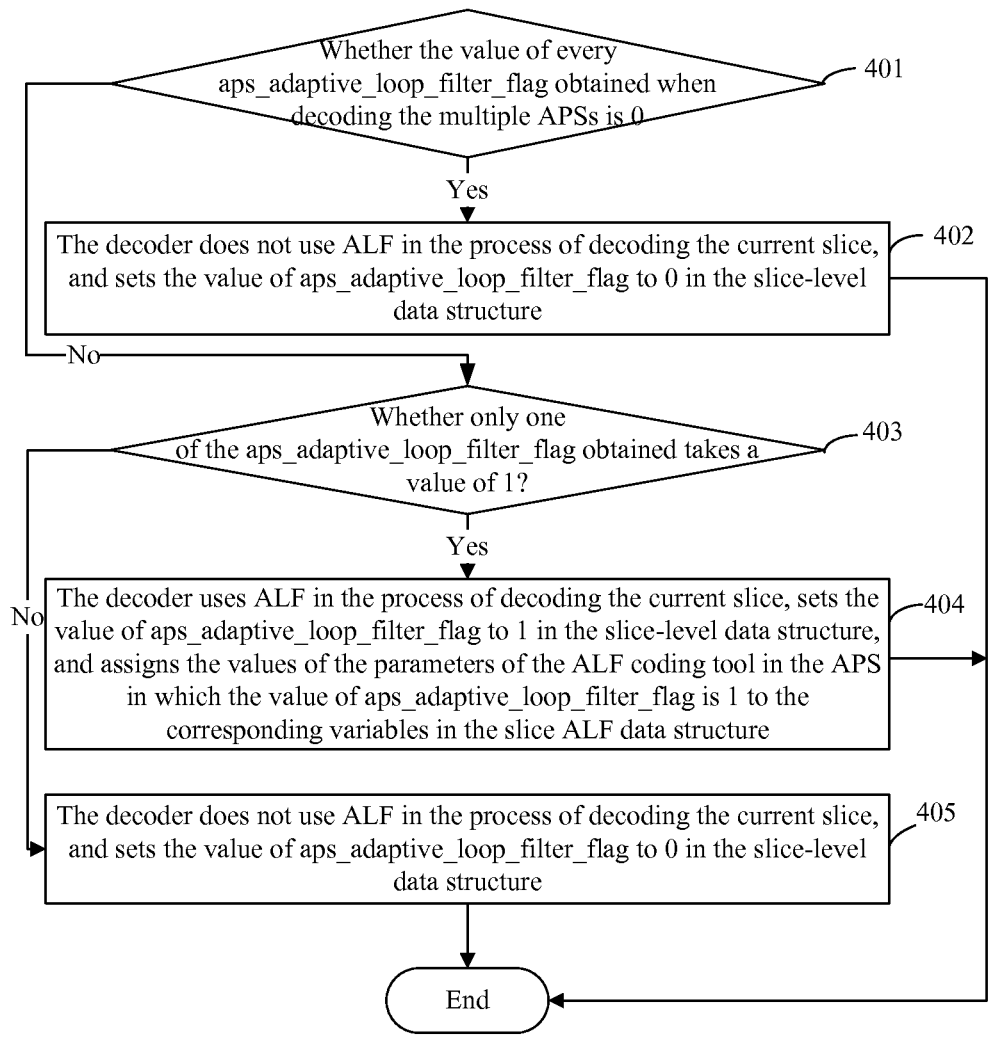
FIG. 4 shows an implementation flowchart of the process of determining the parameters of the ALF coding tool in Step 209 shown in FIG. 2.

As shown in FIG. 4, the process of determining and assigning the values of the parameters of the ALF coding tool in Step 209 includes the following steps.

Step 401: if the value of every aps_adaptive_loop_filter_flag obtained when the decoder decodes the multiple APSs is 0, Step 402 is executed; otherwise, Step 403 is executed.

Step 402: the decoder does not use ALF in the process of decoding the current slice, and sets the value of aps_adaptive_loop_filter_flag to 0 in the slice-level data structure. Current process ends.

Step 403: if only one of the aps_adaptive_loop_filter_flag obtained when the decoder decodes the multiple APSs takes a value of 1, Step 404 is executed; if two or more of the aps_adaptive_loop_filter_flag obtained when the decoder decodes the multiple APSs take a value of 1, Step 405 is executed.

Step 404: the decoder uses ALF in the process of decoding the current slice, sets the value of aps_adaptive_loop_filter_flag to 1 in the slice-level data structure, and assigns the values of the parameters of the ALF coding tool in the APS in which the value of aps_adaptive_loop_filter_flag is 1 to the corresponding variables in the slice-level ALF data structure. Current process ends.

Step 405: the decoder does not use ALF in the process of decoding the current slice, and sets the value of aps_adaptive_loop_filter_flag to 0 in the slice-level data structure. Current process ends.

Figure 5:
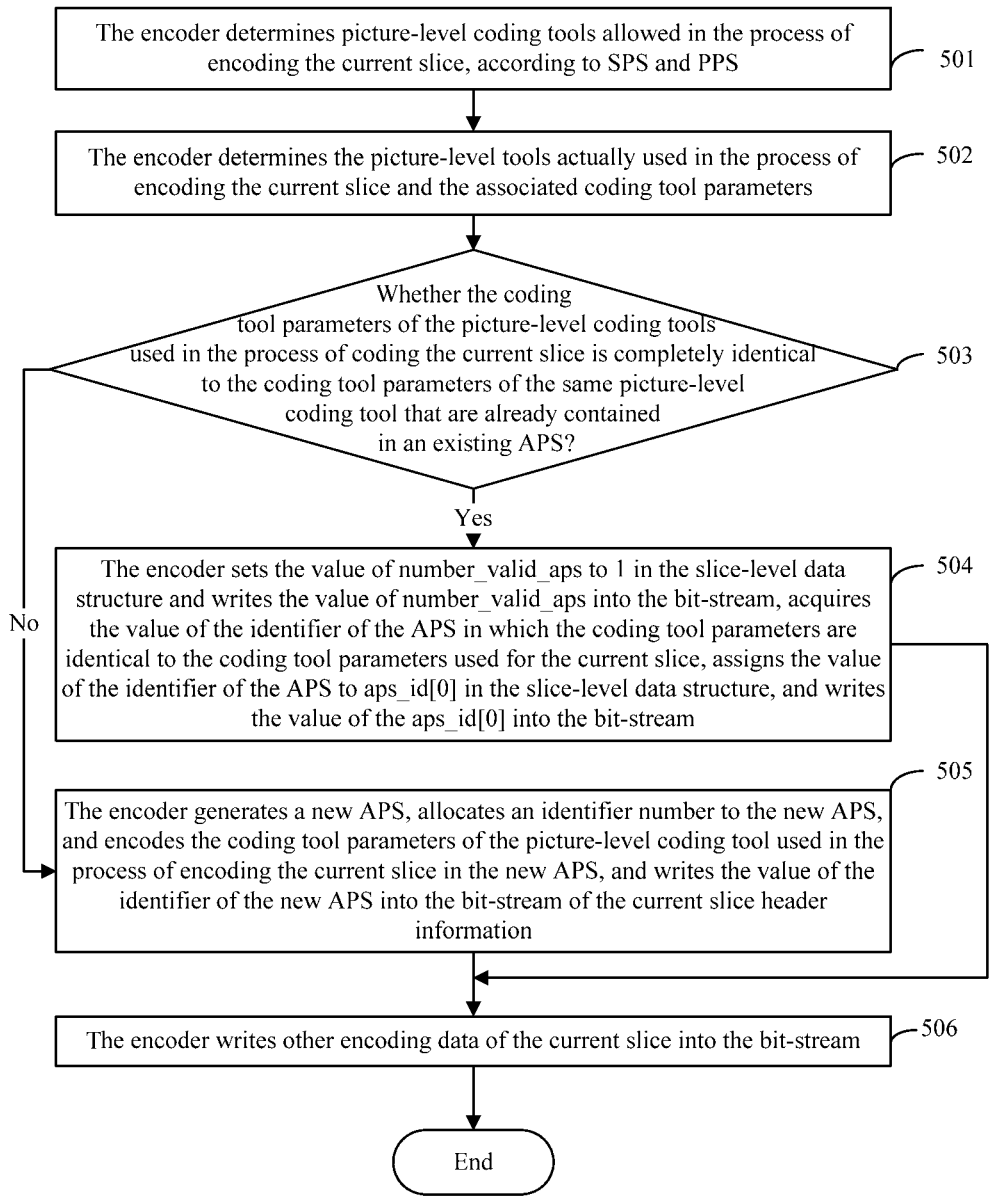
FIG. 5 shows an implementation flowchart of encoding a slice-level multi-APS bit-stream according to Embodiment 1 of the disclosure.

Correspondingly, the process that the encoder encodes a slice-level multi-APS bit-stream in this embodiment, as shown in FIG. 5, may include the following steps.

Step 501: the encoder determines picture-level coding tools allowed to be used in the process of encoding the current slice, according to SPS and PPS.

Preferably, the encoder can determine whether a picture-level coding tool is allowed to be used in the process of encoding the current slice, according to the value of the flag in SPS indicating whether the picture-level coding tool is allowed. For example, in SPS, if the value of sample_adaptive_offset_enabled_flag is 1, SAO is allowed to be used in the encoding process, and, if the value of sample_adaptive_offset_enabled_flag is 0, SAO is not allowed to be used in the encoding process.

Step 502: the encoder determines the picture-level tool actually used in the process of encoding the current slice and the coding tool parameters of the picture-level tool.

The encoder can determine when to use a picture-level coding tool in the process of encoding the current slice using the parameter calculation method of each picture-level coding tool in conjunction with the rate-distortion optimization method, and determine, in the condition that the picture-level coding tool is used, other parameters of the coding tool. The specific implementation can refer to conventional art, no further description is needed here.

Step 503: if the coding tool parameters of the picture-level coding tool used for encoding the current slice are completely identical to the coding tool parameters of the same picture-level coding tool that are already contained in an existing APS, Step 504 is executed; otherwise, Step 505 is executed.

Step 504: the encoder sets the value of number_valid_aps to 1 in the slice-level data structure and writes the value of number_valid_aps into the bit-stream using an encoding method corresponding to u(v), acquires the identifier of the APS in which the coding tool parameters are identical to the coding tool parameters corresponding to the current slice, assigns the value of the APS identifier to aps_id[0] in the slice-level data structure, and writes the value of aps_id[0] into the bit-stream using the encoding method corresponding to ue(v). Then, Step 506 is executed.

Step 505: the encoder generates a new APS, allocates an identifier to the new APS, and encodes in the new APS the coding tool parameters of the picture-level coding tools used for the current slice, and writes the value of the identifier of the new APS into the bit-stream of the slice header of the current slice. Then, Step 506 is executed.

Step 506: the encoder writes other encoding data of the current slice into the bit-stream, and the process of encoding the multi-APS bit-stream of the current slice ends.

When using multiple APSs, the encoder needs to ensure that the decoder can perform corresponding decoding according to the above process of decoding the slice-level multi-APS bit-stream, that is, to ensure that the decoder can obtain the same tool parameters of the picture-level coding tools as the encoder.

In Step 505, the encoder can determine the generation method of the new APS and the encoding method of the identifier of this new APS, according to whether the current slice uses a slice-level coding tool, whether the coding tool parameters of one or more picture-level coding tools in the tools used for the current slice are identical to the coding tool parameters of the corresponding one or more picture-level coding tools that are already contained in one or more existing APSs, and whether the picture-level coding tools used for the current slice are to be applied to the process of encoding subsequent slices.

Figure 6:
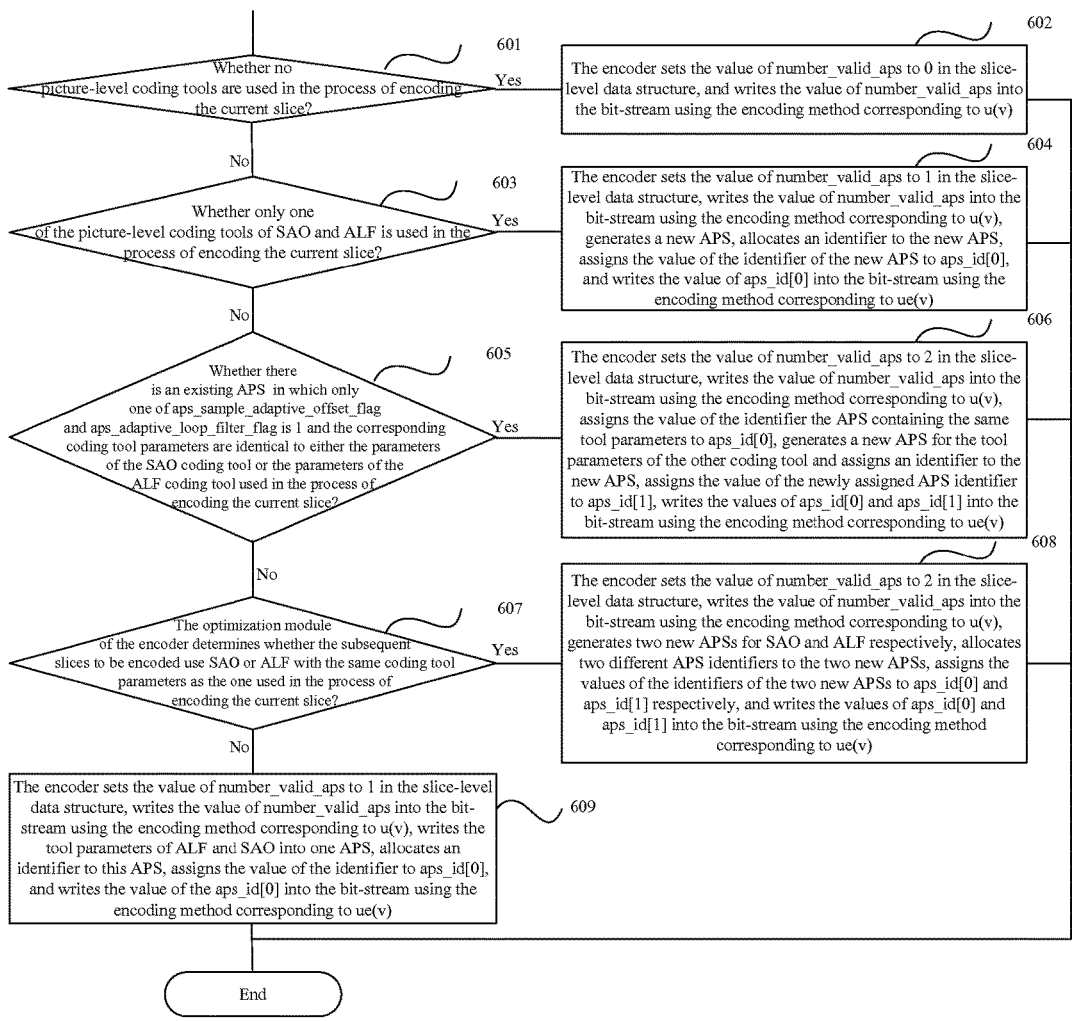
FIG. 6 shows a flowchart of the implementation of Step 505 shown in FIG. 5.

The implementation of generating a new APS, allocating an identifier to the new APS and writing the value of the APS identifier into the slice header in Step 505, as shown in FIG. 6, may include the following steps.

Step 601: it is determined whether the encoder uses no picture-level coding tools in the process of encoding the current slice, if so, Step 602 is executed; otherwise, Step 603 is executed.

Step 602: the encoder sets the value of number_valid_aps to 0 in the slice-level data structure, and writes the value of number_valid_aps into the bit-stream using the encoding method corresponding to u(v). Current process ends.

Step 603: if the encoder uses only one picture-level coding tool of SAO or ALF in the process of encoding the current slice, Step 604 is executed; if the encoder uses both picture-level coding tools of SAO and ALF in the process of encoding the current slice, Step 605 is executed.

Step 604: the encoder sets the value of number_valid_aps to 1 in the slice-level data structure, writes the value of number_valid_aps into the bit-stream using the encoding method corresponding to u(v), generates a new APS, encodes in this new APS the coding tool parameters of the picture-level coding tools used in the process of encoding the current slice, allocates an identifier to the generated APS, assigns the value of the identifier of the new APS to aps_id[0], and writes the value of aps_id[0] into the bit-stream using the encoding method corresponding to ue(v). Current process ends.

Step 605: the encoder determines whether there is an existing APS, in which only the value of aps_sample_adaptive_offset_flag or aps_adaptive_loop_filter_flag is 1 and the corresponding coding tool parameters are identical to the parameters of the SAO coding tool or the parameters of the ALF coding tool used for the current slice; if so, Step 606 is executed; otherwise, Step 607 is executed.

Step 606: the encoder sets the value of number_valid_aps to 2 in the slice-level data structure, writes the value of number_valid_aps into the bit-stream using the method corresponding to u(v), assigns to aps_id[0] the value of the identifier of the APS in which the coding tool parameters are identical to either the parameters of the SAO coding tool or the parameters of the ALF coding tool used for the current slice, generates a new APS and encodes in this new APS the ones, which are not identical to the ones in this existing APS, in the parameters of the SAO coding tool and the parameters of the ALF coding tool used for the current slice, and assigns the value of the identifier of the new APS to aps_id[1], writes the aps_id[0] and aps_id[1] into the bit-stream using the encoding method corresponding to ue(v). Current process ends.

Step 607: the encoder determines whether it is needed to use the SAO or ALF having the same coding tool parameters as the SAO or ALF used for the current slice in the process of encoding subsequent slices; if so, Step 608 is executed; otherwise, Step 609 is executed.

Step 608: the encoder sets the value of number_valid_aps to 2 in the slice-level data structure, writes the value of number_valid_aps into the bit-stream using the method corresponding to u(v), generates two new APSs and encodes in one new APS the parameters of the SAO coding tool used for the current slice and in the other new APS the parameters of the ALF coding tool used for the current slice, allocates different APS identifiers to the two new APSs generated, assigns the values of the identifiers of the two new APSs to aps_id[0] and aps_id[1] respectively, and writes the values of aps_id[0] and aps_id[1] into the bit-stream using the encoding method corresponding to ue(v) respectively. Current process ends.

Here, when the encoder generates a separate APS for one picture-level coding tool, in this generated APS, the On/Off flags of other picture-level coding tools are set to 0 (i.e. Off); and auxiliary parameters used for other picture-level coding tools are not contained in this generated APS.

Step 609: the encoder sets the value of number_valid_aps to 1 in the slice-level data structure, writes the value of number_valid_aps into the bit-stream using the encoding method corresponding to u(v), generates a new APS and encodes in this new APS the parameters of the coding tools of SAO and ALF used for the current slice, allocates an identifier to the new APS, assigns the value of the identifier of the new APS to aps_id[0], and writes the value of the aps_id[0] into the bit-stream using the encoding method corresponding to ue(v). Current process ends.

Embodiment 2

The APS bit-stream structure used in this embodiment is completely identical to that used in Embodiment 1.

This embodiment allows a slice to refer to coding tools given in multiple APSs, and the indication method of the multiple APSs in the slice header is as shown in Table 2 in Embodiment 1, wherein the number_valid_aps and the implication and value of the number_valid_aps are identical to in Embodiment 1, and the only difference lies in that: when the value of number_valid_aps is greater than 1, the current slice refers to multiple APSs simultaneously; the decoder configures the ALF used in the process of decoding the current slice using the parameters of the ALF coding tool given in the APS with its identifier equal to aps_id[0], and configures the SAO used in the process of decoding the current slice using the parameters of the SAO coding tool given in the APS with its identifier equal to aps_id[1].

Figure 7:
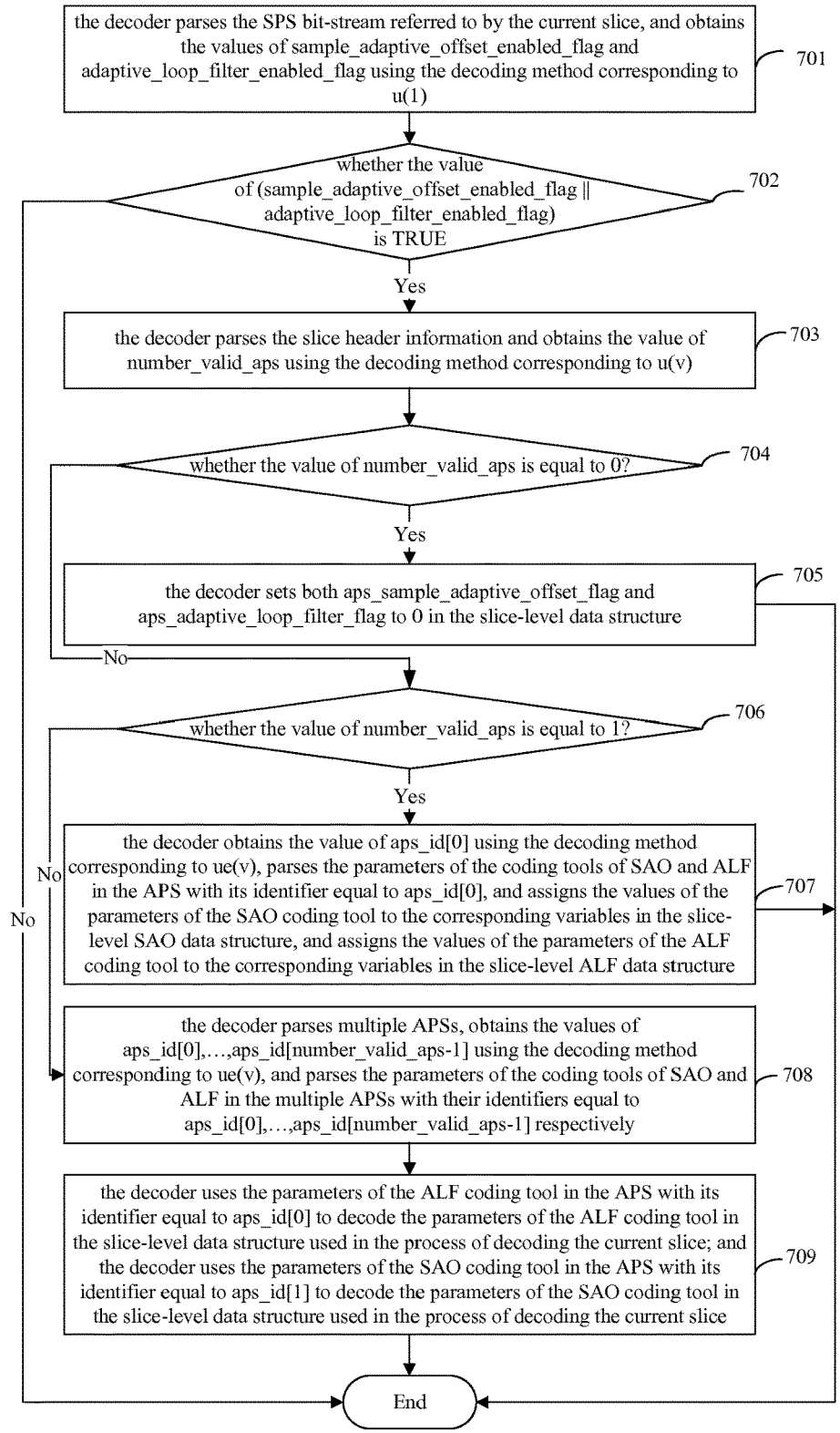
FIG. 7 shows an implementation flowchart of decoding a slice-level multi-APS bit-stream according to Embodiment 2 of the disclosure.

As shown in FIG. 7, the process that the decoder decodes a slice-level multi-APS bit-stream in this embodiment may include the following steps.

Step 701 is completely identical to Step 201.
Step 702 is completely identical to Step 202.
Step 703 is completely identical to Step 203.
Step 704 is completely identical to Step 204.
Step 705 is completely identical to Step 205.
Step 706 is completely identical to Step 206.
Step 707 is completely identical to Step 207.
Step 708 is completely identical to Step 208.

Step 709: the decoder sets the parameters of the ALF coding tool in the slice-level data structure used in the process of decoding the current slice, using the parameters of the ALF coding tool in the APS with its identifier equal to aps_id[0]; and the decoder sets the parameters of the SAO coding tool in the slice-level data structure used in the process of decoding the current slice, using the parameters of the SAO coding tool in the APS with its identifier equal to aps_id[1]. The process of decoding the multi-APS bit-stream of the current slice ends.

Figure 8:
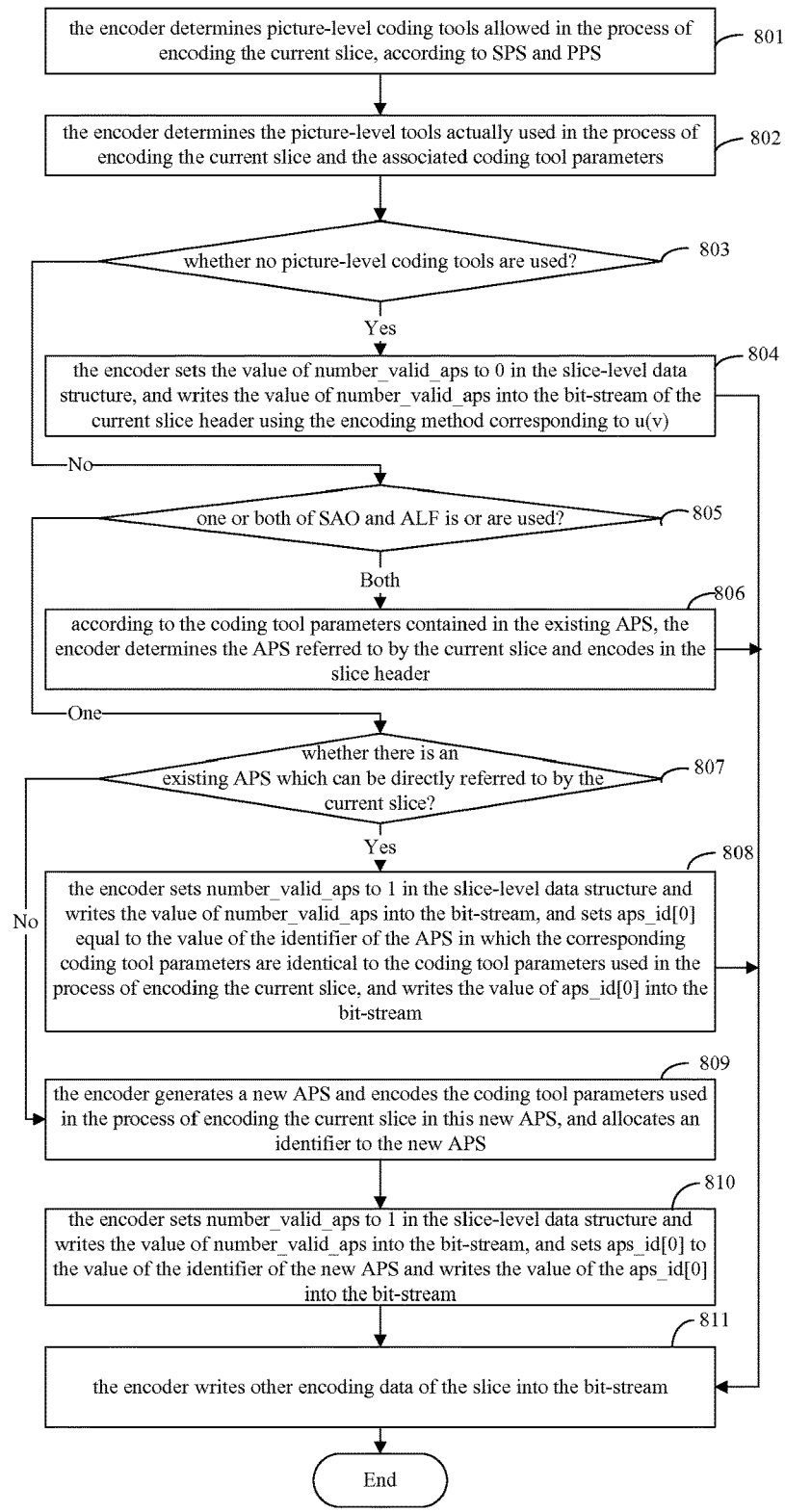
FIG. 8 shows an implementation flowchart of encoding a slice-level multi-APS bit-stream according to Embodiment 2 of the disclosure.

Corresponding to the decoding process shown in FIG. 7, the process that the encoder encodes a slice-level multi-APS bit-stream in this embodiment, as shown in FIG. 8, may include the following steps.

Step 801 is completely identical to Step 501.
Step 802 is completely identical to Step 502.

Step 803: if the encoder uses no picture-level coding tools in the process of encoding the current slice, Step 804 is executed; otherwise, Step 805 is executed.

Step 804: the encoder sets the value of number_valid_aps to 0 in the slice-level data structure, and writes the value of the number_valid_aps into the bit-stream of the current slice header using the encoding method corresponding to u(v). Then, Step 811 is executed.

Step 805: if the encoder uses both SAO and ALF in the process of encoding the current slice, Step 806 is executed; if the encoder use only one picture-level coding tool of SAO or ALF in the process of encoding the current slice, Step 807 is executed.

Step 806: according to the coding tool parameters contained in the existing APS, the encoder determines the APS referred to by the current slice and encodes in the slice header. Then, Step 811 is executed.

Step 807: the encoder determines whether there is an existing APS meeting the following conditions: the tool parameters of all picture-level coding tools in this APS are completely identical to the tool parameters of all picture-level coding tools for encoding the current slice; if so, there is an existing APS, which can be referred to by the current slice directly, then Step 808 is executed; otherwise, there is no existing APS, which can be referred to by the current slice directly, then the encoder needs to generate a new APS, and Step 809 is executed.

Step 808: the encoder sets number_valid_aps to 1 in the slice-level data structure and writes the value of the number_valid_aps into the bit-stream using the encoding method corresponding to u(v), and sets to aps_id[0] the value of the identifier of the APS in which the corresponding coding tool parameters are identical to the coding tool parameters used for encoding the current slice and writes the value of the aps_id[0] into the bit-stream using the encoding method corresponding to ue(v). Then, Step 811 is executed.

Step 809: the encoder generates a new APS and encodes in this new APS the coding tool parameters used for encoding the current slice, and allocates an identifier to the new APS.

Step 810: the encoder sets number_valid_aps to 1 in the slice-level data structure and writes the value of the number_valid_aps into the bit-stream using the encoding method corresponding to u(v), and sets to aps_id[0] the value of the identifier of the new APS and writes the value of the aps_id[0] into the bit-stream using the encoding method corresponding to ue(v).

Step 811: the encoder writes other encoding data of the slice into the bit-stream. The process of encoding the slice ends.

Figure 9:
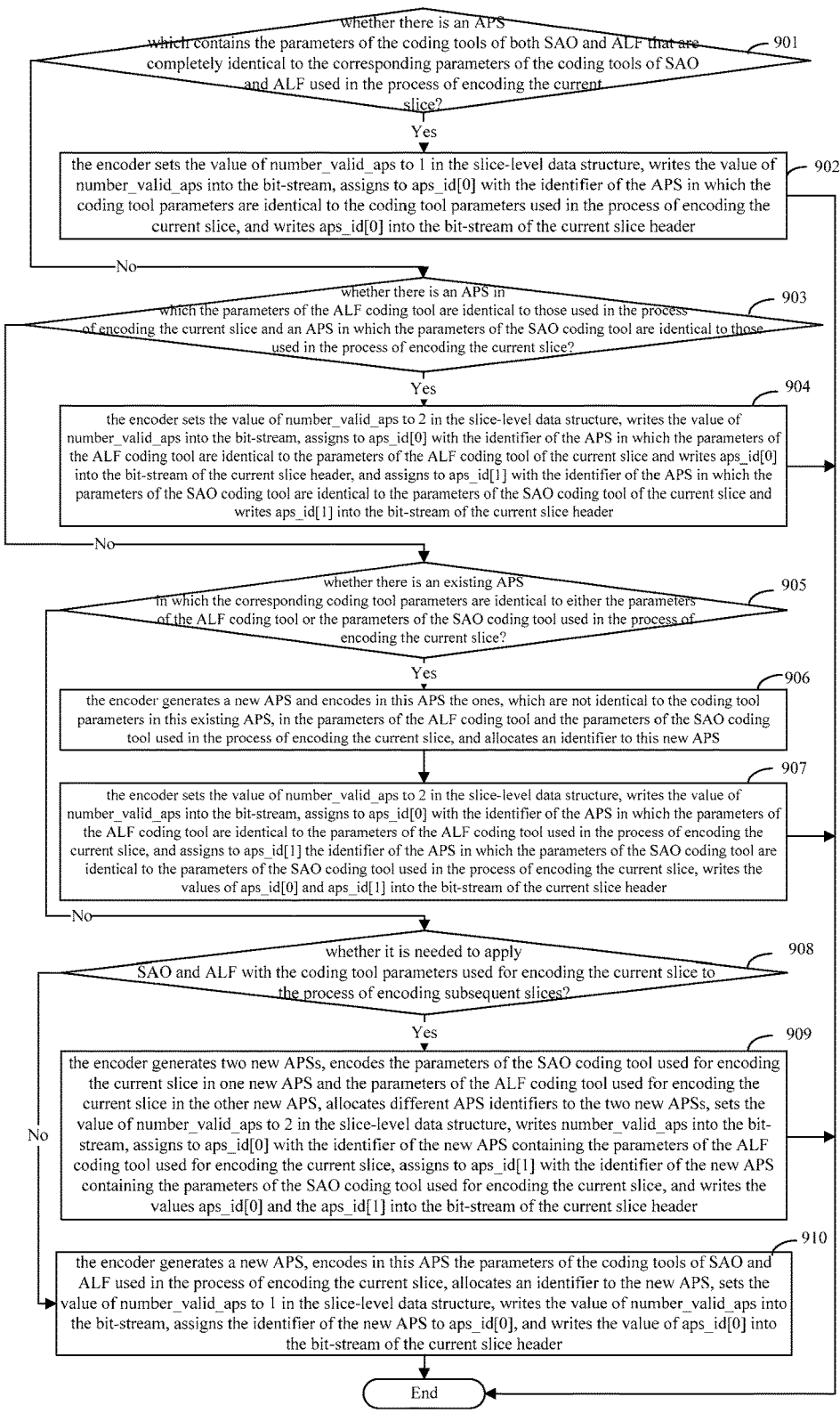
FIG. 9 shows a flowchart of the implementation of Step 806 shown in FIG. 8.

In Step 806, the encoder can determine the APS referred to by the current slice and encode in the slice header, according to whether the current slice uses a slice-level coding tool, whether the tool parameters of one or more of the used coding tools is identical to the tool parameters of the corresponding tools that are already contained in an existing APS, and whether the picture-level coding tools for the current slice are to be applied to the process of encoding subsequent slices. One implementation of Step 806, as shown in FIG. 9, may include the following steps.

Step 901: if there is an existing APS, which includes both the parameters of the coding tools of SAO and ALF that are identical to the parameters of the coding tools of SAO and ALF used for encoding the current slice, Step 902 is executed; otherwise, Step 903 is executed.

Step 902: the encoder sets the value of number_valid_aps to 1 in the slice-level data structure, writes the value of number_valid_aps into the bit-stream using the encoding method corresponding to u(v), assigns to aps_id[0] the value of the identifier of the APS in which the coding tool parameters are identical to the coding tool parameters used for the current slice, and writes the value of aps_id[0] into the bit-stream of the slice header using the method corresponding to ue(v). Current process ends.

Step 903: if, in existing APSs, there is an APS in which the parameters of the ALF coding tool are identical to the parameters of the ALF coding tool used for the current slice and an APS in which the parameters of the SAO coding tool are identical to the parameters of the SAO coding tool used for the current slice, Step 904 is executed; otherwise, Step 905 is executed.

Step 904: the encoder sets the value of number_valid_aps to 2 in the slice-level data structure, writes the value of number_valid_aps into the bit-stream using the encoding method corresponding to u(v), assigns to aps_id[0] the value of the identifier of the APS in which the parameters of the ALF coding tool are identical to the parameters of the ALF coding tool of the current slice, and assigns to aps_id[1] the value of the identifier of the APS in which the parameters of the SAO coding tool are identical to the parameters of the SAO coding tool used for the current slice, writes the values of aps_id[0] and aps_id[1] into the bit-stream of the slice header using the method corresponding to ue(v) respectively. Current process ends.

Step 905: if there is an existing APS, in which the corresponding coding tool parameters are identical to either the parameters of the ALF coding tool or the parameters of the SAO coding tool used for the current slice, Step 906 is executed; otherwise, it is needed to generate a new parameter set for the parameters of the SAO coding tool and the parameters of the ALF coding tool used for the current slice, and Step 908 is executed.

Step 906: the encoder generates a new APS and encodes in this APS the ones, which are not identical to the ones in this existing APS, in the parameters of the ALF coding tool and the parameters of the SAO coding tool used for the current slice, and allocates an identifier to this new APS.

Step 907: the encoder sets the value of number_valid_aps to 2 in the slice-level data structure, writes the value of number_valid_aps into the bit-stream using the encoding method corresponding to u(v), assigns to aps_id[0] the value of the identifier of the APS in which the parameters of the ALF coding tool are identical to the parameters of the ALF coding tool used for the current slice, and assigns to aps_id[1] the value of the identifier of the APS in which the parameters of the SAO coding tool are identical to the parameters of the SAO coding tool used for the current slice, writes the values of aps_id[0] and aps_id[1] into the bit-stream of the slice header using the method corresponding to ue(v) respectively. Current process ends.

Step 908: if it is needed to apply the parameters of the coding tools of SAO and ALF used for the current slice to the process of encoding subsequent slices, Step 909 is executed; otherwise, Step 910 is executed.

Step 909: the encoder generates two new APSs, encodes in one new APS the parameters of the SAO coding tool used for the current slice and in the other new APS the parameters of the ALF coding tool used for the current slice, allocates different APS identifiers to the two new APSs, sets the value of number_valid_aps to 2 in the slice-level data structure, writes the value of number_valid_aps into the bit-stream using the encoding method corresponding to u(v), assigns to aps_id[0] the value of the identifier of the new APS containing the parameters of the ALF coding tool used for the current slice, assigns to aps_id[1] the value of the identifier of the new APS containing the parameters of the SAO coding tool used for the current slice, and writes the values of aps_id[0] and the aps_id[1] into the bit-stream of the slice header using the method corresponding to ue(v) respectively. Current process ends.

Step 910: the encoder generates a new APS, encodes in this APS the parameters of the coding tools of SAO and ALF used for the current slice, allocates an identifier to the new APS, sets the value of number_valid_aps to 1 in the slice-level data structure, writes the value of number_valid_aps into the bit-stream using the encoding method corresponding to u(v) and assigns the value of the identifier of the new APS to aps_id[0], and writes the aps_id[0] into the bit-stream of the slice header using the method corresponding to ue(v). Current process ends.

Embodiment 3

The APS bit-stream structure used in this embodiment is completely identical to that used in Embodiment 1.

This embodiment allows a slice to refer to multiple APSs to get coding tool parameters; the indication method of multiple APSs in the slice header is as shown in Table 3. This embodiment signals the APS indication information in slice header, specifically as shown in Line 6 to Line 16 shown in Table 3.

TABLE 3

| | Descriptor |
|---|---|
| slice_header( ) { | |
|   lightweight_slice_flag | u(1) |
|   if( !lightweight_slice_flag ) { | |
|     slice_type | ue(v) |
|     pic_parameter_set_id | ue(v) |
|   if( sample_adaptive_offset_enabled_flag \|\| | |
|   adaptive_loop_filter_enabled_flag ) { | |

TABLE 3-continued

| | Descriptor |
|---|---|
| valid_aps_exist_flag | u(1) |
| if (valid_aps_exist_flag) { | |
|   if( sample_adaptive_offset_enabled_flag ) { | |
|     aps_id_sao | ue(v) |
|   } | |
|   if( adaptive_loop_filter_enabled_flag ) { | |
|     aps_id_alf | ue(v) |
|   } | |
| } | |
| } | |
| ...... | |
| } | |
| ...... | |
| } | |

In Table 3, valid_aps_exist_flag indicates whether APS is referred to in the process of encoding/decoding the current slice to get the parameters of the coding tools. When valid_aps_exist_flag is equal to 1, it indicates that a picture-level coding tool is used in the process of decoding the current slice and the picture-level coding tool is configured by referring to APS. When valid_aps_exist_flag is equal to 0, it indicates no picture-level coding tools are used in the process of decoding the current slice, and no picture-level coding tools are used in the process of decoding the current slice.

aps_id_sao indicates the identifier of the APS referred to by SAO in the process of decoding the slice, and the parameters of the SAO coding tool used in the process of decoding the slice are acquired from this APS.

aps_id_alf indicates the identifier of the APS used by ALF in the process of decoding the slice, and the parameters of the ALF coding tool used in the process of decoding the slice are acquired from this APS.

Figure 10:
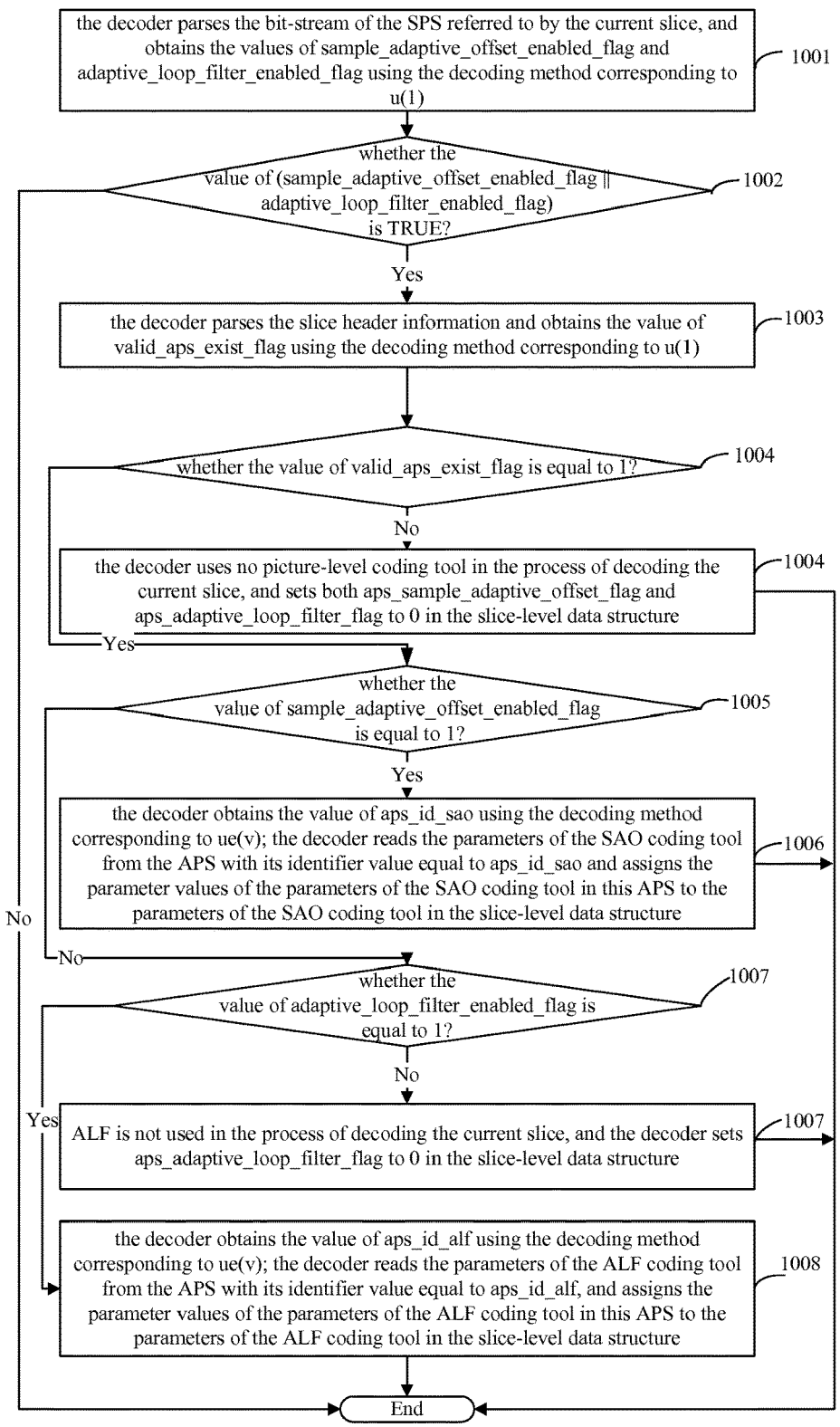
FIG. 10 shows an implementation flowchart of decoding a slice-level multi-APS bit-stream according to Embodiment 3 of the disclosure.

Based on Table 3, the process that the decoder decodes a slice-level multi-APS bit-stream in this embodiment, as shown in FIG. 10, may include the following steps.

Step 1001 is completely identical to Step 201.

Step 1002: the decoder determines whether the value of (sample_adaptive_offset_enabled_flag|| adaptive_loop_filter_enabled_flag) is TRUE; if TRUE, Step 1003 is executed; if FALSE, current decoding process ends.

Step 1003: the decoder parses the slice header and obtains the value of valid_aps_exist_flag using the decoding method corresponding to u(1).

Step 1004: if the value of valid_aps_exist_flag is equal to 1, Step 1005 is executed; otherwise, the decoder uses no picture-level coding tools in the process of decoding the current slice, and sets both aps_sample_adaptive_offset_flag and aps_adaptive_loop_filter_flag to 0 in the slice-level data structure. Current process ends.

Step 1005: if the value of sample_adaptive_offset_enabled_flag is equal to 1, Step 1006 is executed; otherwise, SAO is not used in the process of decoding the slice, and the decoder sets aps_sample_adaptive_offset_flag to 0 in the slice-level data structure, then Step 1007 is executed.

Step 1006: the decoder obtains the value of aps_id_sao using the decoding method corresponding to ue(v); the decoder reads the parameters of the SAO coding tool from the APS with its identifier equal to aps_id_sao and assigns the values of the parameters of the SAO coding tool to the data structure of the parameters of the SAO coding tool in the slice-level data structure, then Step 1007 is executed.

Step 1007: if the value of adaptive_loop_filter_enabled_flag is equal to 1, Step 1008 is executed; otherwise, ALF is not used in the process of decoding the slice, and the decoder sets aps_adaptive_loop_filter_flag to 0 in the slice-level data structure. Current process ends.

Step 1008: the decoder obtains the value of aps_id_alf using the decoding method corresponding to ue(v); the decoder reads the parameters of the ALF coding tool from the APS with its identifier equal to aps_id_alf, and assigns the values of the parameters of the ALF coding tool to the data structure of the parameters of the ALF coding tool of in the slice-level data structure. Current process ends.

Figure 11:
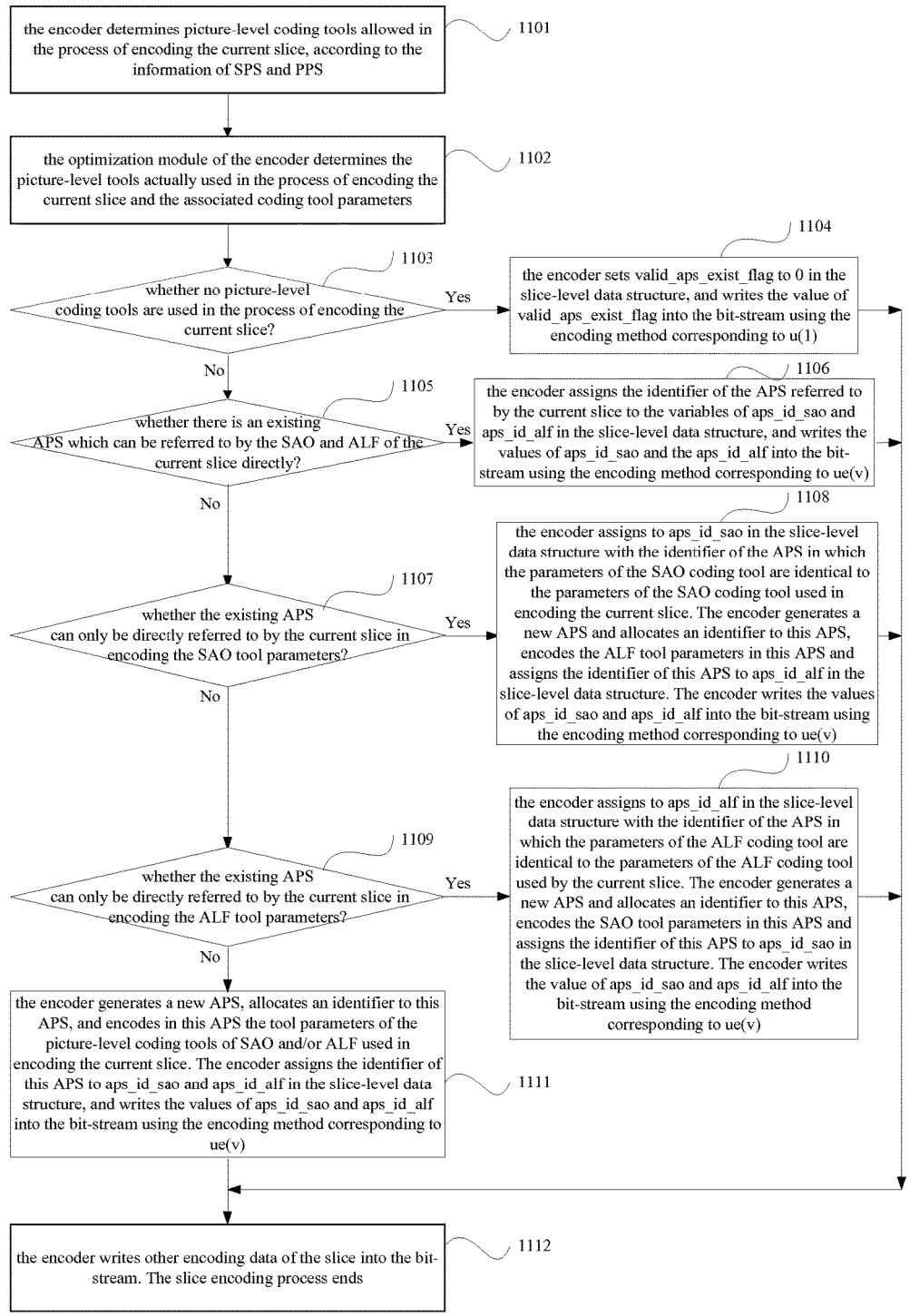
FIG. 11 shows an implementation flowchart of encoding a slice-level multi-APS bit-stream according to Embodiment 3 of the disclosure.

Corresponding to the above decoding process, the process that the encoder encodes a slice-level multi-APS bit-stream in this embodiment, as shown in FIG. 11, may include the following steps.

Step 1101 is completely identical to Step 501.

Step 1102 is completely identical to Step 502.

Step 1103: if the encoder uses no picture-level coding tools in the process of encoding the current slice, Step 1104 is executed; otherwise, the encoder sets valid_aps_exist_flag to 1 in the slice-level data structure, and writes the valid_aps_exist_flag into the bit-stream using the encoding method corresponding to u(1), then Step 1105 is executed.

Step 1104: the encoder sets valid_aps_exist_flag to 0 in the slice-level data structure, and writes the value of valid_aps_exist_flag into the bit-stream using the encoding method corresponding to u(1), then Step 1112 is executed.

Step 1105: if the encoder determines that there is an existing APS, which includes the same tool parameters as the parameters of the SAO coding tool and the parameters of the ALF coding tool used for the current slice, that is to say, there is an existing APS, which can be referred to by the current slice directly, Step 1106 is executed; otherwise, Step 1107 is executed.

Step 1106: the encoder assigns to aps_id_sao in the slice-level data structure the value of the identifier of the APS in which the parameters of the SAO coding tool are identical to the parameters of the SAO coding tool used for the current slice, and assigns to aps_id_alf in the slice-level data structure the value of the identifier of the APS in which the parameters of the ALF coding tool are identical to the parameters of the ALF coding tool used for the current slice, and writes the values of aps_id_sao and the aps_id_alf into the bit-stream using an encoding method corresponding to ue(v) respectively; then, Step 1112 is executed.

Step 1107: if the encoder determines that, in existing APSs, there is only APS that includes the same parameters as the SAO coding parameters used for the current slice but there is not APS that includes the same parameters as the ALF coding parameters used for the current slice, that is to say, only the encoding of the SAO tool parameters can refer to the existing APS directly, then Step 1108 is executed; otherwise, Step 1109 is executed.

Step 1108: the encoder assigns to aps_id_sao in the slice-level data structure the value of the identifier of the APS in which the parameters of the SAO coding tool are identical to the parameters of the SAO coding tool used for the current slice. The encoder generates a new APS and allocates an identifier to the generated APS, encodes in this APS the ALF tool parameters and assigns the value of the identifier of this generated APS to aps_id_alf in the slice-level data structure. The encoder writes the values of aps_id_sao and the aps_id_alf into the bit-stream using the encoding method corresponding to ue(v). Then, Step 1112 is executed.

Step 1109: if the encoder determines that, in existing APSs, there is only APS that includes the same parameters as the ALF coding parameters used for the current slice but there is not APS that includes the same parameters as the SAO coding parameters used for the current slice, that is to say, only the encoding of the ALF coding parameters can refer to the existing APS directly, then Step 1110 is executed; otherwise, Step 1111 is executed.

Step 1110: the encoder assigns to aps_id_alf in the slice-level data structure the value of the identifier of the APS in which the parameters of the ALF coding tool are identical to the parameters of the ALF coding tool used for the current slice. The encoder generates a new APS and allocates an identifier to the generated APS, encodes in this APS the SAO tool parameters and assigns the value of identifier of this APS to aps_id_sao in the slice-level data structure. The encoder writes the values aps_id_sao and the aps_id_alf into the bit-stream using the encoding method corresponding to ue(v). Then, Step 1112 is executed.

Step 1111: the encoder generates a new APS, allocates an identifier to this APS, and encodes in this APS the SAO tool parameters and the ALF tool parameters. The encoder assigns the value of the identifier of this APS to aps_id_sao and aps_id_alf in the slice-level data structure, and writes the values of aps_id_sao and the aps_id_alf into the bit-stream using the encoding method corresponding to ue(v). Then, Step 1112 is executed.

Step 1112: the encoder writes other encoding data of the slice into the bit-stream. The process of encoding the slice ends.

Embodiment 4

The APS bit-stream structure used in this embodiment is as shown in Table 4, wherein Line 3 to Line 4, Line 13 to Line 15, Line 20, Line 23 to Line 25, Line 30 to Line 31 in Table 4 all are new syntax elements added in this embodiment based on the existing APS bit-stream structure.

TABLE 4

| | Descriptor |
|---|---|
| aps_rbsp( ) { | |
|   aps_id | ue(v) |
|   aps_sample_adaptive_offset_data_present_flag | u(1) |
|   aps_adaptive_loop_filter_data_present_flag | u(1) |
|   if( aps_sample_adaptive_offset_flag \|\| | |
|   aps_adaptive_loop_filter_flag ) { | |
|     aps_cabac_use_flag | u(1) |
|     if( aps_cabac_use_flag ) { | |
|       aps_cabac_init_idc | ue(v) |
|       aps_cabac_init_qp_minu26 | se(v) |
|     } | |
|   } | |
| /* Insert non-CABAC stuff above this line */ | |
|   if( aps_adaptive_loop_filter_data_present_flag ) { | |
|     aps_adaptive_loop_filter_flag | u(1) |
|     if (aps_adaptive_loop_filter_flag) { | |
|       alf_data_byte_count /* to enable skipping past data without parsing it */ | u(8) |
| /*   byte_align( ) this byte align to happen between the non-CABAC and CABAC parts of the alf_param( ) Once there is an all CABAC alf_param( ), enable this byte_align( ) */ | |
|       alf_param( ) | |
|       byte_align( ) | |
|     } | |
|   } | |
| /* insert CABAC stuff below this line; make sure its byte-aligned */ | |
|   if( aps_sample_adaptive_offset_data_present_flag ) { | |
|     aps_sample_adaptive_offset_flag | u(1) |
|     if ( aps_sample_adaptive_offset_flag ) { | |
|       sao_data_byte_count /* to enable skipping past data without parsing it */ | u(8) |
|       byte_align( ) | |
|       sao_param( ) | |
| /*   byte_align( ) this final byte align unnecessary as being taken care of by rbsp_trailing_bits( ) */ | |
|     } | |
|   } | |
|   rbsp_trailing_bits( ) | |
| } | |

In Table 4, aps_sample_adaptive_offset_data_present_flag indicates whether the current APS contains the parameters of the SAO coding tool. When the value of aps_sample_adaptive_offset_data_present_flag is equal to 1, it indicates that the current APS contains the parameters of the SAO coding tool; when the value of aps_sample_adaptive_offset_data_present_flag is equal to 0, it indicates that the current APS does not contain the parameters of the SAO coding tool. In practical application, the default value of aps_sample_adaptive_offset_flag is 0.

In Table 4, aps_adaptive_loop_filter_data_present_flag indicates whether the current APS contains the parameters of the ALF coding tool. When the value of aps_adaptive_loop_filter_data_present_flag is equal to 1, it indicates that the current APS contains the parameters of the ALF coding tool; when the value of aps_adaptive_loop_filter_data_present_flag is equal to 0, it indicates that the current APS does not contain the parameters of the ALF coding tool. In practical application, the default value of aps_adaptive_loop_filter_flag is 0.

Figure 12:
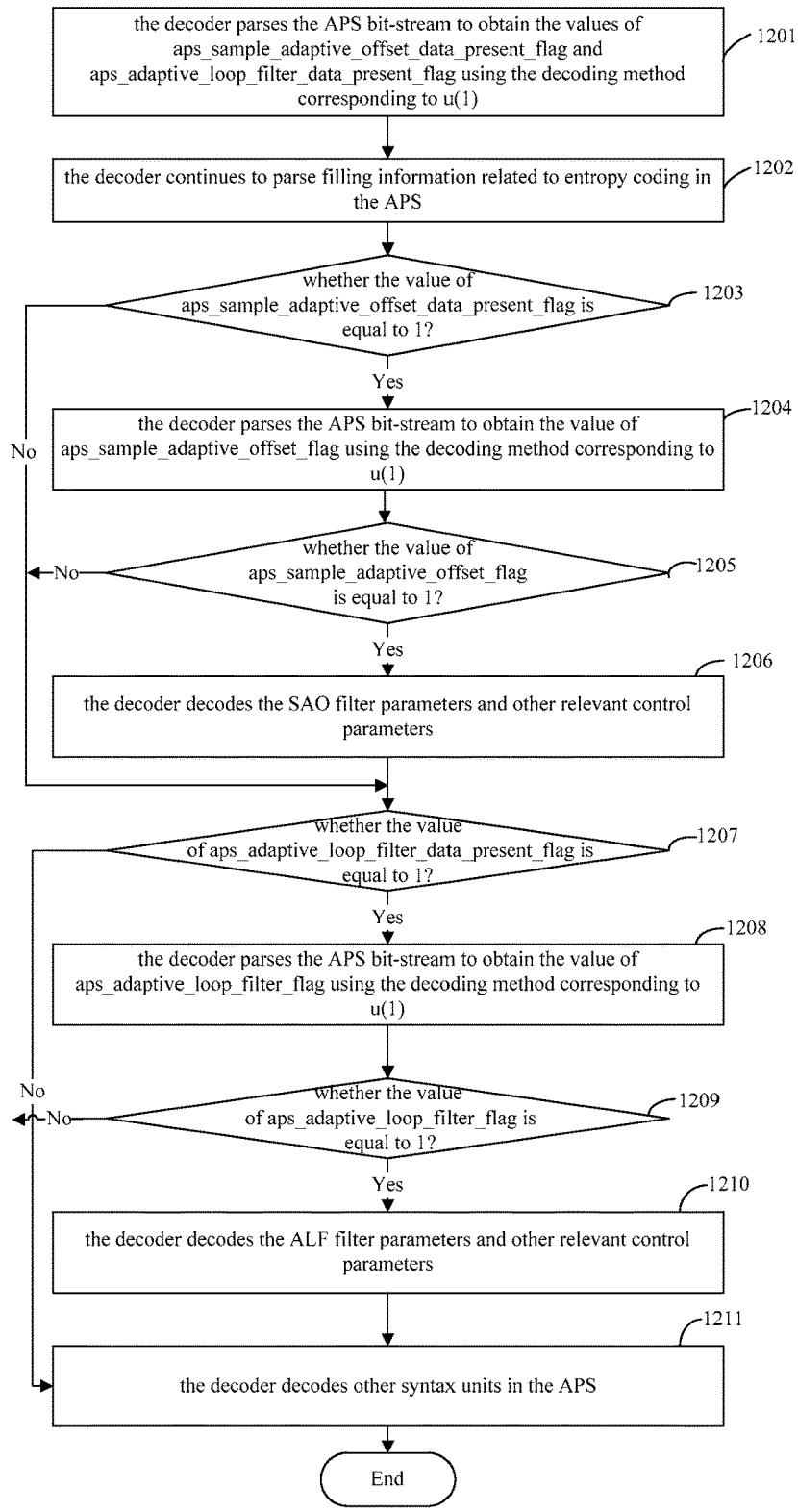
FIG. 12 shows an implementation flowchart of the APS decoding process according to Embodiment 4 of the disclosure.

Based on the APS bit-stream structure shown in Table 4, the corresponding process of decoding the APS bit-stream, as shown in FIG. 12, may include the following steps.

Step 1201: the decoder reads the APS bit-stream, and parses the APS bit-stream to obtain the values of aps_sample_adaptive_offset_data_present_flag and aps_adaptive_loop_filter_data_present_flag using the decoding method corresponding to u(1).

Step 1202: the decoder continues to parse filling information related to entropy coding in the APS.

Step 1203: if the value of aps_sample_adaptive_offset_data_present_flag is equal to 1, Step 1204 is executed; otherwise, it indicates that the current APS does not contain the parameters of the SAO coding tool, then Step 1207 is executed.

Step 1204: the decoder parses the APS bit-stream to obtain the value of aps_sample_adaptive_offset_flag using the decoding method corresponding to u(1).

Step 1205: if the value of aps_sample_adaptive_offset_flag is equal to 1, Step 1206 is executed; otherwise, Step 1207 is executed.

Step 1206: the decoder decodes the SAO filter parameters and other relevant control parameters; then Step 1207 is executed.

Step 1207: if the value of aps_adaptive_loop_filter_data_present_flag is equal to 1, Step 1208 is executed; otherwise, it indicates that the current APS does not contain the parameters of the ALF coding tool, then Step 1211 is executed.

Step 1208: the decoder parses the APS bit-stream to obtain the value of aps_adaptive_loop_filter_flag using the decoding method corresponding to u(1).

Step 1209: if the value of aps_adaptive_loop_filter_flag is equal to 1, Step 1210 is executed; otherwise, Step 1211 is executed.

Step 1210: the decoder decodes the ALF filter parameters and other relevant control parameters; then Step 1211 is executed.

Step 1211: the decoder decodes other syntax elements in the APS. Current decoding process ends.

Figure 13:
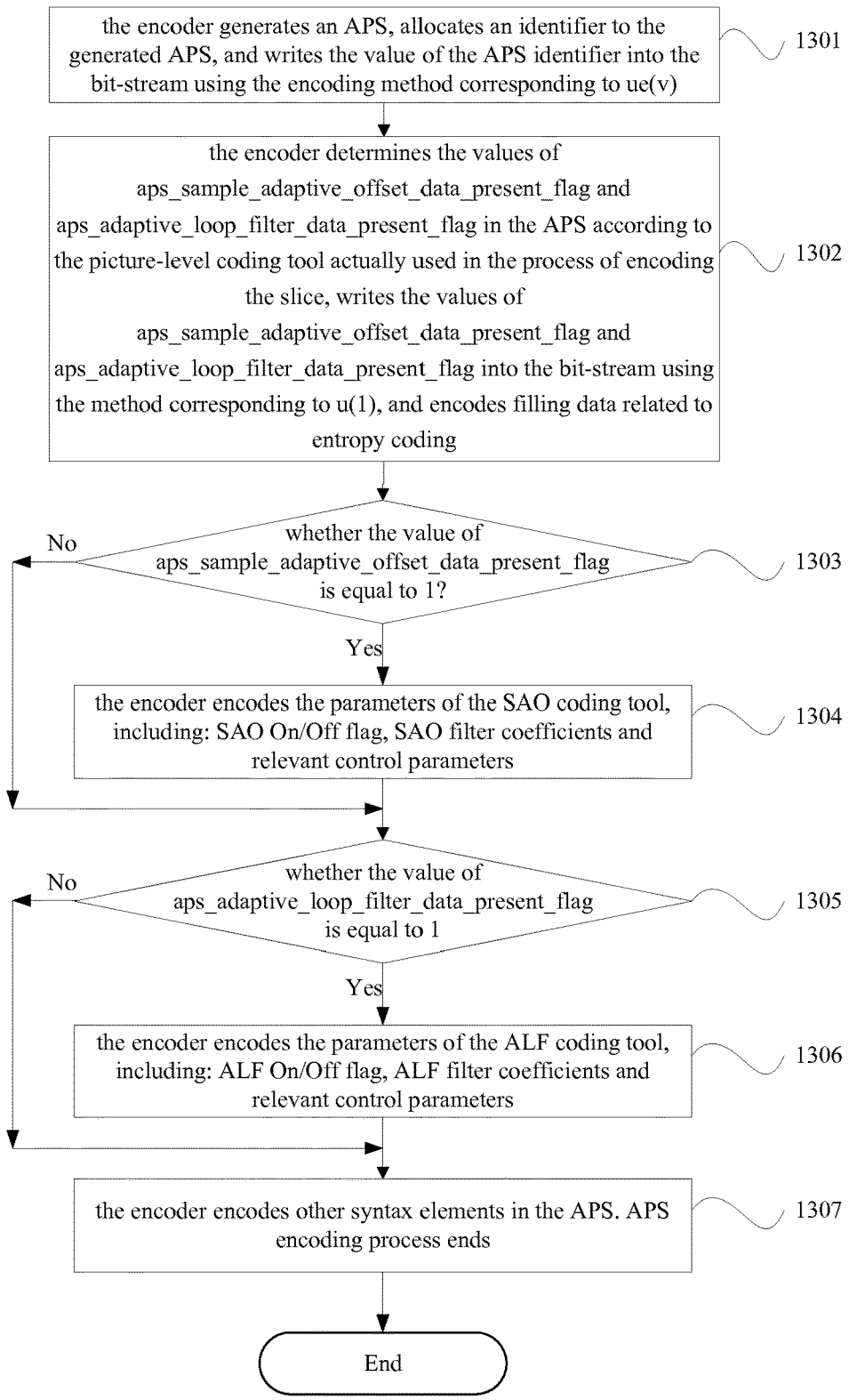
FIG. 13 shows an implementation flowchart of the APS encoding process according to Embodiment 4 of the disclosure.

Corresponding to the process of decoding the APS bit-stream shown in FIG. 12, the process of encoding the APS bit-stream in this embodiment, as shown in FIG. 13, may include the following steps.

Step 1301: the encoder generates an APS, allocates an identifier to the generated APS, and writes the identifier of the APS into the bit-stream using the encoding method corresponding to ue(v).

Step 1302: the encoder determines the values of aps_sample_adaptive_offset_data_present_flag and aps_adaptive_loop_filter_data_present_flag in the APS according to the picture-level coding tools actually used in the process of encoding the slice, writes the aps_sample_adaptive_offset_data_present_flag and aps_adaptive_loop_filter_data_present_flag into the bit-stream using the method corresponding to u(1), and encodes filling information related to entropy coding.

Step 1303: if the value of aps_sample_adaptive_offset_data_present_flag is equal to 1, Step 1304 is executed; otherwise, Step 1305 is executed.

Step 1304: the encoder encodes the parameters of the SAO coding tool, including: SAO On/Off flag, SAO filter coefficients and relevant control parameters; then Step 1305 is executed.

Step 1305: if the value of aps_adaptive_loop_filter_data_present_flag is equal to 1, Step 1306 is executed; otherwise, Step 1307 is executed.

Step 1306: the encoder encodes the parameters of the ALF coding tool, including: ALF On/Off flag, ALF filter coefficients and relevant control parameters; then Step 1307 is executed.

Step 1307: the encoder encodes other syntax elements in the APS. Current encoding process ends.

It should be noted that the decoding process in FIG. 12 and the encoding process in FIG. 13 contain the decoding steps or encoding steps of the new syntax elements only; the decoding or encoding steps of other syntax elements can be implemented by a related art, and no further description is needed here.

This embodiment allows a slice to refer to the coding tool parameters given in multiple APSs. The indication method of multiple APSs in the slice header is as shown in Table 5. This embodiment signals the APS indication information in slice header, specifically as shown in Line 6 to Line 11 in Table 5.

TABLE 5

| | Descriptor |
|---|---|
| slice_header( ) { | |
|   lightweight_slice_flag | u(1) |
|   if( !lightweight_slice_flag ) { | |
|     slice_type | ue(v) |
|     pic_parameter_set_id | ue(v) |
|     if( sample_adaptive_offset_enabled_flag \|\| adaptive_loop_filter_enabled_flag ) { | |
|       number_valid_aps | u(v) |
|       for(i=0; i<number_valid_aps; i++) { | |
|         aps_id[i] | ue(v) |
|       } | |
|     } | |
|     ...... | |
|   } | |
|   ...... | |

TABLE 5-continued

| | Descriptor |
|---|---|
|   if( !lightweight_slice_flag ) { | |
|     ...... | |
|     if( adaptive_loop_filter_enabled_flag && aps_adaptive_loop_filter_flag ) { | |
|       byte_align( ) | |
|       alf_cu_control_param( ) | |
|       byte_align( ) | |
|     } | |
|   } | |
| } | |

In Table 5, the implications of number_valid_aps and aps_id[i] are identical to those in Table 2 in Embodiment 1; the difference lies in that, when the value of number_valid_aps is greater than 1, the current slice refers to multiple APSs simultaneously; the identifiers of the APSs referred to by the current slice are signalled by aps_id[0], aps_id[1], . . . , aps_id[number_valid_aps−1] respectively.

The decoder determines the tool parameters of the picture-level coding tools used for the current slice using a multi-APS overwriting mode, specifically, when aps_sample_adaptive_offset_data_present_flag is 1 in the APS with its identifier equal to aps_id[n] ($1 \le n \le$ number_valid_aps−1), the decoder overwrites the previous parameters of the SAO coding tool used for decoding the current slice determined according to aps_id[0], aps_id[1], . . . , aps_id[n−1] with the parameters of the SAO coding tool in this APS; when the value of aps_adaptive_loop_filter_data_present_flag is 1 in the APS with its identifier equal to aps_id[n] ($1 \le n \le$ number_valid_aps−1), the decoder overwrites the previous parameters of the ALF coding tool used for decoding the current slice determined according to aps_id[0], aps_id[1], . . . , aps_id[n−1] with the parameters of the ALF coding tool in this APS.

Figure 14:
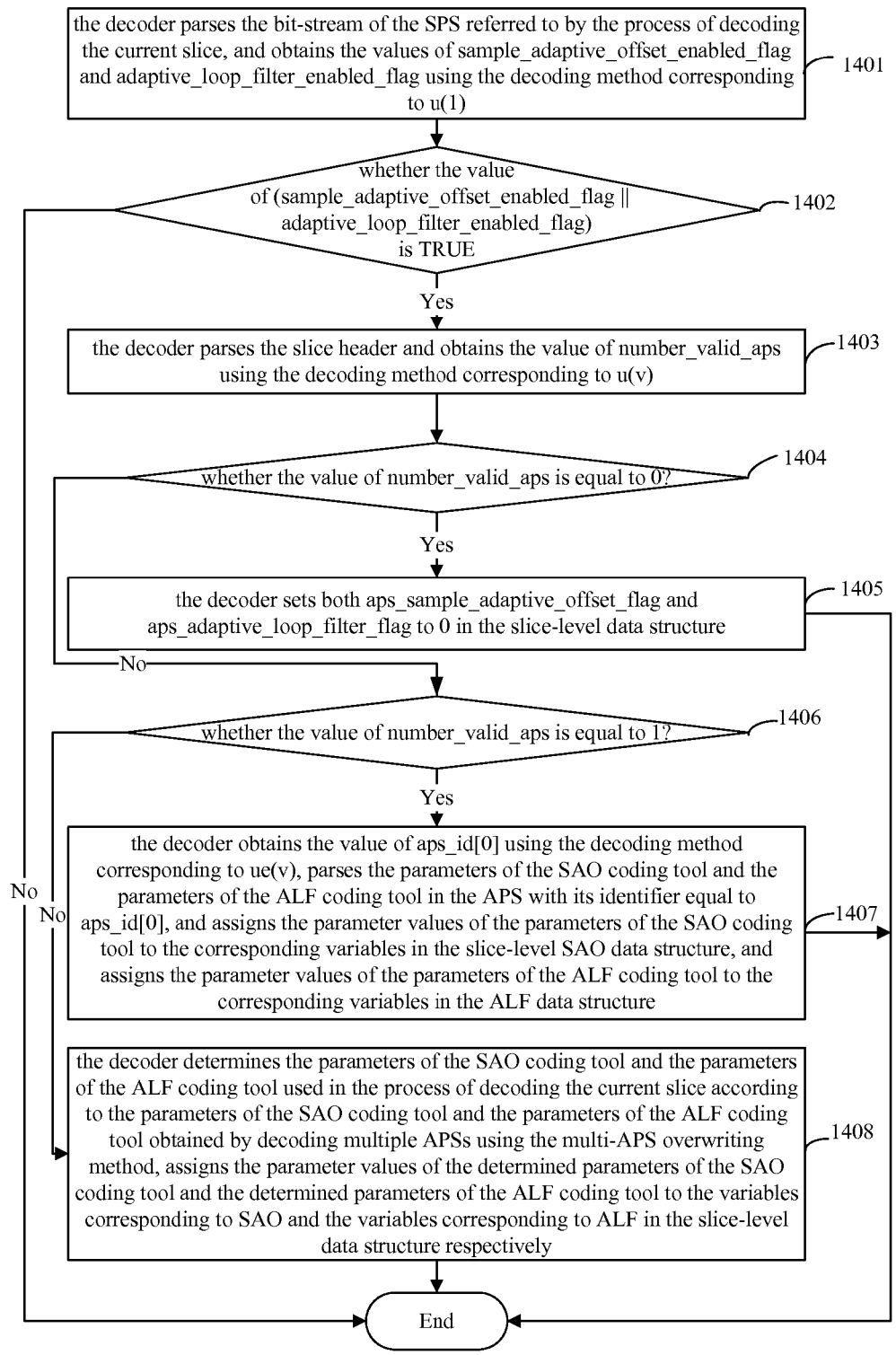
FIG. 14 shows an implementation flowchart of decoding a slice-level multi-APS bit-stream according to Embodiment 4 of the disclosure.

In this embodiment, the process that the decoder parses a slice-level multi-APS bit-stream, as shown in FIG. 14, includes the following steps.

Step 1401 is completely identical to Step 201.

Step 1402 is completely identical to Step 202.

Step 1403 is completely identical to Step 203.

Step 1404 is completely identical to Step 204.

Step 1405 is completely identical to Step 205.

Step 1406: if the value of number_valid_aps is equal to 1, Step 1407 is executed; if the value of number_valid_aps is not equal to 1, Step 1408 is executed.

Step 1407 is completely identical to Step 207.

Step 1408: the decoder parses multiple APSs, determines the parameters of the coding tools of SAO and ALF used in the process of decoding the current slice according to the parameters of the coding tools of SAO and ALF obtained by decoding multiple APSs through the multi-APS overwriting method, assigns the parameter values of the determined values of the parameters of the SAO coding tool and the determined values of the parameters of the ALF coding tool to the variables corresponding to SAO and the variables corresponding to ALF in the slice-level data structure respectively. Current process ends.

Figure 15:
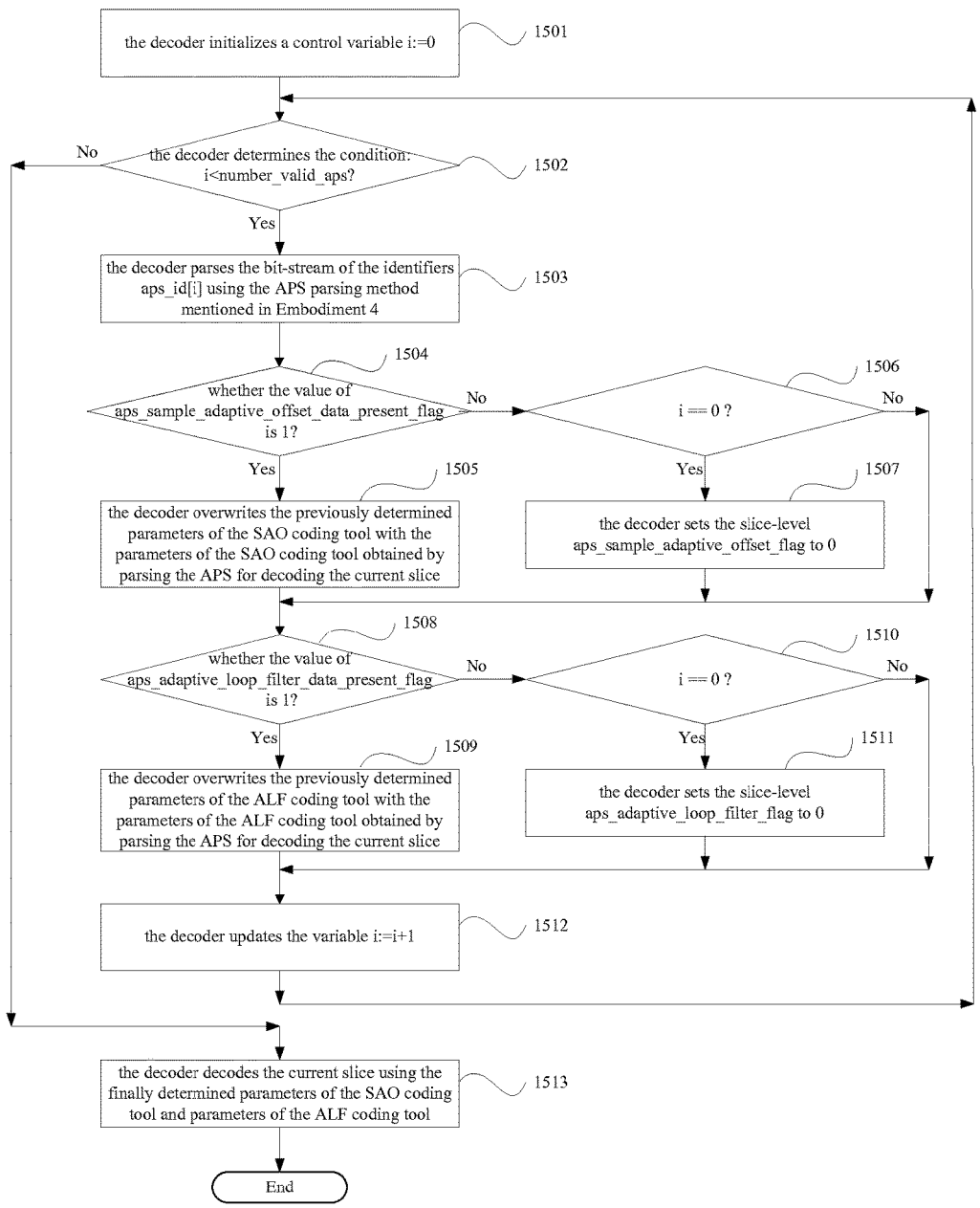
FIG. 15 shows a flowchart of the implementation of Step 1408 shown in FIG. 14.

Here, the process of determining the parameters of the coding tools of SAO and ALF used in the process of decoding the current slice in Step 1408, as shown in FIG. 15, may include the following steps.

Step 1501: the decoder initializes a variable i:=0.

Step 1502: the decoder determines whether the variable i is less than number_valid_aps, if so, Step 1503 is executed; otherwise, Step 1513 is executed.

Step 1503: the decoder decodes the APS bit-stream with its identifier equal to aps_id[i] using the above APS bit-stream decoding method.

Step 1504: if the value of aps_sample_adaptive_offset_data_present_flag is 1, Step 1505 is executed; otherwise, Step 1506 is executed.

Step 1505: the decoder overwrites the previous parameters of the SAO coding tool determined for decoding the current slice with the parameters of the SAO coding tool obtained by decoding the APS with its identifier equal to aps_id[i], then Step 1508 is executed.

Step 1506: the decoder determines whether the value of the variable i is equal to 0, if so, Step 1507 is executed; otherwise, Step 1508 is executed.

Step 1507: the decoder sets the aps_sample_adaptive_offset_flag of the slice-level to 0; then Step 1508 is executed.

Step 1508: if the value of aps_adaptive_loop_filter_data_present_flag is 1, Step 1509 is executed; otherwise, Step 1510 is executed.

Step 1509: the decoder overwrites the previous parameters of the ALF coding tool determined for decoding the current slice with the parameters of the ALF coding tool obtained by decoding the APS with identifier of aps_id[i], then Step 1512 is executed.

Step 1510: the decoder determines whether the value of the cyclic variable i is equal to 0, if so, Step 15011 is executed; otherwise, Step 1512 is executed.

Step 1511: the decoder sets the aps_adaptive_loop_filter_flag of the slice to 0; then Step 1512 is executed.

Step 1512: the decoder updates the variable i:=i+1; return to Step 1502.

Step 1513: the decoder decodes the bit-stream of the current slice using the finally determined parameters of the SAO coding tool and parameters of the ALF coding tool. Current process ends.

It should be noted that: for the implementation of Step 1408, the APS with its identifier equal to aps_id[0] can be taken as a basic APS, and APSs with their identifiers equal to aps_id[1], aps_id[2], . . . , aps_id[number_valid_aps−1] can be taken as patch APSs; the decoder decodes the basic APS and sets the initial tool parameters of the picture-level coding tools first, and then decodes each patch APS and determines, using the multi-APS overwriting mode shown in FIG. 15, the coding tool parameters of the picture-level coding tools finally used for decoding the current slice.

Figure 16:
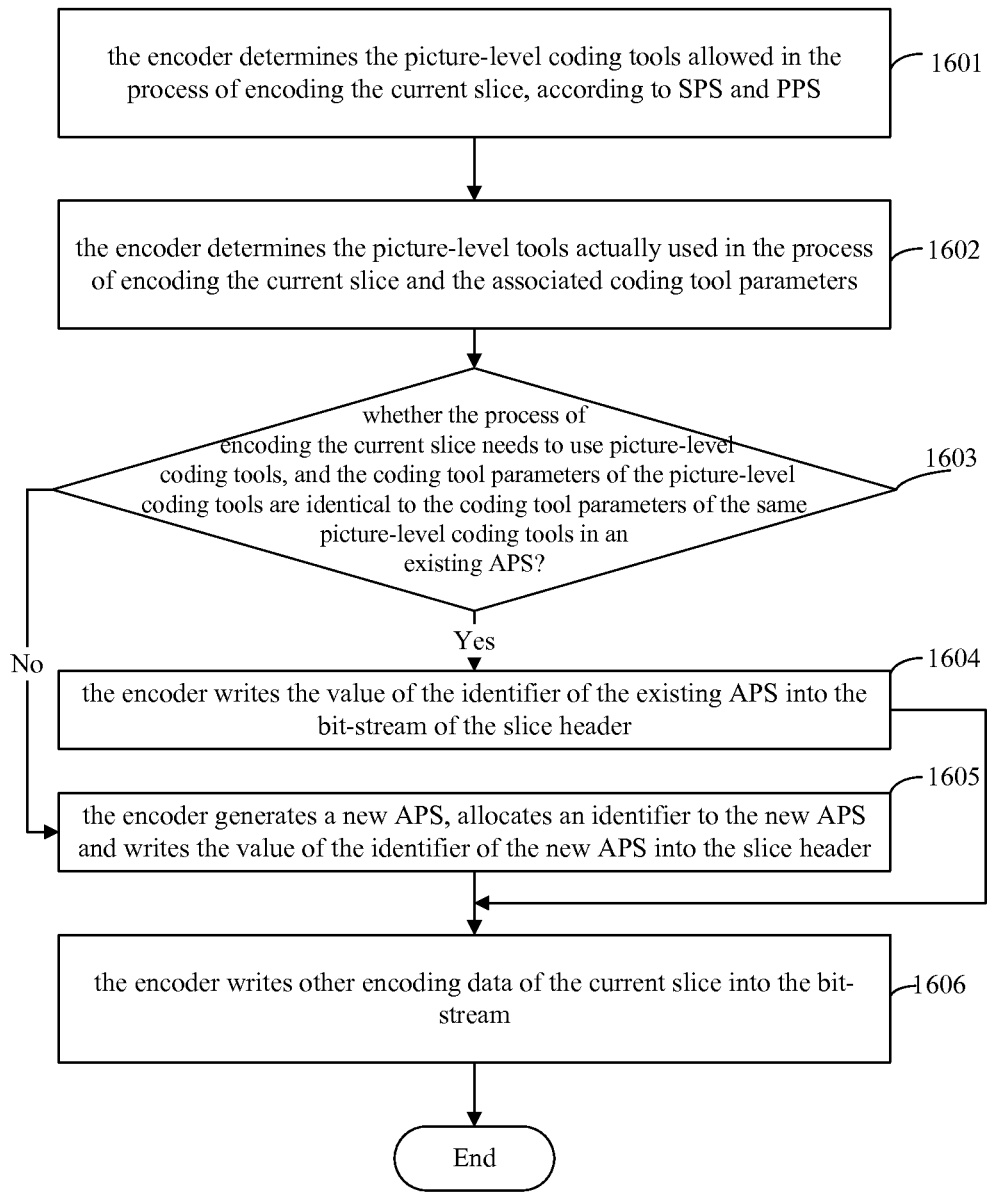
FIG. 16 shows an implementation flowchart of encoding a slice-level multi-APS bit-stream according to Embodiment 1 of the disclosure.

Correspondingly, the process that the encoder encodes a slice-level multi-APS bit-stream in this embodiment, as shown in FIG. 16, may include the following steps.

Steps 1601 and 1602 are completely identical to Step 501 to Step 502, respectively.

Step 1603: if the current slice uses a picture-level coding tool, and the coding tool parameters of the picture-level coding tool are identical to the coding tool parameters of the same picture-level coding tool that are already contained in an existing APS, Step 1604 is executed; otherwise, Step 1605 is executed.

Step 1604: the encoder writes the value of identifier of the APS into the bit-stream of the slice header; then Step 1606 is executed.

If the encoder detects one existing APS in which the tool parameters of the picture-level coding tools are completely identical to the tool parameters of all picture-level coding tools used for the current slice, the encoder sets the value of number_valid_aps to 1 in the slice-level data structure, writes the number_valid_aps into the bit-stream using the encoding method corresponding to u(v), acquires the value of the identifier of the APS in which the corresponding coding tool parameters are identical to the coding tool parameters used for the current slice, assigns the value of the identifier of the APS to aps_id[0] in the slice-level data structure, and writes the value of the aps_id[0] into the bit-stream using the encoding method corresponding to ue(v).

If the encoder detects multiple existing APSs, the decoder can obtain the same tool parameters as that of the picture-level coding tools used for the current slice according to the multi-APS overwriting method, then the encoder sets to the value of number_valid_aps in the slice-level data structure the number of the used APSs, and writes the value of number_valid_aps into the bit-stream using the encoding method corresponding to u(v). The encoder assigns the values of the identifiers of the used APSs to aps_id[0], aps_id[1], . . . , aps_id[number_valid_aps−1] in the slice-level data structure respectively according to the multi-APS overwriting method, and writes aps_id[0], aps_id[1], . . . , aps_id[number_valid_aps−1] into the bit-stream using the encoding method corresponding to ue(v).

Step 1605: the encoder generates a new APS, allocates an identifier to the new APS and writes the value of the identifier of the new APS into the slice header. Then, Step 1606 is executed.

The encoder can separately generate new APS for each picture-level coding tool used for the current slice, and encode the corresponding coding tool parameters in the new APS corresponding to each picture-level coding tool.

The encoder can also generate a single APS, encode in this APS the coding tool parameters of all coding tools used for the current slice, and write the value of the identifier of this APS into the bit-stream of the slice header.

Here, the encoder also can determine the number of new APS generated, according to whether the picture-level coding tools used for the current slice are to be applied to the process of encoding subsequent slices, wherein one APS may contain the coding tool parameters of one or more picture-level coding tools.

If in the picture-level coding tools used for the current slice there is one or more picture-level coding tools of which the tool parameters are identical to the corresponding coding tool parameters that are already contained in an existing APS, then, the encoder can generate an APS only for other picture-level coding tools of which the tool parameters are different from all the corresponding coding tool parameters contained in all existing APSs.

The encoder writes the value of the identifier of the APS into the bit-stream of the slice header, ensuring that the decoder using the multi-APS overwriting method can correctly get the tool parameters of picture-level coding tools after parsing the bit-stream.

The above is only a simple method to optimize the processes of the encoder by generating a new APS, using an existing APS, and enabling the process of encoding the subsequent slices to reuse the APSs for the current slice. Any encoder, APS coding method and slice-level APS coding method which can generate a slice-level APS bit-stream provided to a decoder that can be correctly parsed by the method in this embodiment are deemed to be included in the coverage of Step 1605 in this embodiment.

Step 1606: the encoder writes other encoding data of the slice into the bit-stream. The process of encoding the slice ends.

Figure 17:
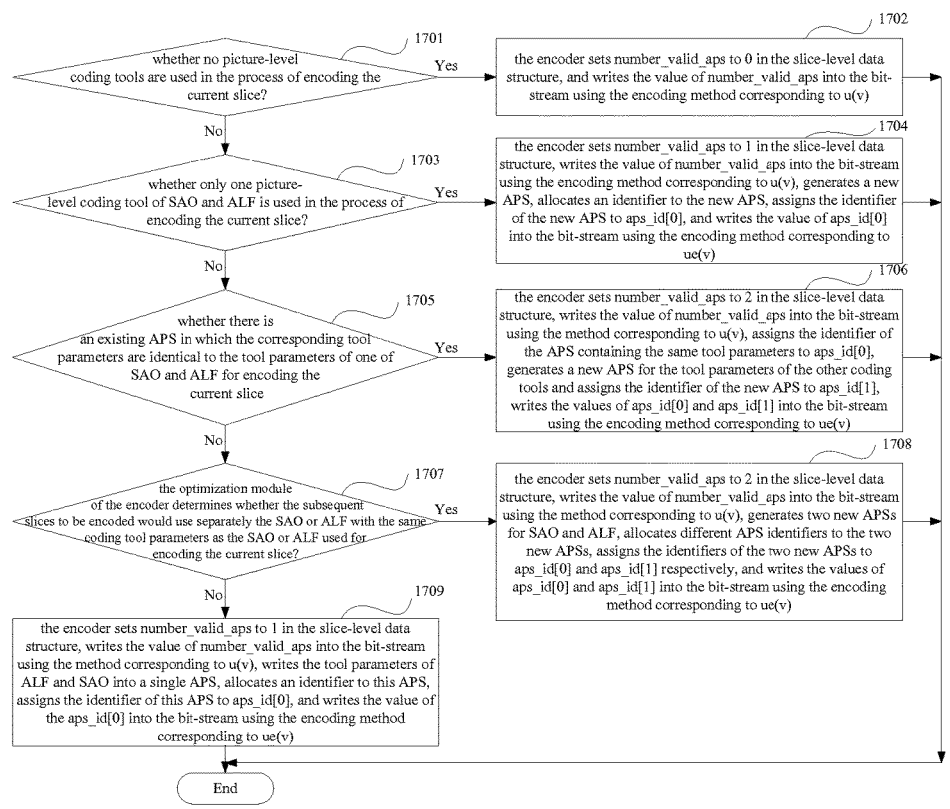
FIG. 17 shows a flowchart of the implementation of Step 1605 shown in FIG. 16.

The implementation of the encoder generating a new APS, allocating an identifier to the new APS and writing the identifier of the new APS into the slice header in Step 1605, as shown in FIG. 17, includes the following steps.

Step 1701 is completely identical to Step 601.

Step 1702 is completely identical to Step 602.

Step 1703 is completely identical to Step 603.

Step 1704 is completely identical to Step 604.

Step 1705: if there is an existing APS in which the corresponding tool parameters are identical to the tool parameters of either SAO or ALF for the current slice, Step 1706 is executed; otherwise, Step 1707 is executed.

Step 1706 is completely identical to Step 606.

Step 1707: an optimization module of the encoder determines whether the encoder will separately use the SAO or ALF with the same coding tool parameters as the ones for the current slice in the process of encoding the subsequent slices, if so, Step 1708 is executed; otherwise, Step 1709 is executed.

Step 1708 is completely identical to Step 608.

Step 1709 is completely identical to Step 609.

Embodiment 5

The APS bit-stream structure used in this embodiment is completely identical to that used in Embodiment 1.

This embodiment allows a slice to refer to coding tool parameters given in multiple APSs; the indication method of multiple APSs in slice header is as shown in Table 2. This embodiment signals the APS indication information in slice header, specifically as shown in Line 6 to Line 16 shown in Table 6.

TABLE 6

|  | Descriptor |
|---|---|
| slice_header( ) { |  |
|   lightweight_slice_flag | u(1) |
|   if( !lightweight_slice_flag ) { |  |
|     slice_type | ue(v) |
|     pic_parameter_set_id | ue(v) |
|     if( sample_adaptive_offset_enabled_flag \|\| adaptive_loop_filter_enabled_flag ) { |  |
|       number_valid_aps | u(v) |
|       for(i=0; i<number_valid_aps; i++) { |  |
|         aps_id[i] | ue(v) |
|       } |  |
|       if (number_valid_aps > 1) { |  |
|         for (i=0; i<number_valid_aps − 1; i++) { |  |
|           aps_overwriting_pattern[i] | u(2) |
|         } |  |
|       } |  |
|     } |  |
|   ...... |  |
|   } |  |
|   ...... |  |
| } |  |

In Table 6, the implications of number_valid_aps and aps_id[i] are completely identical to those in Embodiment 1.

In Table 6, aps_overwriting_pattern[i] indicates a multi-APS overwriting mode when the value of number_valid_aps is greater than 1. The multi-APS overwriting mode used in this embodiment and the specific operation methods are as shown in Table 7.

TABLE 7

| aps_overwriting_pattern[i] (binary representation) | Overwriting Mode |
|---|---|
| 00 | Not execute any APS information overwriting operation; neglect the APS with its identifier equal to aps_id[i + 1]. |
| 01 | Overwrite SAO information: overwrite the previously determined parameters of the SAO coding tool with the parameters of the SAO coding tool in the APS with its identifier equal to aps_id[i + 1]. |
| 10 | Overwrite ALF information: overwrite the previously determined parameters of the ALF coding tool with the parameters of the ALF coding tool in the APS with its identifier equal to aps_id[i + 1]. |
| 11 | Overwrite the previously determined parameters of the SAO coding tool and the previously determined parameters of the ALF coding tool with the parameters of the SAO coding tool and the parameters of the ALF coding tool, respectively, in the APS with its identifier equal to aps_id[i + 1]. |

In Table 7, the binary representation of aps_overwriting_pattern[i] includes two bits, wherein the first bit indicates whether to overwrite the parameters of the ALF coding tool and the second bit indicates whether to overwrite the parameters of the SAO coding tool. Besides, the corresponding overwriting operations are defined. This method can be directly extended by adding similar multi-APS overwriting modes and corresponding operations when the number of available picture-level coding tools is greater than 2.

Figure 18:
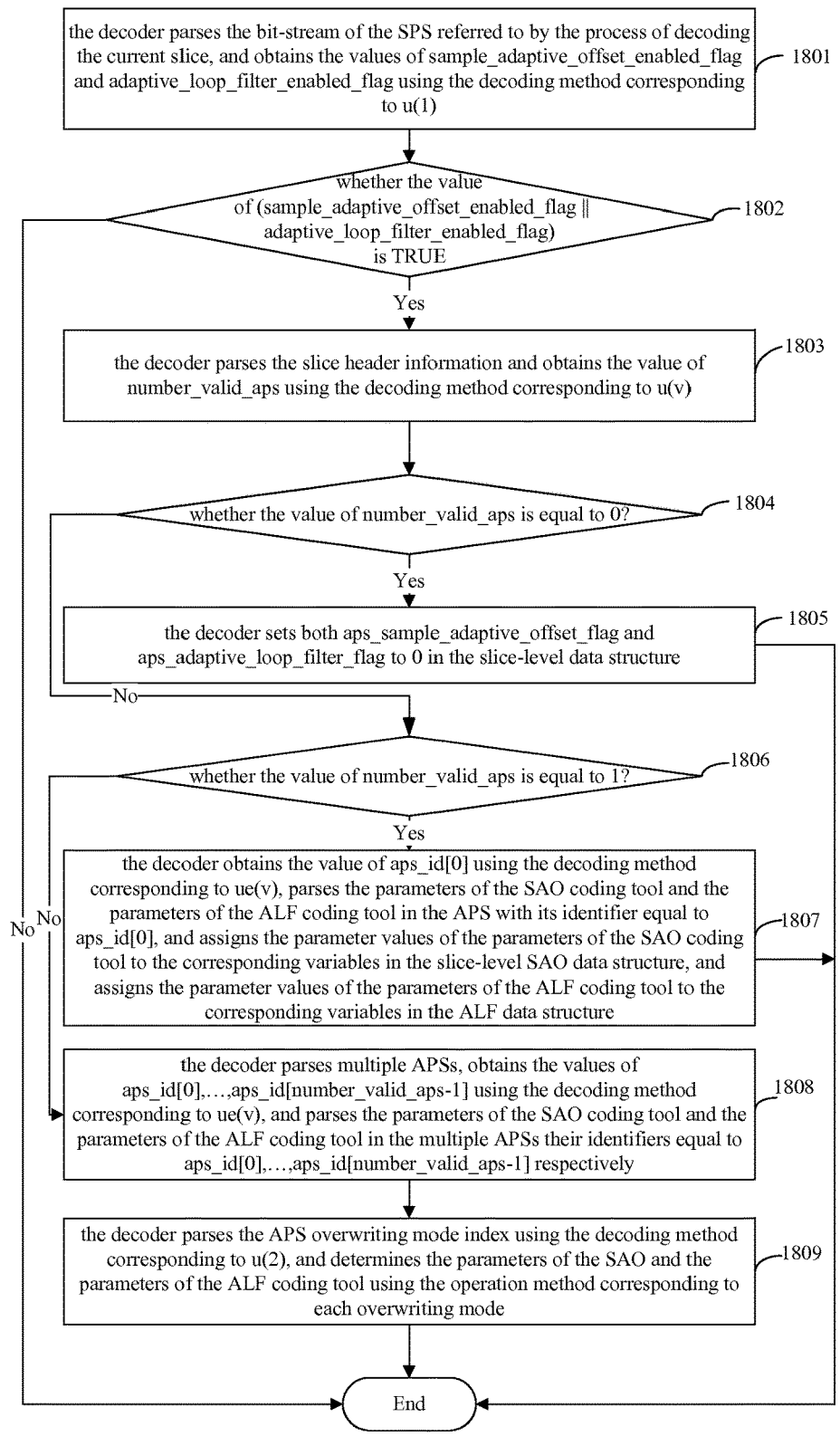
FIG. 18 shows an implementation flowchart of encoding a slice-level multi-APS bit-stream according to Embodiment 4 of the disclosure.

In this embodiment, the process that the decoder decodes a slice-level multi-APS bit-stream, as shown in FIG. 18, may include the following steps.

Step 1801 is completely identical to Step 201.

Step 1802 is completely identical to Step 202.

Step 1803 is completely identical to Step 203.

Step 1804 is completely identical to Step 204.

Step 1805 is completely identical to Step 205.

Step 1806 is completely identical to Step 206.

Step 1807 is completely identical to Step 207.

Step 1808 is completely identical to Step 208.

Step 1809: the decoder parses the APS overwriting mode index using the decoding method corresponding to u(2), and determines the parameters of the coding tools of SAO and ALF using the operation method (shown in Table 8) corresponding to each overwriting mode. Current process ends.

Figure 19:
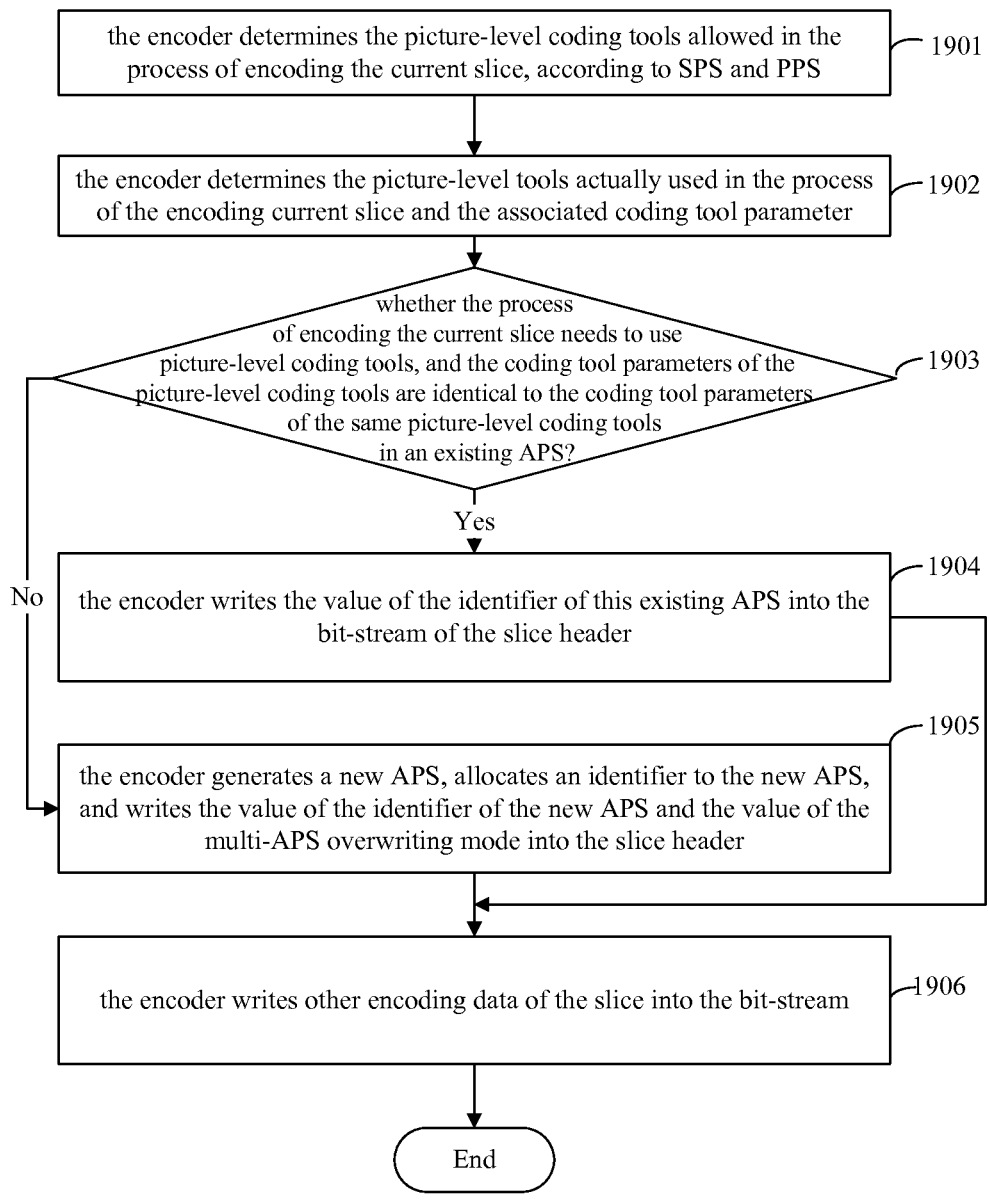
FIG. 19 shows an implementation flowchart of decoding a slice-level multi-APS bit-stream according to Embodiment 5 of the disclosure.

Correspondingly, the process that the encoder encodes a slice-level multi-APS bit-stream in this embodiment, as shown in FIG. 19, may include the following steps.

Step 1901 is completely identical to Step 1601.

Step 1902 is completely identical to Step 1602.

Step 1903: if the encoder detects that the current slice uses a picture-level coding tool and the used tool has the same tool parameters as those of the picture-level tool in an existing APS, Step 1904 is executed; otherwise, Step 1905 is executed.

Step 1904: the encoder writes the value of the identifier of the existing APS into the bit-stream of the slice header; then Step 1906 is executed.

If the encoder detects one existing APS in which the tool parameters of the picture-level coding tools are completely identical to the tool parameters of all picture-level coding tools used for the current slice, the encoder sets the value of number_valid_aps to 1 in the slice-level data structure, writes the value of number_valid_aps into the bit-stream using the encoding method corresponding to u(v), acquires the value of the identifier of the APS in which the corresponding coding tool parameters are identical to the coding tool parameters used for the current slice, assigns the value of the identifier of the APS to aps_id[0] in the slice-level data structure, and writes the value of the aps_id[0] into the bit-stream using the encoding method corresponding to ue(v).

If there is one existing APS in which the parameters of the SAO coding tool are identical to the parameters of the SAO coding tool used for the current slice and one existing APS in which the parameters of the ALF coding tool are different from the parameters of the ALF coding tool used for the current slice, the encoder sets the value of number_valid_aps to 2 in the slice-level data structure, writes the value of the number_valid_aps into the bit-stream using the method corresponding to u(v), assigns the values of the identifiers of the two APSs to aps_id[0] and aps_id[1] respectively, and writes the values of aps_id[0] and aps_id[1] into the bit-stream using the encoding method corresponding to ue(v); the encoder further determines the multi-APS overwriting mode needed and assigns a value to aps_overwriting_pattern, and writes the value of the aps_overwriting_pattern into the bit-stream using an encoding method corresponding to u(2).

In the process of writing the values of the identifiers of multiple APSs into the bit-stream of the slice header, the encoder must ensure that, through the multiple APSs, the decoder in this embodiment can correctly get the coding tool parameters of picture-level coding tools using the multi-APS bit-stream decoding method and the defined APS overwriting mode.

Step 1905: the encoder generates a new APS, allocates an identifier to the new APS, and writes the value of the identifier of the new APS and the multi-APS overwriting mode into the slice header; then, Step 1906 is executed.

In the process of writing the identifiers of multiple APSs into the bit-stream of the slice header, the encoder must ensure that, through the set multiple APSs, the decoder in this embodiment can correctly get the coding tool parameters of picture-level coding tools using the multi-APS bit-stream decoding method and the defined APS overwriting mode.

Step 1906: the encoder writes other encoding data of the slice into the bit-stream. The process of encoding the slice ends.

Figure 20:
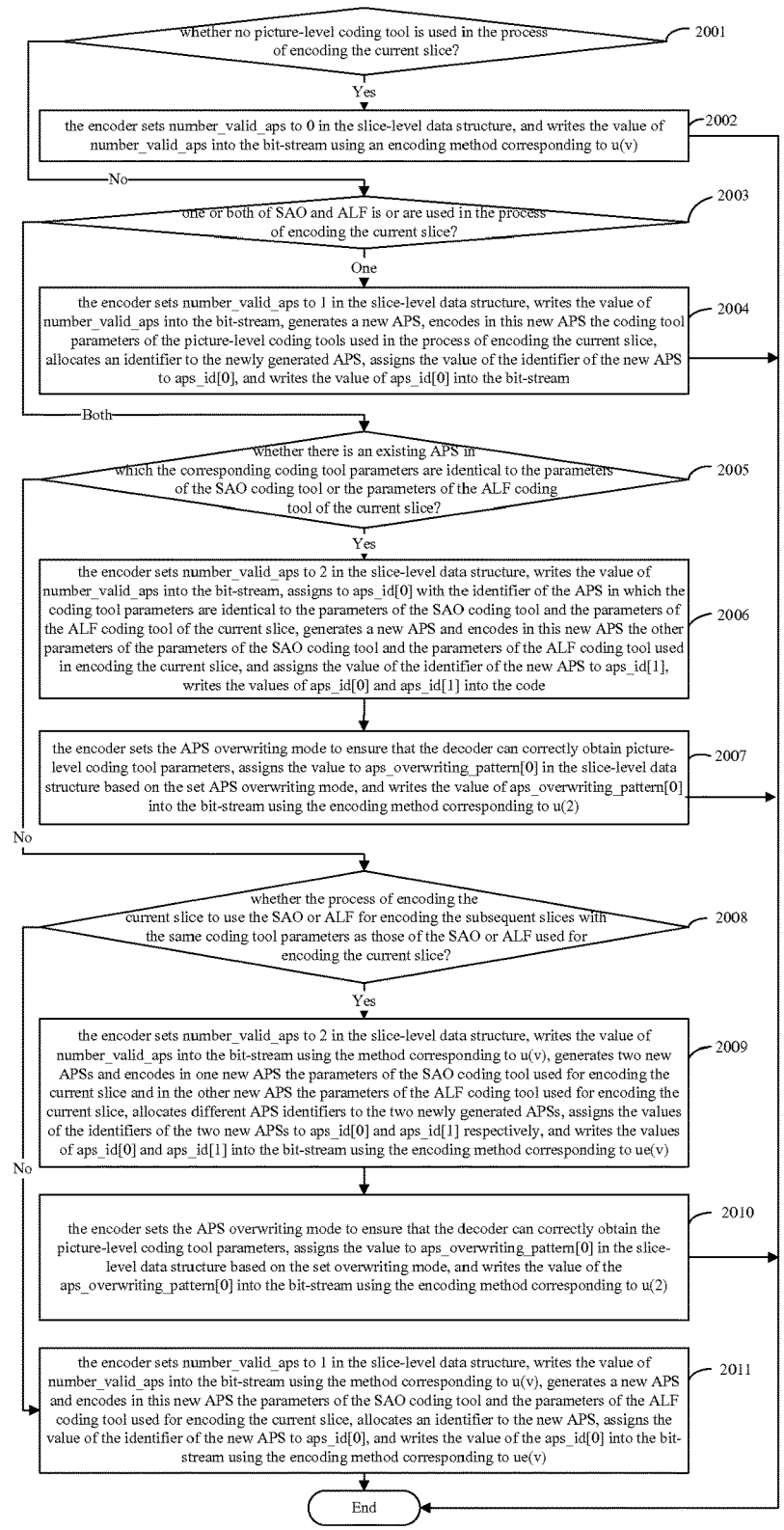
FIG. 20 shows an implementation flowchart of encoding a slice-level multi-APS bit-stream according to Embodiment 5 of the disclosure.

The implementation of generating a new APS in Step 1905, as shown in FIG. 20, may include the following steps.

Step 2001 is completely identical to Step 601.
Step 2002 is completely identical to Step 602.
Step 2003 is completely identical to Step 603.
Step 2004 is completely identical to Step 604.
Step 2005: the encoder determines whether there is an existing APS, in which the corresponding coding tool parameters are identical to the parameters of the SAO coding tool or the parameters of the ALF coding tool used for the current slice, in existing APSs; if so, Step 2006 is executed; otherwise, Step 2007 is executed.

Step 2006 is completely identical to Step 606.
Step 2007: the encoder sets the APS overwriting mode to ensure that the decoder can correctly get the picture-level coding tool parameters, assigns a value to aps_overwriting_pattern[0] in the slice-level data structure based on the set APS overwriting mode, and writes the value of the aps_overwriting_pattern[0] into the bit-stream using an encoding method corresponding to u(2). Current process ends.

Step 2008: the encoder determines whether it is needed to use, in the process of encoding subsequent slices, the SAO or ALF having the same coding tool parameters as the SAO or ALF used for the current slice; if so, Step 2009 is executed; otherwise, Step 2011 is executed.

Step 2009 is completely identical to Step 608.
Step 2010: the encoder sets the APS overwriting mode to ensure that the decoder can correctly get the picture-level coding tool parameters, assigns a value to aps_overwriting_pattern[0] in the slice-level data structure based on the set overwriting mode, and writes the value of the aps_overwriting_pattern[0] into the bit-stream using the encoding method corresponding to u(2). Current process ends.

Step 2011 is completely identical to Step 609.

This embodiment also can use the APS bit-stream structure referred to in Embodiment 4. At this time, when the encoder generates a separate APS for one picture-level coding tool, in this generated APS, all flags for the tool parameters of other picture-level coding tools in this APS are set to 0. For example, in a separate APS generated for the ALF tool parameters, the encoder sets aps_sample_adaptive_offset_data_present_flag to 0.

Embodiment 6

The APS bit-stream structure used in this embodiment is identical to that used in Embodiment 1.

This embodiment allows a slice to refer to the coding tool parameters given in multiple APSs; the indication method of multiple APSs in slice header is as shown in Table 2. This embodiment signals the APS indication information in slice header, specifically as shown in Line 6 to Line 13 shown in Table 2.

The decoder in this embodiment determines the coding tool parameters used for decoding the current slice using the APS overwriting mode. The APS overwriting mode used in this embodiment and the corresponding operation methods are as shown in Table 8. When there are multiple APSs in slice header, the decoder determines the APS overwriting mode according to the absolute difference abs(x) between APS identifiers given by aps_id[i] and aps_id[i−1] (i=1, 2, number_valid_aps−1). In Table 8, abs(x) returns the absolute value of a real number x.

TABLE 8

| abs(aps_id[i] − aps_id[i − 1]) (binary representation) | Overwriting Mode |
|---|---|
| 00 | Not execute any APS information overwriting operation; neglect the APS with its identifier equal to aps_id[i]. |
| 01 | Overwrite SAO information: overwrite the previously determined parameters of the SAO coding tool with the parameters of the SAO coding tool in the APS with its identifier equal to aps_id[i]. |
| 10 | Overwrite ALF information: overwrite the previously determined parameters of the ALF coding tool with the parameters of the ALF coding tool in the APS with its identifier equal to aps_id[i]. |

TABLE 8-continued

| abs(aps_id[i] − aps_id[i − 1]) (binary representation) | Overwriting Mode |
|---|---|
| 11 | Overwrite the previously determined parameters of the SAO coding tool and the previously determined parameters of the ALF coding tool with the parameters of the SAO coding tool and the parameters of the ALF coding tool, respectively, in the APS with its identifier equal to aps_id[i]. |

Figure 21:
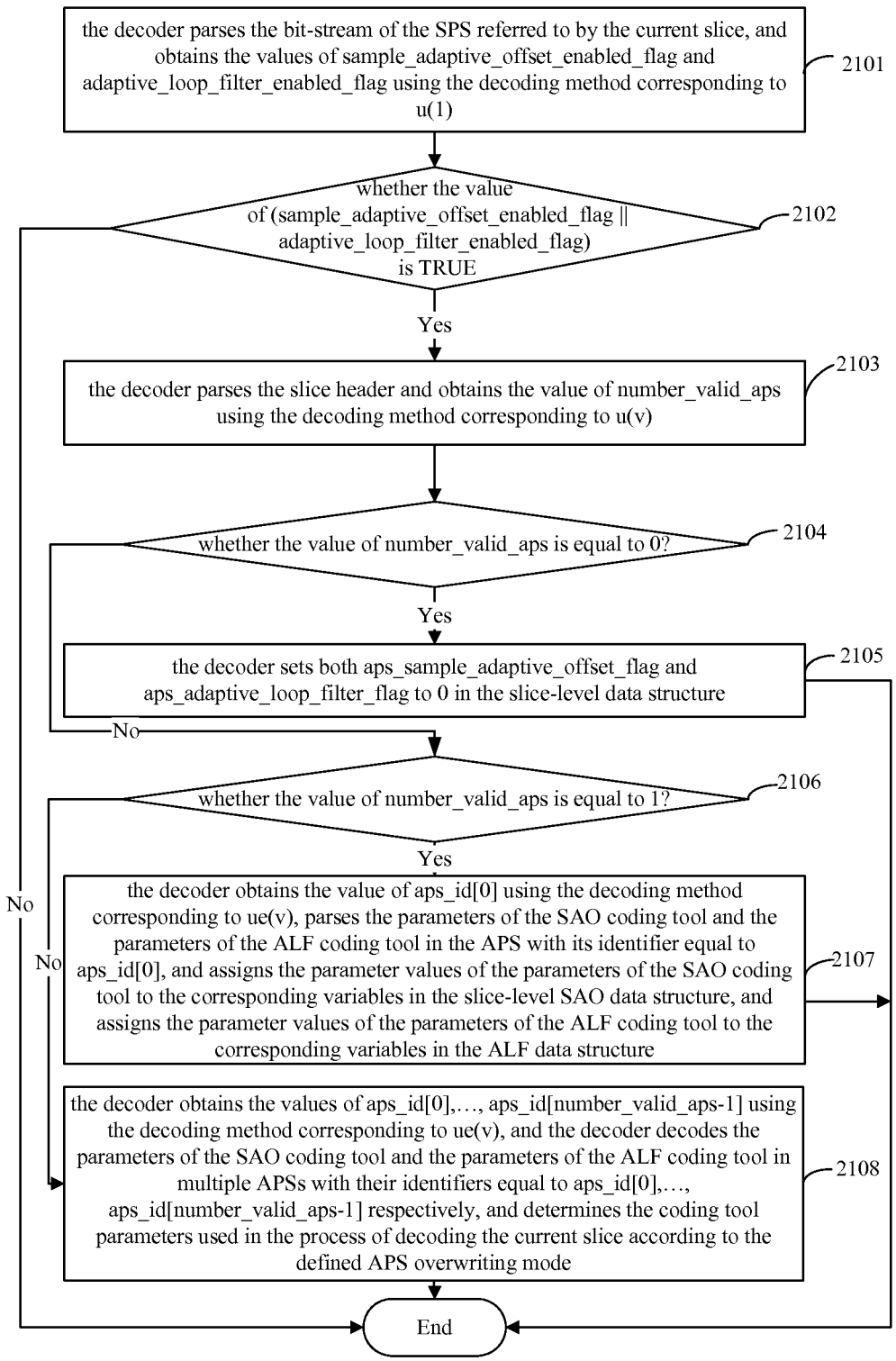
FIG. 21 shows an implementation flowchart of decoding a slice-level multi-APS bit-stream according to Embodiment 6 of the disclosure.

In this embodiment, the process that the decoder decodes a slice-level multi-APS bit-stream, as shown in FIG. 21, may include the following steps.

Step 2101 is completely identical to Step 201.
Step 2102 is completely identical to Step 202.
Step 2103 is completely identical to Step 203.
Step 2104 is completely identical to Step 204.
Step 2105 is completely identical to Step 205.
Step 2106: if the value of number_valid_aps is equal to 1, Step 2107 is executed; if the value of number_valid_aps is not equal to 1 or 0, Step 2108 is executed.
Step 2107 is completely identical to Step 207.
Step 2108: the decoder obtains the values of aps_id[0], aps_id[1], . . . , aps_id[number_valid_aps−1] using the decoding method corresponding to ue(v), decodes the parameters of the coding tools of SAO and ALF in multiple APSs with their identifiers equal to aps_id[0], aps_id[1], . . . , aps_id[number_valid_aps−1] respectively, and determines the coding tool parameters used in the process of decoding the current slice according to the defined APS overwriting mode. Current process ends.

Figure 22:
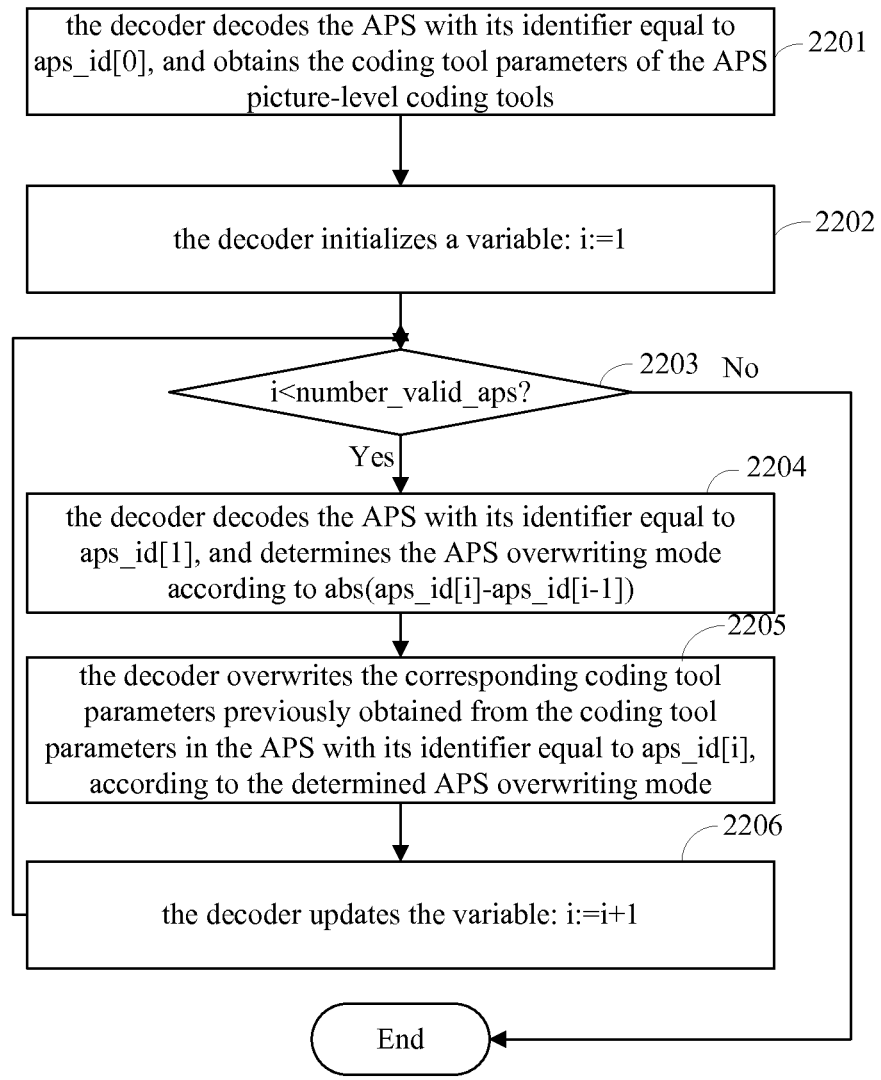
FIG. 22 shows a flowchart of the implementation of Step 2108 shown in FIG. 21.

Here, the process of determining the coding tool parameters used in the process of decoding the current slice according to the defined APS overwriting mode in Step 2108, as shown in FIG. 22, may include the following steps.

Step 2201: the decoder decodes the APS with its identifier equal to aps_id[0], and obtains the coding tool parameters from the APS for picture-level coding tools.
Step 2202: the decoder initializes a variable: i:=1.
Step 2203: if i<number_valid_aps is satisfied, Step 2204 is executed; otherwise, current process ends.
Step 2204: the decoder decodes the APS with its identifier equal to aps_id[i], and determines the APS overwriting mode according to abs(aps_id[i]-aps_id[i−1]).
Step 2205: the decoder overwrites the corresponding previously determined coding tool parameters with the coding tool parameters in the APS with its identifier equal to aps_id[i], according to the determined APS overwriting mode.
Step 2206: the decoder updates the variable: i:=i+1. Then, Step 2203 is executed.

Figure 23:
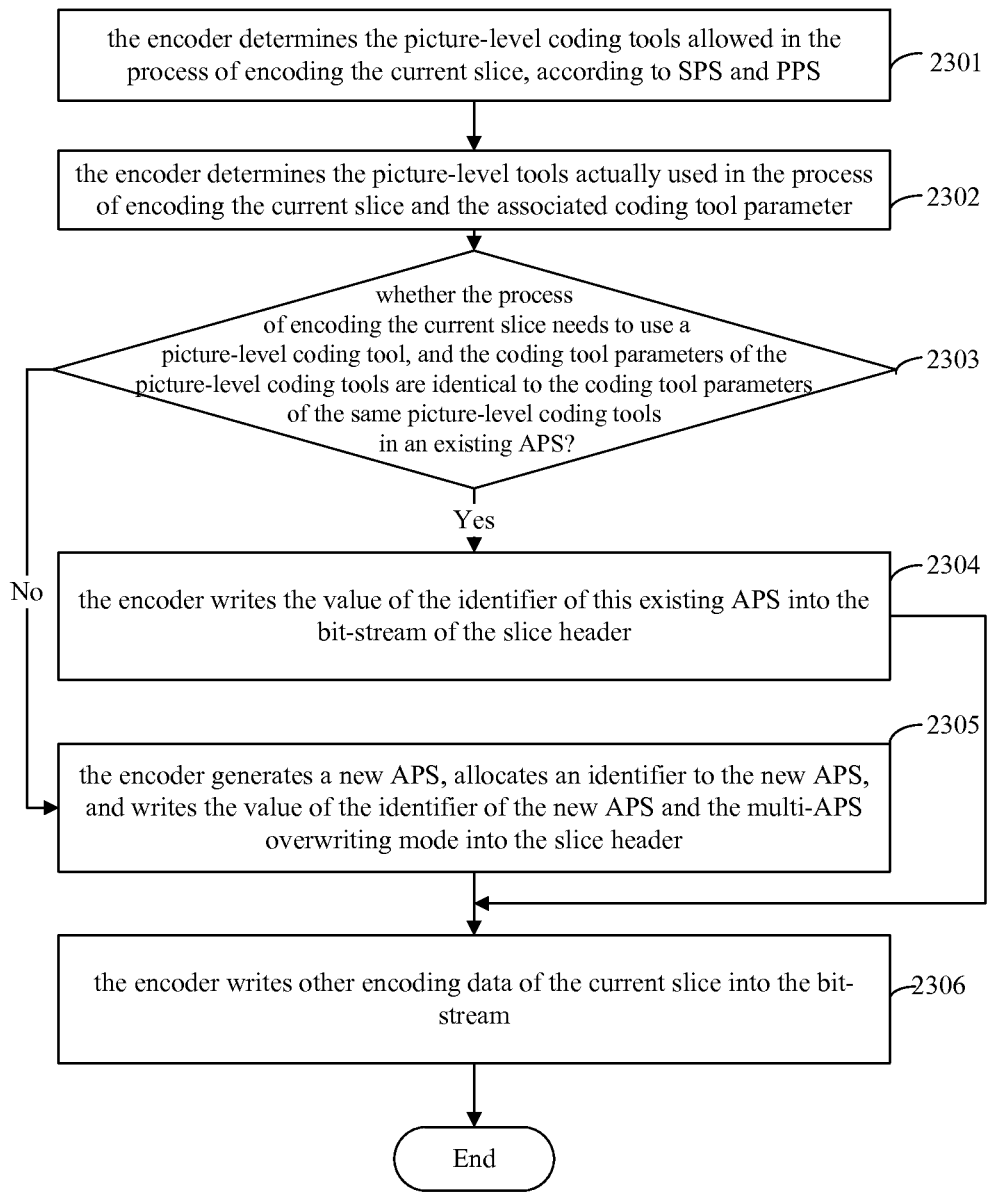
FIG. 23 shows an implementation flowchart of encoding a slice-level multi-APS bit-stream according to Embodiment 6 of the disclosure.

Correspondingly, the process that the encoder encodes a slice-level multi-APS bit-stream in this embodiment, as shown in FIG. 23, may include the following steps.

Step 2301 is completely identical to Step 1901.
Step 2302 is completely identical to Step 1902.
Step 2303: if the current slice uses a picture-level coding tool, and the coding tool parameters of the picture-level coding tool is identical to the coding tool parameters of the same picture-level coding tool that are already contained in an existing APS, Step 2304 is executed; otherwise, Step 2305 is executed.

Step 2304: the encoder writes the value of the identifier of the existing APS into the slice header; then Step 2306 is executed.

If the encoder detects an existing APS in which the tool parameters of the picture-level coding tools are completely identical to the tool parameters of all picture-level coding tools used for the current slice, the encoder sets the value of number_valid_aps to 1 in the slice-level data structure, writes the value of number_valid_aps into the bit-stream using the encoding method corresponding to u(v), acquires the value of the identifier of the APS in which the corresponding coding tool parameters are identical to the coding tool parameters used for the current slice, assigns the value of the identifier of the APS to aps_id[0] in the slice-level data structure, and writes the value of aps_id[0] into the bit-stream using the encoding method corresponding to ue(v).

If there is one existing APS in which the parameters of the SAO coding tool are identical to the parameters of the SAO coding tool used for the current slice and one existing APS in which the parameters of the ALF coding tool are identical to the parameters of the ALF coding tool used for the current slice, and the relationship between the identifiers of the two APSs exactly meets the need to perform the desired APS overwriting mode, then, the encoder sets the value of number_valid_aps to 2 in the slice-level data structure, writes the value of number_valid_aps into the bit-stream using the method corresponding to u(v), assigns the values of the identifiers of the two APSs to aps_id[0] and aps_id[1] respectively, and writes the values of aps_id[0] and aps_id[1] into the bit-stream using the encoding method corresponding to ue(v).

If there is one existing APS in which the parameters of the SAO coding tool are identical to the parameters of the SAO coding tool used for the current slice and one existing APS in which the parameters of the ALF coding tool are identical to the parameters of the ALF coding tool used for the current slice, but the relationship between the identifiers of the two APSs does not meet the need to perform the desired APS overwriting mode, then, the encoder sets the value of number_valid_aps to 2, assigns the identifier of the APS consuming more bits to aps_id[0], generates a new APS and encodes in this new APS the coding tool parameters of the other picture-level coding tool, assigns an identifier to this APS according to the need for performing the desired APS overwriting mode, assigns the value of the identifier to aps_id[1], writes the value of number_valid_aps into the bit-stream using the encoding method corresponding to u(v), and writes the values of aps_id[0] and aps_id[1] into the bit-stream using the encoding method corresponding to ue(v).

In the process of writing the identifiers of multiple APSs into the bit-stream of the slice header, the encoder must ensure that, through the set multiple APSs, the decoder in this embodiment can correctly get the coding tool parameters of picture-level coding tools using the multi-APS bit-stream decoding method and the defined APS overwriting mode.

Step 2305: the encoder generates a new APS, allocates an identifier to the new APS, and writes the identifier of the new APS and the multi-APS overwriting mode into the slice header; then, Step 2306 is executed.

Step 2306: the encoder writes other encoding data of the slice into the bit-stream. The process of encoding the slice ends.

Figure 24:
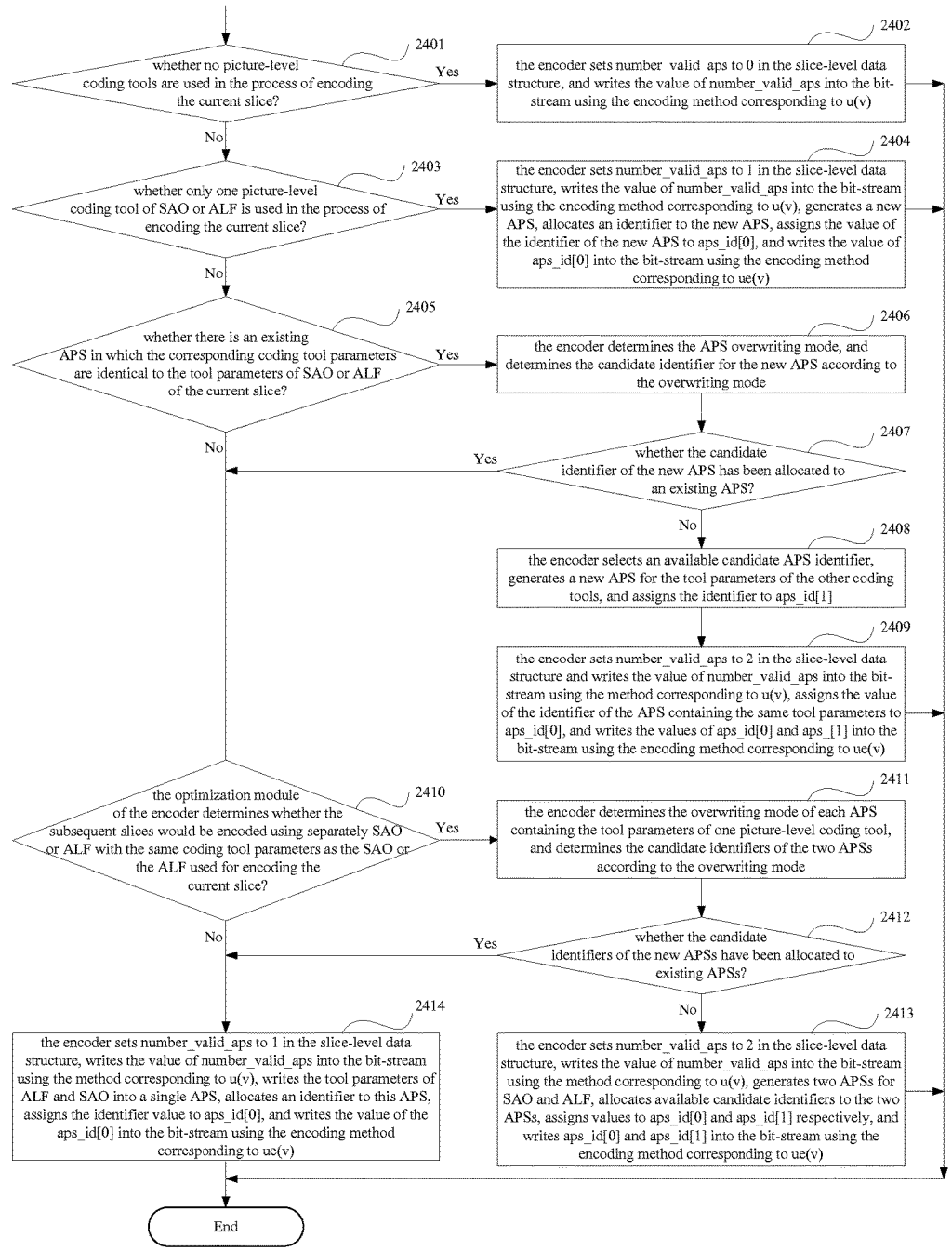
FIG. 24 shows a flowchart of the implementation of Step 2305 shown in FIG. 23.

The implementation of generating a new APS in Step 2305, as shown in FIG. 24, may include the following steps.

The process of one implementation of Step 2305 is as shown in FIG. 24.

Step 2401 is completely identical to Step 601.

Step 2402 is completely identical to Step 602.

Step 2403: if the encoder uses only one picture-level coding tool of SAO or ALF in the process of encoding the current slice, Step 2404 is executed; if the encoder uses both picture-level coding tools of SAO and ALF in the process of encoding the current slice, Step 2405 is executed.

Step 2404 is completely identical to Step 604.

Step 2405: the encoder determines whether there is an existing APS, in which the corresponding coding tool parameters are identical to the parameters of the SAO coding tool or the parameters of the ALF coding tool used for the current slice; if so, Step 2406 is executed; otherwise, Step 2410 is executed.

Step 2406: the encoder determines the APS overwriting mode, and determines candidate identifiers of the new APS according to the APS overwriting mode.

Step 2407: the encoder judges whether the determined candidate identifiers of the new APS have been allocated; if so, Step 2410 is executed; otherwise, Step 2408 is executed.

Step 2408: the encoder selects an available candidate APS identifier, generates a new APS for the tool parameters of the other coding tool, and assigns the value of the identifier of the generated APS to aps_id[1].

Step 2409: the encoder sets number_valid_aps to 2 in the slice-level data structure and writes number_valid_aps into the bit-stream using a method corresponding to u(v), assigns the value of the identifier of the APS having the same tool parameters to aps_id[0], and write aps_id[0] and aps_[1] into the bit-stream using the encoding method corresponding to ue(v). Current process ends.

Step 2410: the optimization module of the encoder determines whether it is needed to use, in the process of encoding subsequent slices, separately the SAO or ALF having the same coding tool parameters as the SAO or ALF used for the current slice, if so, Step 2411 is executed; otherwise, Step 2414 is executed.

Step 2411: the encoder determines the overwriting mode of the APSs containing the tool parameters of one picture-level coding tool, and determines the candidate identifiers of the two APSs according to the overwriting mode.

Step 2412: the encoder determines whether the candidate identifiers of the new APS have not been allocated to an existing APS, if so, Step 2413 is executed; otherwise, Step 2414 is executed.

Step 2413: the encoder sets number_valid_aps to 2 in the slice-level data structure, writes the number_valid_aps into the bit-stream using the method corresponding to u(v), generates two APSs for SAO and ALF respectively, allocates available candidate identifiers to the two APSs, assigns values to aps_id[0] and aps_id[1] respectively, and writes aps_id[0] and aps_id[1] into the bit-stream using the encoding method corresponding to ue(v). Current process ends.

Step 2414 is completely identical to Step 609.

Embodiment 7

The implementation of encoding/decoding a slice-level multi-APS bit-stream using a picture-level coding tool and a picture-level or slice-level common control module is described in detail in this embodiment.

The APS bit-stream structure used in this embodiment is as shown in Table 9.

TABLE 9

| | Descriptor |
|---|---|
| aps_rbsp( ) { | |
|   aps_id | ue(v) |
|   aps_common_management_module_data_present_flag | u(1) |
|   if | |
|   (aps_common_management_module_data_present_flag) | |
|     common_management_module_data( ) | |
|   else | |
|     picture_level_coding_tool_data( ) | |
| } | |

In Table 9, the syntax element aps_common_management_module_data_present_flag indicates the category of the coding tool parameters contained in an APS. When the value is equal to 1, the data contained in the APS refers to the coding tool parameters of the coding tools related to the picture-level or slice-level common control module, wherein the coding tool parameters includes flags and operation parameters, and the coding tool parameters are contained in the data structure common_management_module_data( ). When the value is equal to 0, the data contained in the APS refers to the coding tool parameters of the picture-level coding tools, wherein the coding tool parameters include On/Off flags and operation parameters, and the coding tool parameters are contained in the data structure picture_level_coding_tool_data( ).

The data structure picture_level_coding_tool_data( ) may be identical to the data structure of the coding tool parameters used by the APS mentioned in Embodiment 1 to Embodiment 6; the data structure common_management_module_data( ) may be similar to the data structure of the coding tool parameters used by the APS mentioned in Embodiment 1 to Embodiment 6; thus, no further description is needed here.

Figure 25:
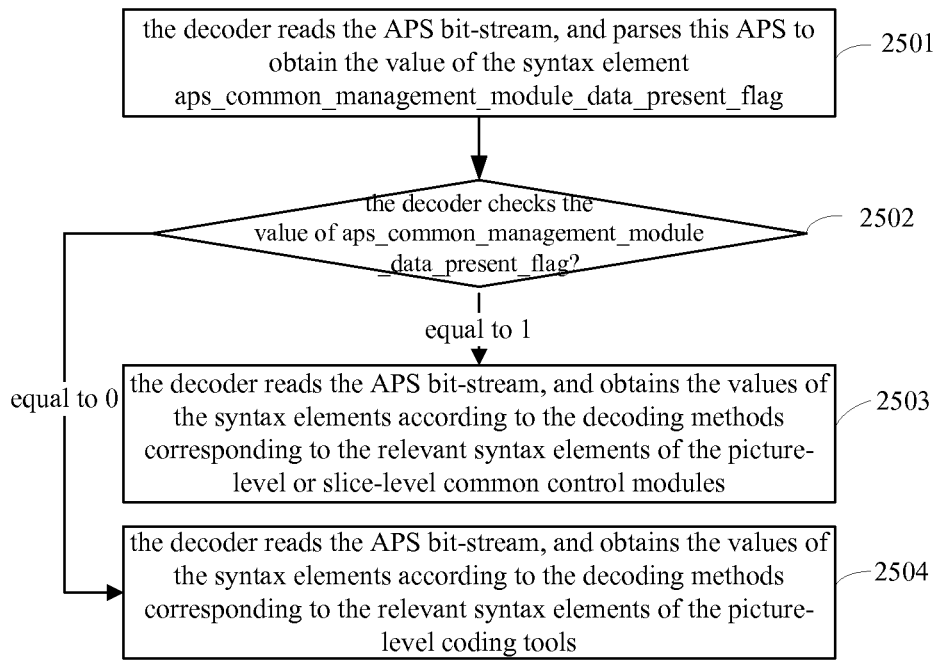
FIG. 25 shows an implementation flowchart of the APS decoding process according to Embodiment 7 of the disclosure.

Based on the APS bit-stream structure shown in FIG. 9, the corresponding decoding process, as shown in FIG. 25, may include the following steps.

Step 2501: the decoder reads the APS bit-stream, and parses the APS bit-stream to obtain the value of the syntax element aps_common_management_module_data_present_flag using the decoding method corresponding to u(1).

Step 2502: if the value of aps_common_management_module_data_present_flag is equal to 1, Step 2503 is executed; if the value of aps_common_management_module_data_present_flag is equal to 0, Step 2504 is executed.

Step 2503: the decoder reads the APS bit-stream, and obtains the value of each syntax element according to the decoding method corresponding to the relevant syntax element of the picture-level or slice-level common control module. Current decoding process ends.

Step 2504: the decoder reads the APS bit-stream, and obtains the value of each syntax element according to the decoding method corresponding to the relevant syntax element of the picture-level coding tools. Current decoding process ends.

Figure 26:
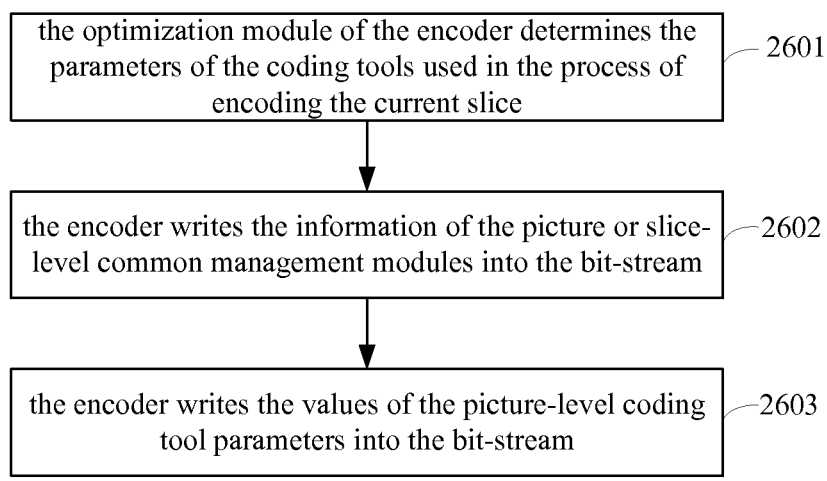
FIG. 26 shows an implementation flowchart of the APS encoding process according to Embodiment 7 of the disclosure.

Based on the APS bit-stream structure shown in FIG. 9, the corresponding encoding process, as shown in FIG. 26, may include the following steps.

Step 2601: the optimization module of the encoder determines the parameters of the coding tools used in the process of encoding the current slice.

The optimization module of the encoder is configured to determine the coding tools and the coding tool parameters used in the process of encoding the current coding unit, for example, the existing rate-distortion optimization module.

Step 2602: the encoder writes the information of the picture-level or slice-level common management module into the bit-stream.

The encoder determines whether the information of the picture-level or slice-level common management module currently used is identical to the existing relevant information, or determines whether the information of the picture-level or slice-level common management module currently used can be acquired from an existing APS; if so, the encoder does not need to encode the information of the picture-level or slice-level common management module currently used; otherwise, the encoder needs to encode the information of the picture-level or slice-level common management currently used.

If the encoder needs to encode the information of the picture-level or slice-level common management module currently used, the encoder determines whether it is needed to write the information of the picture-level or slice-level common management module into the slice header separately; if so, the encoder writes the information of the picture-level or slice-level common management module into the current slice header separately; otherwise, the encoder generates a new APS, allocates an APS identifier and encodes in this new APS the coding tool parameters of the picture-level or slice-level common management module.

Step 2603: the encoder writes the picture-level coding tool parameters into the bit-stream.

The encoder determines whether the picture-level coding tool parameters currently used are identical to the existing relevant information, or determines whether the picture-level or slice-level common management module information currently used can be acquired from an existing APS; if so, the encoder does not need to encode the picture-level tool parameters currently used; otherwise, the encoder needs to encode the picture-level tool parameters currently used.

If the encoder needs to encode the coding tool parameters of the picture-level coding tools currently used, the encoder generates a new APS, allocates an APS identifier and encodes in this new APS the coding tool parameters of the picture-level coding tools.

This embodiment allows a slice to refer to the coding tool parameters given in multiple APSs. The indication method of multiple APSs in the slice header is as shown in Table 10. This embodiment signals the APS indication information in slice header, specifically as shown in Line 10 to Line 16 in Table 10.

TABLE 10

| | Descriptor |
|---|---|
| slice_header( ) { | |
|   lightweight_slice_flag | u(1) |
|   if( !lightweight_slice_flag ) { | |
|     slice_type | ue(v) |
|     pic_parameter_set_id | ue(v) |
|     if( sample_adaptive_offset_enabled_flag \|\| adaptive_loop_filter_enabled_flag ) { | |
|       aps_id | ue(v) |
|     } | |
|     ...... | |
|     referring_to_aps_flag | u(1) |
|     if (referring_to_aps_flag) { | |
|       aps_id_management_module | ue(v) |
|     } | |

TABLE 10-continued

| | Descriptor |
|---|---|
|     else { | |
|       common_management_module_ data( ) | |
|     } | |
|     ...... | |
|   } | |
|   ...... | |
| } | |

In Table 10, aps_id indicates the identifier of the APS referred to in the process of decoding the current slice. The decoder configures the picture-level coding tools used in the process of decoding the current slice, using the coding tool parameters of the picture-level coding tools in the APS with its identifier equal to aps_id.

In Table 10, referring_to_aps_flag indicates the source of the coding tool parameters used to configure the picture-level or slice-level common management module used in the process of decoding the current slice. When the value of referring_to_aps_flag is equal to 1, the decoder configures the picture-level or slice-level common management module used in the process of decoding the current slice to the coding tool parameters of the picture-level or slice-level common management module in the APS; when the value of referring_to_aps_flag is equal to 0, the decoder configures the picture-level or slice-level common management module used in the process of decoding the current slice to the coding tool parameters of the picture-level or slice-level common management module in slice header, that is, the parameters contained in the data structure common_management_module_data( ) in slice header.

In Table 10, aps_id_management_module indicates the identifier of the APS applied to the process of decoding the current slice. The decoder configures the picture-level or slice-level common management module used in the process of decoding the current slice, using the coding tool parameters of the picture-level coding tools in the APS with its identifier equal to aps_id_management_module.

Figure 27:
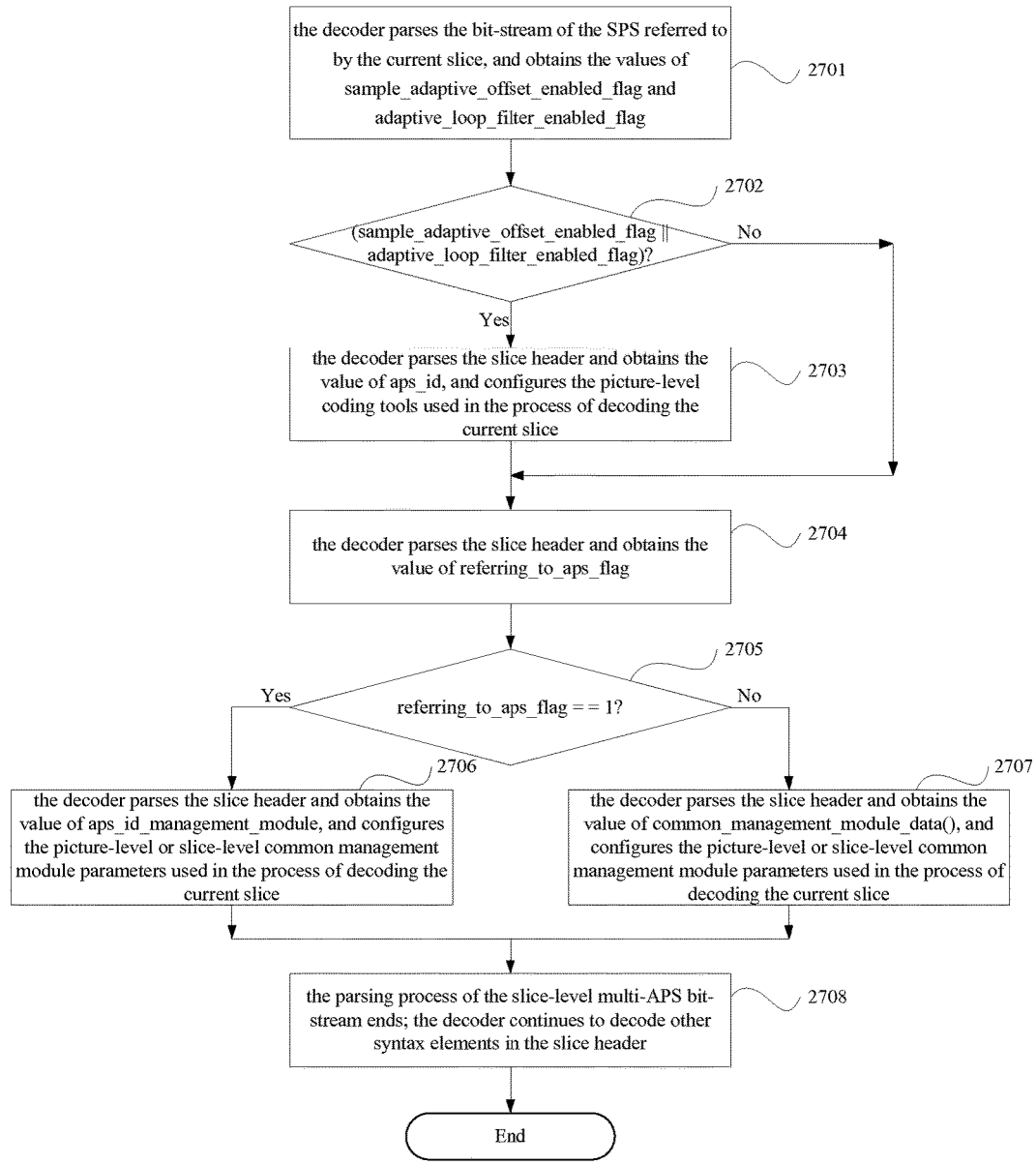
FIG. 27 shows an implementation flowchart of decoding a slice-level multi-APS bit-stream according to Embodiment 7 of the disclosure.

Corresponding to Table 10, the process that the decoder decodes a slice-level multi-APS bit-stream in this embodiment, as shown in FIG. 27, may include the following steps.

Step 2701 is completely identical to Step 201.

Step 2702: the decoder determines whether the value of (sample_adaptive_offset_enabled_flag\|\| adaptive_loop_filter_enabled_flag) is TRUE; if TRUE, Step 2703 is executed; if FALSE, step 2704 is executed.

Step 2703: the decoder parses the slice header and obtains the value of aps_id using the decoding method corresponding to u(v), and configures the picture-level coding tools used in the process of decoding the current slice to the coding tool parameters of the picture-level coding tools in the APS with its identifier equal to aps_id. Then, Step 2704 is executed.

Step 2704: the decoder parses the slice header and obtains the value of referring_to_aps_flag using the decoding method corresponding to u(1).

Step 2705: the decoder determines whether the value of referring_to_aps_flag is equal to 1; if equal to 1, Step 2706 is executed; if equal to 0, Step 2707 is executed.

Step 2706: the decoder parses the slice header and obtains the value of aps_id_management_module using the decoding method corresponding to ue(v), and configures the picture-level or slice-level common management module used in the process of decoding the current slice to the coding tool parameters of the picture-level or slice-level common management module in the APS with its identifier equal to aps_id_management_module. Then, Step 2708 is executed.

Step 2707: the decoder parses the data structure common_management_module_data( ) in the slice header, and configures the picture-level or slice-level common management module used in the process of decoding the current slice to the values of the corresponding syntax elements in the data structure common_management_module_data( ). Then, Step 2708 is executed.

Step 2708: the process of decoding the slice-level multi-APS bit-stream ends; the decoder continues to decode other syntax elements in the slice header.

Figure 28:
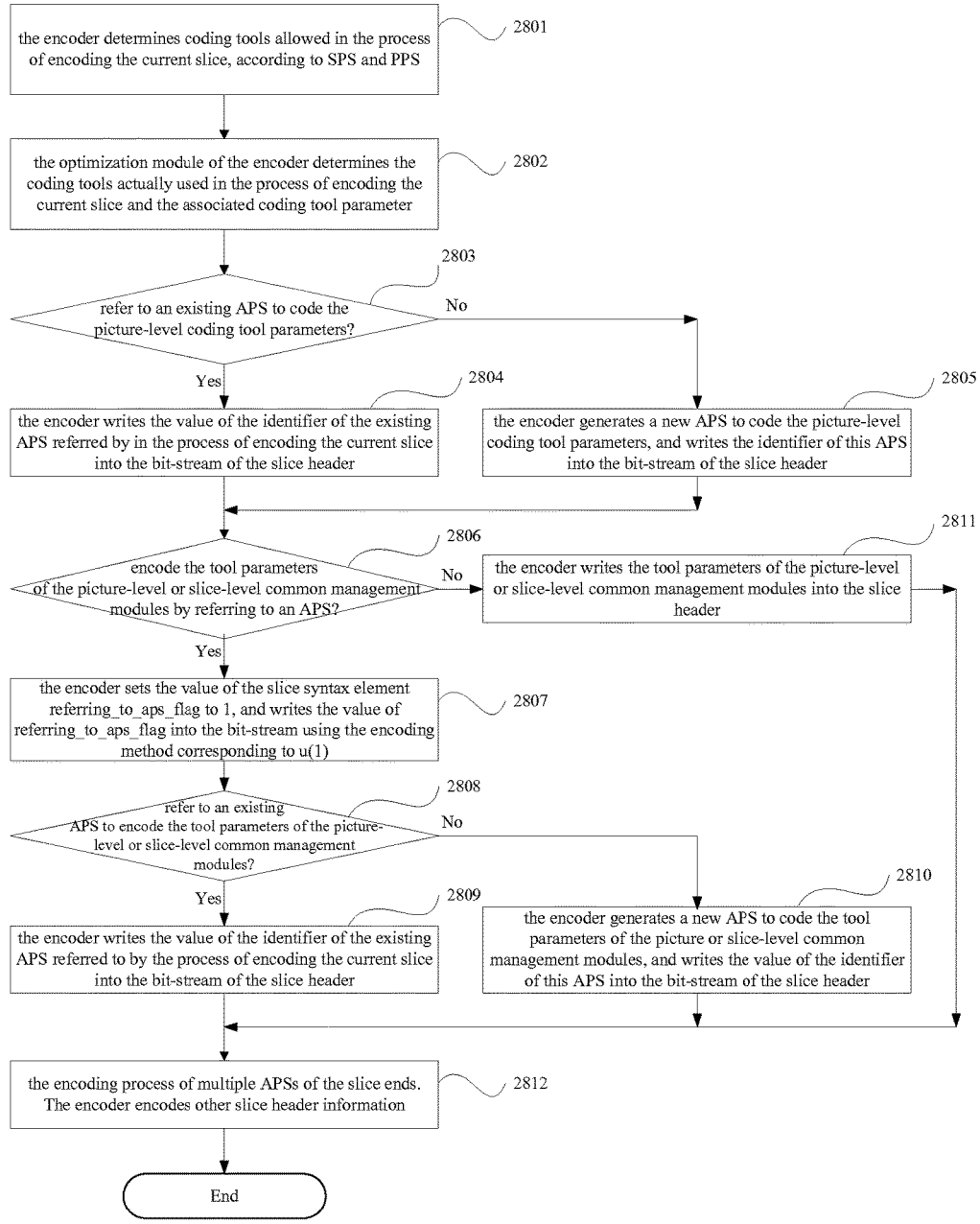
FIG. 28 shows an implementation flowchart of encoding a slice-level multi-APS bit-stream according to Embodiment 7 of the disclosure.

Correspondingly, the process that the encoder encodes a slice-level multi-APS bit-stream in this embodiment, as shown in FIG. 28, may include the following steps.

Step 2801 is completely identical to Step 501.

Step 2802 is completely identical to Step 502.

Step 2803: if the coding tool parameters of the picture-level coding tools used for the current slice are completely identical to the coding tool parameters of the same picture-level coding tools that are already contained in an existing APS, Step 2804 is executed; otherwise, Step 2805 is executed.

Step 2804: the encoder acquires the identifier of the APS in which the coding tool parameters are identical to the coding tool parameters used for the current slice, assigns the APS identifier value to aps_id[0] in the slice-level data structure, and writes the value of the aps_id[0] into the bit-stream using the encoding method corresponding to ue(v). Then, Step 2806 is executed.

Step 2805: the encoder generates a new APS, allocates an identifier to the new APS, and encodes in the new APS the coding tool parameters of the picture-level coding tools used for the current slice, assigns the identifier value of the new APS to aps_id[0] in the slice-level data structure, and writes the value of the aps_id[0] into the bit-stream using the encoding method corresponding to ue(v). Then, Step 2806 is executed.

Step 2806: the encoder determines whether it is needed to encode the coding tool parameters of the picture-level or slice-level common management module by referring to an APS; if so, Step 2807 is executed; otherwise, Step 2811 is executed.

In practical application, the encoder can directly write the coding tool parameters of the picture-level or slice-level common management module used for encoding the current slice into the slice header data structure common_management_module_data( ), also can write the coding tool parameters of the picture-level or slice-level common management module used for encoding the current slice into the slice header data structure common_management_module_data( ) by referring to an APS.

Step 2807: the encoder sets the value of the slice-level syntax element referring_to_aps_flag to 1, and writes the value of referring_to_aps_flag into the bit-stream using the encoding method corresponding to u(1). Then, Step 2808 is executed.

Step 2808: if the coding tool parameters of the picture-level or slice-level common management module used for encoding the current slice are completely identical to the corresponding coding tool parameters that are already contained in an existing APS, Step 2809 is executed; otherwise, Step 2810 is executed.

Step 2809: the encoder acquires the identifier value of the APS in which the corresponding coding tool parameters are identical to the coding tool parameters of the picture-level or slice-level common management module for the current slice, assigns the identifier value of the APS to aps_id_management_module in the slice-level data structure, and writes the value of the aps_id_management_module into the bit-stream using the encoding method corresponding to ue(v). Then, Step 2812 is executed.

Step 2810: the encoder generates a new APS, encodes in this new APS the coding tool parameters of the picture-level or slice-level common management module for the current slice, allocates an identifier to the new APS, assigns the identifier value of the APS to aps_id_management_module in the slice-level data structure, and writes the value of the aps_id_management_module into the bit-stream using the encoding method corresponding to ue(v). Then, Step 2812 is executed.

Step 2811: the encoder sets the value of the slice syntax element referring_to_aps_flag to 0, and writes the value of referring_to_aps_flag into the bit-stream using the encoding method corresponding to u(1), assigns the coding tool parameters of the picture-level or slice-level common management module for the current slice to the corresponding syntax elements in the slice-level data structure common_management_module_data( ), and writes the values of the syntax elements into the bit-stream using the encoding methods corresponding to the syntax elements in the data structure common_management_module_data( ). Then, Step 2812 is executed.

Step 2812: the process of encoding multiple APSs of the slice ends. The encoder continues to encode other slice header.

Embodiment 8

The implementation of encoding/decoding a slice-level multi-APS bit-stream using a picture-level coding tool and a picture-level or slice-level common control module is described in detail in this embodiment.

The APS bit-stream structure used in this embodiment is as shown in Table 9 in Embodiment 7.

This embodiment allows a slice to refer to coding tool parameters given in multiple APSs; the indication method of multiple APSs in the slice header is as shown in Table 11; this embodiment signals the APS indication information in slice header, specifically as shown in Line 6 to Line 8 shown in Table 11.

TABLE 11

|  | Descriptor |
|---|---|
| slice_header( ) { | |
|   lightweight_slice_flag | u(1) |
|   if( !lightweight_slice_flag ) { | |
|     slice_type | ue(v) |
|     pic_parameter_set_id | ue(v) |
|     picture_level_coding_tools_APS_data( ) | |
|     ...... | |
|     common_management_module_APS_data( ) | |
|     ...... | |
|   } | |
|   ...... | |
| } | |

In Table 11, picture_level_coding_tools_APS_data( ) is the structure of the slice-level multi-APS bit-stream structure for the picture-level coding tools. This bit-stream structure can use the slice-level multi-APS bit-stream structure described in Embodiment 1 to Embodiment 6 in this specification. In Table 11, common_management_module_APS_data( ) is the structure of the slice-level multi-APS bit-stream structure for the picture-level or slice-level common management module, and the specific structure is as shown in Table 12.

TABLE 12

| | Descripor |
|---|---|
| common_management_module_APS_data( ) { | |
|   number_vaild_aps_management_module | u(v) |
|   if(number_vaild_aps_management_module > 0 ) { | |
|     for (i=0; | |
|     i<number_valid_aps_management_module; i++) { | |
|       aps_id_management_module[i] | ue(v) |
|     } | |
|   } | |
| } | |
| else { | |
|   common_management_module_ data( ) | |
|   } | |
| } | |

In Table 12, number_valid_aps_management_module indicates the number of APSs referred to by the current slice for decoding the coding tool parameters of the picture-level or slice-level common management module, and the value takes an integer in the range of [0, MaxNumberValidAps-ManagementModule]. If the syntax element number_valid_aps_management_module is not present in the bit-stream, its value is inferred to be 0. The upper limit MaxNumberValidApsManagementModule of the number_valid_aps_management_module can be determined according to the number of available tools of the picture-level or slice-level common management module in profile/level.

When the value of the number_valid_aps_management_module is equal to 0, the decoder does not acquire the coding tool parameters of the picture-level or slice-level common management module by referring to an APS.

In Table 12, aps_id_management_module[i] indicates the identifier of the APS referred to by the current slice for decoding the coding tool parameters of the picture-level or slice-level common management module, wherein i is an integer in the range of [0, number_valid_aps_management_module−1].

Table 11 can implement the relevant slice-level multi-APS bit-stream of the picture-level or slice-level common management module using a method similar to that in Embodiment 1 to Embodiment 6.

In this embodiment, the coding tool parameters of the picture-level coding tools and the coding tool parameters of the picture-level or slice-level common management module do not appear in one same APS; therefore, the process of encoding and decoding a slice-level multi-APS bit-stream in this embodiment can be directly deduced from the process of encoding and decoding a slice-level multi-APS bit-stream described in Embodiment 1 to Embodiment 6, and no further description is needed here.

The encoder can determine whether it is needed to encode in the slice header the coding tool parameters of the picture-level or slice-level common management module used for encoding the current slice, using the method described in Embodiment 7; if needed, the encoder sets the value of the syntax element number_valid_aps_management_module in the slice header to 0, assigns the coding tool parameters of the picture-level or slice-level common management module to the corresponding syntax elements in the data structure common_management_module_data( ), writes the values of each syntax elements into the bit-stream using the encoding methods corresponding to the syntax elements; if not needed, the encoder determines the number of APSs to be referred to using the method described in Embodiment 1 to Embodiment 6, assigns the value to the syntax element number_valid_aps_management_module, and encodes the identifier values of the used APSs.

Embodiment 9

The implementation of encoding/decoding a slice-level multi-APS bit-stream using a picture-level coding tool and a picture-level or slice-level common control module is described in detail in this embodiment.

The APS bit-stream structure used in this embodiment is as shown in Table 13.

TABLE 13

| | Descriptor |
|---|---|
| aps_rbsp( ) { | |
|   aps_id | ue(v) |
|   ...... | |
|   aps_tool_A_flag | u(1) |
|   aps_tool_B_flag | u(1) |
|   ...... | |
|   aps_common_management_module_data_present_flag | u(1) |
|   ...... | |
|   if (aps_tool_A_flag) | |
|     tool_A_param( ) | |
|   if (aps_tool_B_flag) | |
|     tool_B_param( ) | |
|   ...... | |
|   if | |
|   (aps_common_management_module_data_present_flag) | |
|     common_management_module_data( ) | |
|   ...... | |
| } | |

In Table 13, tool_A and tool_B refer to a picture-level coding tool, for example, SAO and ALF.

The implications of aps_tool_A_flag and aps_tool_B_flag can be similar to the SAO On/Off flag aps_sample_adaptive_offset_flag and the ALF On/Off flag aps_adaptive_loop_filter_flag in Table 1 in Embodiment 1. The aps_tool_A_flag can be defined as the On/Off flag of tool A. When the value of aps_tool_A_flag is equal to 1, tool A is used in the process of decoding the slice and the coding tool parameters of tool A are given in this APS; when the value of aps_tool_A_flag is equal to 0, tool A is not used in the process of decoding the slice and the current APS does not contain the tool parameters of tool A. The aps_tool_B_flag can be defined as the On/Off flag of tool B. When the value of aps_tool_B_flag is equal to 1, tool B is used in the process of decoding the slice and the coding tool parameters of tool B are given in this APS; when the value of aps_tool_B_flag is equal to 0, tool B is not used in the process of decoding the slice and the current APS does not contain the tool parameters of tool B.

The implications of aps_tool_A_flag and aps_tool_B_flag can also be similar to the implications of aps_sample_adaptive_offset_data_present_flag and aps_adaptive_loop_filter_data_present_flag in Table 4 in Embodiment 4. The aps_tool_A_flag can be defined to indicate whether the current APS includes the coding tool parameters of tool A; when the value of aps_tool_A_flag is equal to 1, the current APS includes part or all coding tool parameters of tool A; when the value of aps_tool_A_flag is equal to 0, the current APS does not contain the coding tool parameters of tool A. The aps_tool_B_flag can be defined to indicate whether the current APS includes the coding tool parameters of tool B; when the value of aps_tool_B_flag is equal to 1, the current APS includes part or all coding tool parameters of tool B;

when the value of aps_tool_B_flag is equal to 0, the current APS does not contain the coding tool parameters of tool B.

The data structure tool_A_param( ) includes part or all coding tool parameters of tool A; the data structure tool_B_param( ) includes part or all coding tool parameters of tool B.

In table 13, aps_common_management_module_data_present_flag indicates whether the APS includes the coding tool parameters of the picture-level or slice-level common control module; when the value of aps_common_management_module_data_present_flag is equal to 1, the APS includes the coding tool parameters of the picture-level or slice-level common control module, and the coding tool parameters are contained in the data structure common_management_module_data( ). When the value of aps_common_management_module_data_present_flag is equal to 0, the APS does not contain the coding tool parameters of the picture-level or slice-level common control module. Here, the data structure common_management_module_data( ) includes part or all coding tool parameters of the picture-level or slice-level common management module.

Based on Line 9 to Line 15 in Table 13, it can be seen that the APS bit-stream structure used in this embodiment allows the APS to contain the coding tool parameters of the picture-level coding tools and the coding tool parameters of the picture-level or slice-level common management module simultaneously.

This embodiment allows a slice to refer to the coding tool parameters given in multiple APSs. The indication method of multiple APSs in the slice header is as shown in Table 14. This embodiment signals the APS indication information in slice header, specifically as shown in Line 8, Line 11 to Line 19 in Table 14.

TABLE 14

|  | Descriptor |
|---|---|
| slice_header( ) { |  |
|    lightweight_slice_flag | u(1) |
|    if( !lightweight_slice_flag ) { |  |
|       slice_type | ue(v) |
|       pic_parameter_set_id | ue(v) |
|       if( sample_adaptive_offset_enabled_flag \|\| |  |
| adaptive_loop_filter_enabled_flag ) { |  |
|          aps_id | ue(v) |
|          referred_by_management_module | u(1) |
|       } |  |
|       ...... |  |
|       if (! referred_by_management_module) { |  |
|          referring_to_aps_flag | u(1) |
|          if (referring_to_aps_flag) { |  |
|             aps_id_management_module | ue(v) |
|          } |  |
|          else { |  |
|             common_management_module_ data( ) |  |
|          } |  |
|       } |  |
|       ...... |  |
|    } |  |
|    ...... |  |
| } |  |

In Table 14, referred_by_management_module indicates whether the coding tool parameters of the picture-level coding tools and the coding tool parameters of the picture-level or slice-level common management module used in the process of encoding/decoding the current slice are obtained from one same APS; when the value of referred_by_management_module is equal to 1, it indicates that the coding tool parameters of the picture-level coding tools and the coding tool parameters of the picture-level or slice-level common management module used in the process of encoding/decoding the current slice are obtained from one same APS; when the value of referred_by_management_module is equal to 0, it indicates that the coding tool parameters of the picture-level coding tools and the coding tool parameters of the picture-level or slice-level common management module used in the process of encoding/decoding the current slice come from different APSs. If referred_by_management_module is not present in the bit-stream (that is to say, both values of sample_adaptive_offset_enabled_flag and adaptive_loop_filter_enabled_flag are equal to 0), its value is inferred to be 0.

In table 14, aps_id indicates the identifier of the APS referred to by the current slice for determining the picture-level coding tools used in the process of encoding/decoding the current slice, that is, the picture-level coding tools used in the process of encoding/decoding the current slice is configured to use the coding tool parameters of the picture-level coding tools in the APS with its identifier equal to aps_id.

When the value of referring_to_aps_flag is equal to 1, the picture-level or slice-level common management module used in the process of encoding/decoding the current slice is configured to use the coding tool parameters of the picture-level or slice-level common management module in the APS; when the value of referring_to_aps_flag is equal to 0, the picture-level or slice-level common management module used in the process of encoding/decoding the current slice is configured to use the coding tool parameters of the picture-level or slice-level common management module given in the slice header (that is, the parameters contained in the data structure common_management_module_data( )).

In table 14, aps_id_management_module indicates the identifier of the APS referred to by the picture-level or slice-level common management module used in the process of encoding/decoding the current slice. The picture-level or slice-level common management module used in the process of encoding/decoding the current slice is configured to use the coding tool parameters of the picture-level or slice-level common management module in the APS with its identifier equal to aps_id_management_module.

Figure 29:
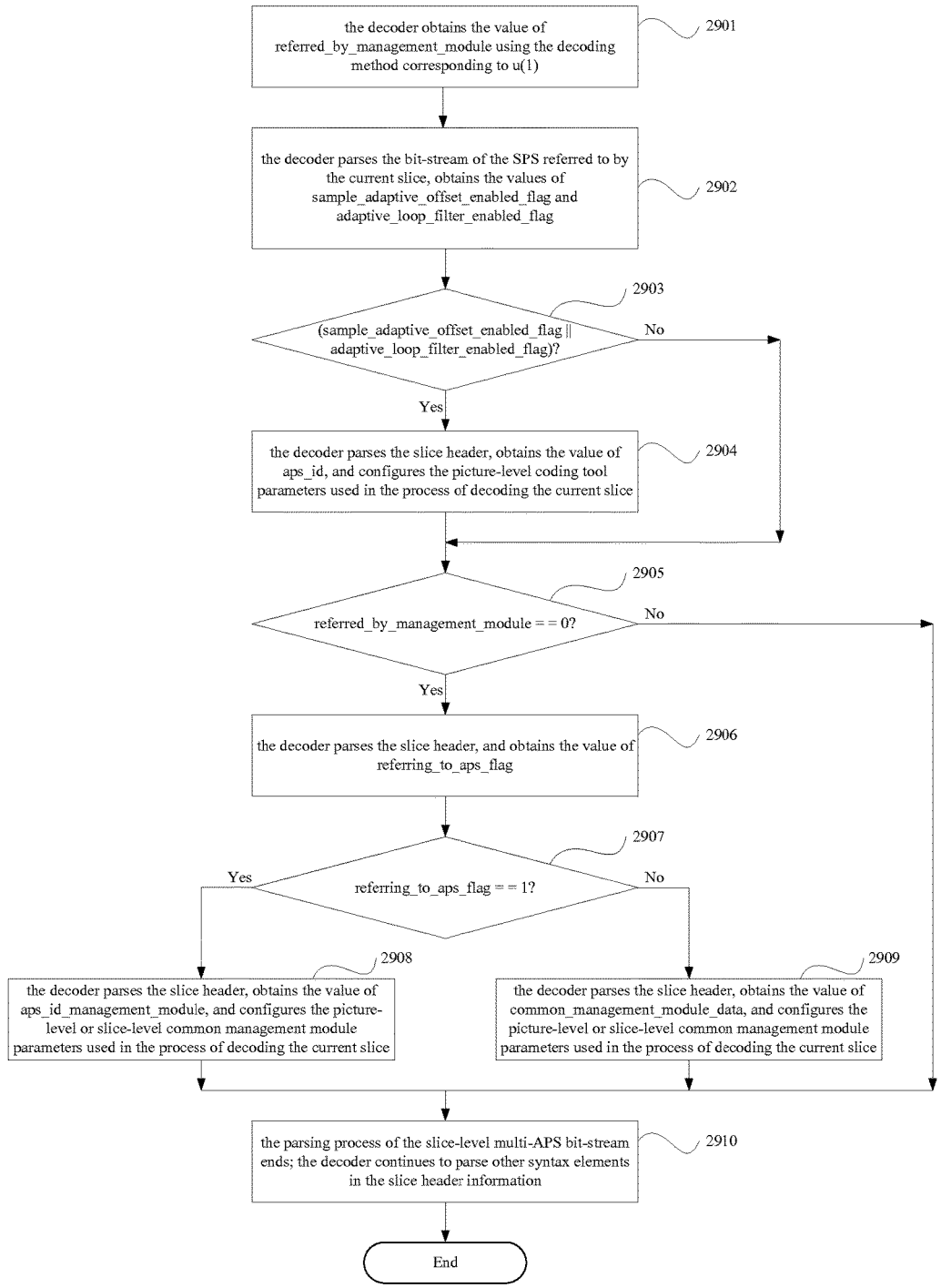
FIG. 29 shows an implementation flowchart of encoding a slice-level multi-APS bit-stream according to Embodiment 9 of the disclosure.

Corresponding to Table 14, the process that the decoder decodes a slice-level multi-APS bit-stream in this embodiment, as shown in FIG. 29, may include the following steps.

Step 2901: the decoder reads an SPS bit-stream referred to by the current slice.

Step 2902: the decoder parses the SPS bit-stream referred to by the current slice, obtains the values of sample_adaptive_offset_enabled_flag and adaptive_loop_filter_enabled_flag using the decoding method corresponding to u(1).

Step 2903: the decoder determines whether the value of (sample_adaptive_offset_enabled_flag|| adaptive_loop_filter_enabled_flag) is TRUE; if TRUE, Step 2904 is executed; if FALSE, Step 2905 is executed.

Step 2904: the decoder parses the slice header, obtains the value of aps_id using the decoding method corresponding to u(v), and obtains the value of the flag referred_by_management_module using the decoding method corresponding to u(1); if the value of referred_by_management_module is equal to 1, the decoder configures the picture-level coding tools and the picture-level or slice-level common management module used in the process of decoding the current slice to use the coding tool parameters of the picture-level coding tools and the coding tool parameters of the picture-level or slice-level common management module in the APS with its identifier equal to aps_id; if the value of referred_by_management_module is equal to 0, the decoder only configures the picture-level coding tools used in the process of decoding the current slice to use the coding tool parameters of the picture-level coding tools in the APS with its identifier equal to aps_id. Then, Step 2905 is executed.

Step 2905: the decoder determines whether the value of referred_by_management_module is equal to 0, if so, Step 2906 is executed; if the value of referred_by_management_module is equal to 1, Step 2910 is executed.

Step 2906: the decoder parses the slice header, and obtains the value of referring_to_aps_flag using the decoding method corresponding to u(1).

Step 2907: the decoder determines whether the value of referring_to_aps_flag is equal to 1; if so, Step 2908 is executed; otherwise, Step 2909 is executed.

Step 2908: the decoder parses the slice header, obtains the value of aps_id_management_module using the decoding method corresponding to ue(v), and configures the picture-level or slice-level common management module used in the process of decoding the current slice to use the coding tool parameters of the picture-level or slice-level common management module in the APS with its identifier equal to aps_id_management_module. Then, Step 2910 is executed.

Step 2909: the decoder parses the data structure common_management_module_data( ) in the slice header, and configures the picture-level or slice-level common management module used in the process of decoding the current slice to use the value of the syntax elements in the data structure common_management_module_data( ). Then, Step 2910 is executed.

Step 2910: the process of decoding the slice-level multi-APS bit-stream ends; the decoder continues to parse other syntax elements in slice header.

Figure 30:
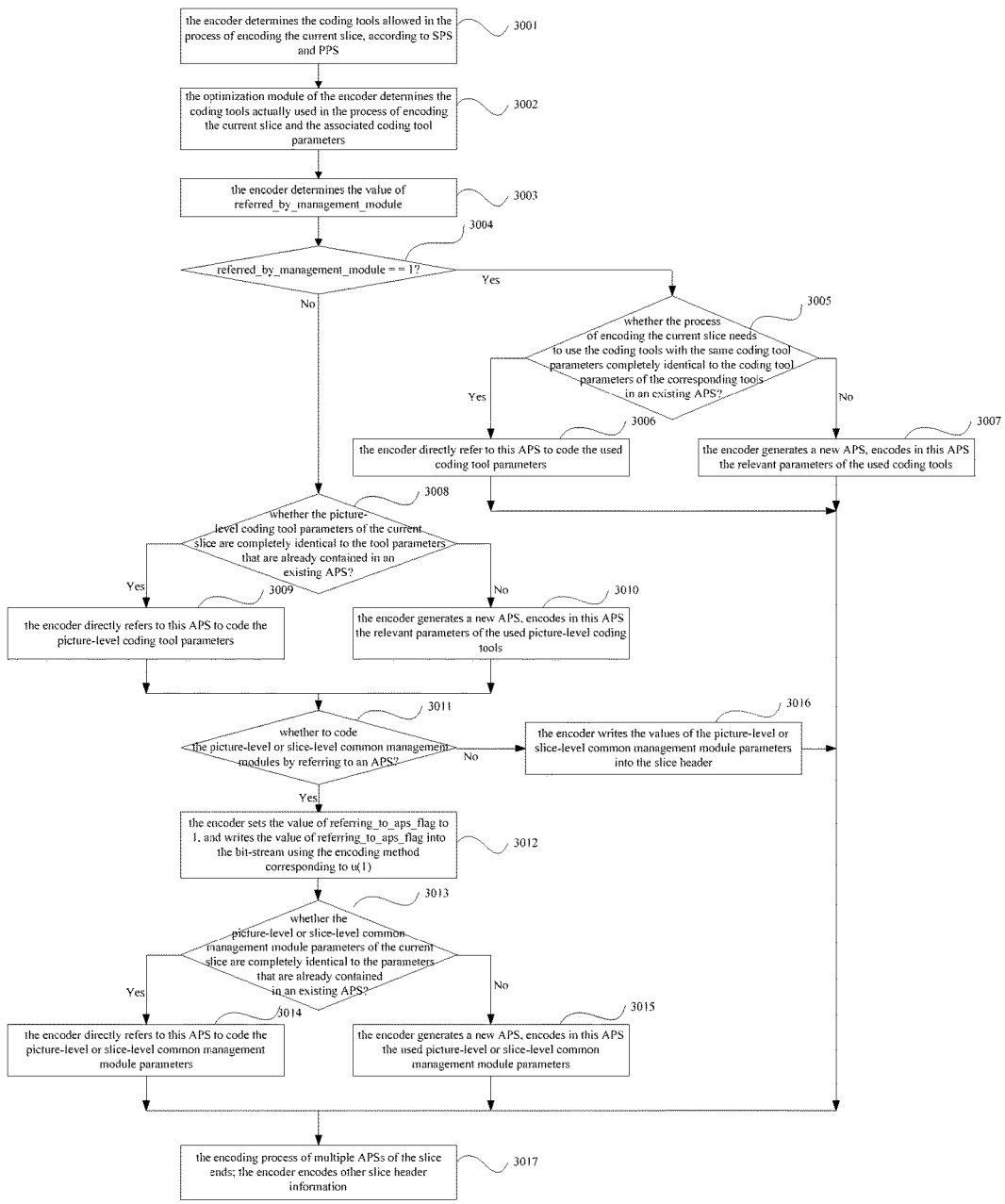
FIG. 30 shows an implementation flowchart of encoding a slice-level multi-APS bit-stream according to Embodiment 1 of the disclosure.

Correspondingly, the process that the encoder encodes a slice-level multi-APS bit-stream in this embodiment, as shown in FIG. 30, may include the following steps.

Step 3001 is completely identical to Step 501.

Step 3002 is completely identical to Step 502.

Step 3003: the optimization module of the encoder determines the value of referred_by_management_module, according to the requirements of encoding the coding tool parameters of the picture-level coding tools and the coding tool parameters of the picture-level or slice-level common management module in one same APS.

When both values of sample_adaptive_offset_enabled_flag and adaptive_loop_filter_enabled_flag are equal to 0, the encoder sets the value of referred_by_management_module to 0.

When the encoder does not need to write the coding tool parameters of the picture-level or slice-level common management module used for the current slice into the slice header data structure common_management_module_data( ) by referring to an APS, the encoder sets the value of referred_by_management_module to 0.

When the optimization module of the encoder determines that it is needed to use the above APS in the subsequent slices, the encoder writes the coding tool parameters of the picture-level coding tools and the coding tool parameters of the picture-level or slice-level common management module into one same APS, and sets the value of referred_by_management_module to 1.

When the optimization module of the encoder determines that it is needed to use the coding tool parameters of the picture-level coding tools and the coding tool parameters of the picture-level or slice-level common management module in different APSs in the process of encoding the subsequent slices, or that it is needed to use only the coding tool parameters of the picture-level coding tools or only the coding tool parameters of the picture-level or slice-level common management module in the process of encoding the subsequent slices, the encoder writes the coding tool parameters of the picture-level coding tool and the coding tool parameters of the picture-level or slice-level common management module into two different APSs, and sets the value of referred_by_management_module to 0.

Step 3004: if the encoder determines that the value of referred_by_management_module is equal to 1, Step 3005 is executed; otherwise, Step 3008 is executed.

Step 3005: if the coding tool parameters of the coding tools used for encoding the current slice is completely identical to the coding tool parameters of the same coding tools that are already contained in an existing APS, Step 3006 is executed; otherwise, Step 3007 is executed.

Step 3006: the encoder acquires the value of the identifier of the APS in which the coding tool parameters are identical to the coding tool parameters used for the current slice, assigns the APS identifier value to the aps_id in the slice-level data structure, and writes the value of the value of aps_id into the bit-stream using the encoding method corresponding to ue(v), and writes the referred_by_management_module (the value is 1 at this time) into the bit-stream using the encoding method corresponding to u(1). Then, Step 3017 is executed.

Step 3007: the encoder generates a new APS, encodes in this new APS the coding tool parameters of the picture-level coding tools and the coding tool parameters of the picture-level or slice-level common management module for the current slice, allocates an identifier to the new APS, assigns the identifier value of the new APS to aps_id in the slice-level data structure, writes the value of the aps_id into the bit-stream using the encoding method corresponding to ue(v), and writes the referred_by_management_module (the value is 1 at this time) into the bit-stream using the encoding method corresponding to u(1). Then, Step 3017 is executed.

Step 3008: if the coding tool parameters of the picture-level coding tools used for the current slice are identical to the coding tool parameters of the same picture-level coding tools that are already contained in an existing APS, Step 3009 is executed; otherwise, step 3010 is executed.

Step 3009: the encoder acquires the identifier value of the APS in which the coding tool parameters are identical to the coding tool parameters of the picture-level coding tools for encoding the current slice, assigns the APS identifier value to the aps_id in the slice-level data structure, and writes the value of the aps_id into the bit-stream using the encoding method corresponding to ue(v), and writes the referred_by_management_module (the value is 0 at this time) into the bit-stream using the encoding method corresponding to u(1). Then, Step 3011 is executed.

Step 3010: the encoder generates a new APS, encodes in this new APS the coding tool parameters of the picture-level coding tools used for the current slice, allocates an identifier to the new APS, assigns the identifier value of the new APS to the aps_id in the slice-level data structure, writes the value of the aps_id into the bit-stream using the encoding method corresponding to ue(v), and writes the referred_by_management_module (the value is 0 at this time) into the bit-stream using the encoding method corresponding to u(1). Then, Step 3011 is executed.

Step 3011: the encoder determines whether it can encode the coding tool parameters of the picture-level or slice-level common management module by referring to an APS; if so, Step 3012 is executed; otherwise, Step 3016 is executed.

Step 3012: the encoder sets the value of the slice syntax element referring_to_aps_flag to 1, and writes the value of the referring_to_aps_flag into the bit-stream using the encoding method corresponding to u(1); then, Step 3013 is executed.

Step 3013: if the coding tool parameters of the picture-level or slice-level common management module for encoding the current slice are completely identical to the coding tool parameters of the picture-level or slice-level common management module that are already contained in an existing APS, Step 3014 is executed; otherwise, Step 3015 is executed.

Step 3014: the encoder acquires the identifier value of the APS in which the coding tool parameters are identical to the coding tool parameters of the picture-level or slice-level common management module for encoding the current slice, assigns the APS identifier value to the aps_id_management_module in the slice-level data structure, and writes the value of the aps_id_management_module into the bit-stream using the encoding method corresponding to ue(v). Then, Step 3017 is executed.

Step 3015: the encoder generates a new APS, encodes in this new APS the coding tool parameters of the picture-level or slice-level common management module for encoding the current slice, allocates an identifier to the new APS, assigns the identifier value of the new APS to the aps_id_management_module in the slice-level data structure, and writes the value of the aps_id_management_module into the bit-stream using the encoding method corresponding to ue(v). Step 3017 is executed.

Step 3016: the encoder sets the value of the slice syntax element referring_to_aps_flag to 0, writes the value of the referring_to_aps_flag into the bit-stream using the encoding method corresponding to u(1), assigns the coding tool parameters of the picture-level or slice-level common management module to the corresponding syntax elements in the slice-level data structure common_management_module_data( ) and writes the value of the syntax elements into the bit-stream using the encoding methods corresponding to the syntax elements in the common_management_module_data( ).

Step 3017: the process of encoding multiple APSs of the slice-level ends; the encoder continues to encode other slice-level header information.

In this embodiment, it is also applicable to combine the APS bit-stream structure shown in Table 13 with the indication method of multiple APSs in the slice header shown in Table 10 in Embodiment 7, to implement the encoding and decoding of multiple APSs in the slice. The specific implementation is similar to the process shown in FIG. 29 and FIG. 30, and no further description is needed here.

Embodiment 10

The implementation of encoding/decoding a slice-level multi-APS bit-stream using a picture-level coding tool and a picture-level or slice-level common control module is described in detail in this embodiment.

The APS bit-stream structure used in this embodiment is identical to that shown in Table 13 in Embodiment 9.

This embodiment allows a slice to refer to the coding tool parameters given in multiple APSs. The indication method of multiple APSs in the slice header is as shown in Table 11. This embodiment signals the APS indication information in slice header, specifically as shown in Line 10 to Line 16 in Table 11.

The method for encoding and decoding multiple APSs at slice level in this embodiment is similar to that in Embodiment 8; the difference lies in that the encoding/decoding and referring process of the multiple APSs of the slice uses an APS flag similar to that in Embodiment 9.

In addition, this embodiment also can adopt the indication method of multiple APSs in slice header shown in Table 15; this embodiment signals the APS indication information to slice header, specifically as shown in Line 6 to Line 7 and Line 9 to Line 11 in Table 15.

TABLE 15

|  | Descriptor |
| --- | --- |
| slice_header( ) { | |
|   lightweight_slice_flag | u(1) |
|   if( !lightweight_slice_flag ) { | |
|     slice_type | ue(v) |
|     pic_parameter_set_id | ue(v) |
|     referred_by_management_module | u(1) |
|     picture_level_coding_tools_APS_data( ) | |
|     ...... | |
|     if (! referred_by_management_module) { | |
|       common_management_module_APS_data( ) | |
|     } | |
|     ...... | |
|   } | |
|   ...... | |
| } | |

In Table 15, referred_by_management_module has the same implication as that in Table 14.

Alternately, the referred_by_management_module can adopt the same bit-stream structure as shown in Table 14 in Embodiment 9, that is, it is encoded after the APS identifier in the data structure picture_level_coding_tools_APS_data( ) of the picture-level coding tools. When it is learned from the SPS flags that all picture-level coding tools are not allowed in the encoding/decoding process, the value of referred_by_management_module is inferred to be 0.

In the process of encoding and decoding multiple APSs at slice level in this embodiment, the bit-stream parsing method, the flag value setting method and the corresponding control method of flag value related to referred_by_management_module are identical to those in Embodiment 9. That is to say, when the value of referred_by_management_module is equal to 1, both the coding tool parameters of the picture-level coding tools and the coding tool parameters of the picture-level or slice-level common management module are given in the data structure picture_level_coding_tools_APS_data( ); when the value of referred_by_management_module is equal to 0, the coding tool parameters of the picture-level coding tools are given in the data structure picture_level_coding_tools_APS_data( ), and the coding tool parameters of the picture-level or slice-level common management module are given in the data structure common_management_module_APS_data( ).

In the process of encoding and decoding multiple APSs at slice level in this embodiment, the corresponding encoding and decoding processes depending on the values of picture_level_coding_tools_APS_data( ) and common_management_module_APS_data( ) are identical to the relevant processes in Embodiment 8.

In this embodiment, the process of encoding and decoding multiple APSs of the slice layer is similar to Embodiment 9, and no further description is needed here.

Embodiment 11

This embodiment provides an electronic device, which includes the above decoding device and encoding device, wherein the decoding device can implement the decoding of a slice-level multi-APS bit-stream described in Embodiment 1 to Embodiment 10, and the encoding device can implement the encoding of a slice-level multi-APS bit-stream described in Embodiment 1 to Embodiment 10.

The electronic device provided by this embodiment may be a relevant generation device or a relevant receiving and playing device of bit-streams of video communication applications, for example, cell phone, computer, server, set-top box, portal mobile terminal, digital TV, digital camera and so on.

In each embodiment above, the encoding process is only one of the encoding methods that the encoder can implement; any encoder which can generate a bit-stream meeting the requirements of the decoding process of the decoder and the corresponding encoding method are included in the scope of each embodiment.

It should be noted that the method that the decoder deduces the coding tool parameters used in the process of decoding the current slice and the encoding method according to multiple APSs referred to by the slice described in Embodiment 1 to Embodiment 6 are also applicable to the picture-level coding tools and the picture-level or slice-level common control module. The embodiment corresponding to three or more coding tools in this embodiment can be directly deduced from the above embodiments, and no further description is needed here.

The above are the preferred embodiments of the disclosure only, and are not intended to limit the scope of protection of the disclosure.

What is claimed is:

1. A method for encoding parameter sets at slice level, comprising:
preconfiguring identifiers for parameter sets containing coding tool parameters corresponding to different coding tools;
determining whether there are one or more parameter sets, in which the coding tool parameters are identical to the coding tool parameters of a part of coding tools used for the current slice, in the existing parameter sets, and when there are one or more parameter sets, in which some coding tool parameters are identical to coding tool parameters of the part of coding tools used for the current slice, in the existing parameter sets, setting values of one or more identifiers of one or more parameter sets to values of the preconfigured identifiers of the parameter sets corresponding to the part of coding tools, and
encoding the one or more identifiers of the one or more parameter sets into a bit-stream of the current slice using a flag indicating that a coding tool previously used for the current slice is to be overwritten;
wherein a parameter set is a data structure containing common information of one or more coding tools used in a process of encoding/decoding one or more slices.

2. The method for encoding parameter sets at slice level according to claim 1, further comprising:
generating one or more parameter sets and encoding in the one or more parameter sets the coding tool parameters of the other part of coding tools used for the current slice, allocating an identifier to each generated parameter set, and encoding the identifier of each generated parameter set into the bit-stream of the current slice.

3. The method for encoding parameter sets at slice level according to claim 2, wherein generating the one or more parameter sets and encoding in the one or more parameter sets the coding tool parameters of the other part of coding tools used for the current slice comprises:
when the other part of coding tools used for the current slice comprises two or more coding tools, generating one or more parameter sets and encoding in each parameter set the coding parameters of one or more coding tools.

4. The method for encoding parameter sets at slice level according to claim 3, wherein generating the one or more parameter sets and encoding in the one or more parameter sets the coding tool parameters of the other part of coding tools used for the current slice comprises:
when the other part of coding tools used for the current slice comprises two or more coding tools, separately generating parameter sets for each coding tool respectively, encoding in each parameter set the coding tool parameters of one coding tool and allocating a parameter set identifier to each generated parameter set, and encoding the identifier of each generated parameter set into the bit-stream of the current slice;
or, when the other part of coding tools used for the current slice comprises two or more coding tools, generating one parameter set, encoding in the parameter set the coding tool parameters of the two or more coding tools and allocating a parameter set identifier to the generated parameter set, and encoding the identifier of the parameter set into the bit-stream of the current slice.

5. The method for encoding parameter sets at slice level according to claim 2, wherein allocating the parameter set identifier to the parameter set comprises:
determining candidate identifiers based on a multi-parameter-set overwriting mode adopted for the current slice, selecting one from the determined candidate identifiers, and
allocating the selected identifier to the parameter set.

6. The method for encoding parameter sets at slice level according to claim 1, wherein the method is embodied as:
pre-configuring identifiers for the parameter sets corresponding to different coding tools;
when there are one or more parameter sets, in which the coding tool parameters are identical to the coding tool parameters of a part of coding tools used for the current slice, in the existing parameter sets, setting the values of the identifiers of respective parameter sets to the preconfigured identifiers of the parameter sets corresponding to the coding tools, and then
encoding the identifiers of respective parameter sets into the bit-stream of the current slice.

7. The method for encoding parameter sets at slice level according to claim 1, wherein the coding tools comprise: picture-level coding tool and/or picture-level or slice-level management module, wherein
the picture-level coding tool comprises: Sample Adaptive Offset (SAO), Adaptive Loop Filter (ALF), Weighted Prediction (WP);
the picture-level or slice-level management module comprises: Decoded Picture Buffer (DPB) management module, reference picture marking and adjustment module, reference picture list construction module.

8. A method for decoding parameter sets at slice level, comprising:
decoding a plurality of parameter sets referred to by a current slice according to parameter set identifiers in a bit-stream of the current slice, determining coding tool parameters used in a process of decoding the current slice, and assigning the values of the determined coding tool parameters to corresponding variables in a data structure of the current slice; wherein a parameter set is a data structure containing common information of one or more coding tools used in the process of decoding one or more slices;

wherein determining the coding tool parameters used in the process of decoding the current slice comprises: determining the coding tool parameters used in the process of decoding the current slice, according to a pre-set multi-parameter-set overwriting mode;

wherein determining the coding tool parameters used in the process of decoding the current slice according to the pre-set multi-parameter-set overwriting mode comprises: according to a flag used for indicating the currently adopted multi-parameter-set overwriting mode, determining the multi-parameter-set overwriting mode used in the process of decoding the current slice, and determining the coding tool parameters used in the process of decoding the current slice by overwriting coding tool parameters for the current slice based on the determined multi-parameter-set overwriting mode.

9. The method for decoding parameter sets at slice level according to claim 8, wherein determining the coding tool parameters used in the process of decoding the current slice comprises:

for each coding tool, if there is only one parameter set, in which an On/Off flag of the coding tool is 1, in the plurality of parameter sets referred to by the current slice, then determining that the coding tool parameters of the coding tool in the parameter set are used in the process of decoding the current slice.

10. The method for decoding parameter sets at slice level according to claim 8, wherein determining the coding tool parameters used in the process of decoding the current slice comprises:

determining the coding tool parameters of the coding tools used in the process of decoding the current slice, according to a preconfigured corresponding relationship between a parameter set identifier and a coding tool.

11. The method for decoding parameter sets at slice level according to claim 8, wherein determining the coding tool parameters used in the process of decoding the current slice according to the pre-set multi-parameter-set overwriting mode comprises:

for each coding tool, if, in the parameter set with its identifier equal to ps_id[n], a flag used for indicating that the parameter set contains information of the coding tool parameters is 1, overwriting the coding tool parameters of the coding tool previously determined for decoding the current slice with the coding tool parameters of the coding tool in the parameter set with its identifier equal to ps_id[n], wherein n is an integer, not less than 1 but not greater than the number of parameter sets referred to by the current slice.

12. The method for decoding parameter sets at slice level according to claim 8, wherein binary representation of the flag used for indicating the currently adopted multi-parameter-set overwriting mode contains one or more bits, wherein each bit indicates the multi-parameter-set overwriting mode for one coding tool.

13. The method for decoding parameter sets at slice level according to claim 8, wherein the flag used for indicating the currently adopted multi-parameter-set overwriting mode is obtained based on an absolute difference between the parameter set identifiers given by ps_id[i] and ps[i−1], wherein i is an integer, not less than 1 but not greater than the number of parameter sets referred to in the process of decoding the current slice.

14. The method for decoding parameter sets at slice level according to claim 8, wherein the coding tools comprise: picture-level coding tool and/or picture-level or slice-level management module, wherein the picture-level coding tool comprises: Sample Adaptive Offset (SAO), Adaptive Loop Filter (ALF), Weighted Prediction (WP); the picture-level or slice-level management module comprises: Decoded Picture Buffer (DPB) management module, reference picture marking and adjustment module, reference picture list construction module.

15. An encoder for encoding parameter sets at slice level, comprising: a hardware processor coupled with a memory and configured to execute program modules stored on the memory, wherein the program modules comprise: a determination module and an encoding module, wherein the determination module is configured to: determine whether there are one or more parameter sets, in which coding tool parameters are identical to coding tool parameters of a part of coding tools used for a current slice, in existing parameter sets, and when determining that there are one or more parameter sets, in which coding tool parameters are identical to coding tool parameters of a part of coding tools used for the current slice, in existing parameter sets, set values of one or more identifiers of one or more parameter sets to values of preconfigured identifiers of the parameter sets corresponding to the part of coding tools and notify the encoding module to refer to the one or more parameter sets;

the encoding module is configured to encode the one or more identifiers of the one or more parameter sets into a bit-stream of the current slice using a flag indicating that a coding tool previously used for the current slice is to be overwritten when receiving the notification from the determination module; wherein a parameter set is a data structure containing common information of one or more coding tools used in a process of encoding/decoding one or more slices.

16. The encoder for encoding parameter sets at slice level according to claim 15, wherein the encoding module is further configured to: generate one or more parameter sets and encode in the one or more parameter sets the coding tool parameters of the other part of coding tools used for the current slice, allocate an identifier to each generated parameter set, and encode the identifier of each generated parameter set into the bit-stream of the current slice.

17. The encoder for encoding parameter sets at slice level according to claim 16, wherein the encoding module is further configured to set the identifier of the parameter set to a preconfigured identifier of the parameter set corresponding to the coding tool, and then encode the identifier of the parameter set into the bit-stream of the current slice.

18. A decoder for decoding parameter sets at slice level, comprising: a hardware processor coupled with a memory and configured to execute program modules stored on the memory, wherein the program modules comprise: a decoding module, a determination module and a value assignment module, wherein the decoding module is configured to decode a plurality of parameter sets referred to by a current slice according to decoded parameter set identifiers in a bit-stream of the current slice;

the determination module is configured to determine coding tool parameters used in a process of decoding the current slice, according to the coding tool parameters in the plurality of parameter sets obtained when the decoding module decodes the plurality of parameter sets referred to by the current slice;

the value assignment module is configured to assign the values of the coding tool parameters determined by the determination module to corresponding variables in a data structure of the current slice; wherein a parameter set is a data structure containing common information of one or more coding tools used in a process of decoding one or more slices;

wherein the determination module is configured to determine the coding tool parameters used in the process of decoding the current slice, according to a pre-set multi-parameter-set overwriting mode by the following steps: according to a flag used for indicating the currently adopted multi-parameter-set overwriting mode, determining the multi-parameter-set overwriting mode used in the process of decoding the current slice, and determining the coding tool parameters used in the process of decoding the current slice based on the determined multiparameter-set overwriting mode by overwriting coding tool parameters for the current slice.

19. The decoder for decoding parameter sets at slice level according to claim 18, wherein the determination module is configured to: for each coding tool, if there is only one parameter set, in which an On/Off flag of the coding tool is 1, in the plurality of parameter sets referred to by the current slice, determine that the coding tool parameters of the coding tool in the parameter set are used in the process of decoding the current slice.

20. The decoder for decoding parameter sets at slice level according to claim 18, wherein the determination module is configured to determine the coding tool parameters of the coding tools used in the process of decoding the current slice, according to a preconfigured corresponding relationship between a parameter set identifier and a coding tool.

21. An electronic device, comprising an encoder for encoding parameter sets at slice level and a decoder for decoding parameter sets at slice level, wherein:

the encoder comprises: a hardware processor coupled with a memory and configured to execute first program modules stored on the memory, wherein the first program modules comprise: a determination module and an encoding module, wherein the determination module is configured to: determine whether there are one or more parameter sets, in which coding tool parameters are identical to coding tool parameters of a part of coding tools used for a current slice, in existing parameter sets, and when determining that there are one or more parameter sets, in which coding tool parameters are identical to coding tool parameters of a part of coding tools used for a current slice, in existing parameter sets, set values of one or more identifiers of one or more parameter sets to values of preconfigured identifiers of the parameter sets corresponding to the part of coding tools and notify the encoding module to refer to the one or more parameter sets; the encoding module is configured to encode the one or more identifiers of the one or more parameter sets into a bit-stream of the current slice using a flag indicating that a coding tool previously used for the current slice is to be overwritten when receiving the notification from the determination module;

the decoder comprises: a hardware processor coupled with a memory and configured to execute second program modules stored on the memory of the decoder, wherein the second program modules comprise: a decoding module, a determination module and a value assignment module, wherein the decoding module is configured to decode a plurality of parameter sets referred to by the current slice according to parameter set identifiers in a bit-stream of the current slice;

the determination module is configured to determine the coding tool parameters used in a process of decoding the current slice, according to the coding tool parameters in the plurality of parameter sets obtained when the decoding module decodes the plurality of parameter sets referred to by the current slice; the value assignment module is configured to assign the values of the coding tool parameters determined by the determination module to corresponding variables in a data structure of the current slice;

wherein a parameter set is a data structure containing common information of one or more coding tools used in a process of encoding/decoding one or more slices;

wherein the determination module of the second program modules is further configured to determine the coding tool parameters used in the process of decoding the current slice, according to a preset multi-parameter-set overwriting mode by the following steps: according to a flag used for indicating the currently adopted multi-parameter-set overwriting mode, determining the multi-parameter-set overwriting mode used in the process of decoding the current slice, and determining the coding tool parameters used in the process of decoding the current slice based on the determined multi-parameter-set overwriting mode by overwriting coding tool parameters for the current slice.

22. The electronic device according to claim 21, wherein the encoding module is further configured to: generate one or more parameter sets and encode in the one or more parameter sets the coding tool parameters of the other part of coding tools used for the current slice, allocate an identifier to each generated parameter set, and encode the identifier of each generated parameter set into the bit-stream of the current slice.

23. The electronic device according to claim 22, wherein the encoding module is further configured to set the identifier of the parameter set to be a preconfigured parameter set identifier corresponding to the coding tool, and then encode the identifier of the parameter set into the bit-stream of the current slice.

24. The electronic device according to claim 21, wherein the determination module of the second program modules is further configured to determine whether there are one or more parameter sets, in which the coding tool parameters are identical to the coding tool parameters of a part of coding tools used for the current slice, in the existing parameter sets.

25. The electronic device according to claim 21, wherein the determination module of the second program modules is configured to: for each coding tool, if there is only one parameter set, in which an On/Off flag of the coding tool is 1, in the plurality of parameter sets referred to by the current slice, determine that the coding tool parameters of the coding tool in the parameter set are used in the process of decoding the current slice.

26. The electronic device according to claim 21, wherein the determination module of the second program modules is configured to determine the coding tool parameters of the coding tools used in the process of decoding the current slice, according to a preconfigured corresponding relationship between a parameter set identifier and a coding tool.

* * * * *